(12) United States Patent
Indermuhle et al.

(10) Patent No.: US 12,734,498 B2
(45) Date of Patent: Sep. 15, 2026

(54) SYSTEMS AND METHODS FOR SURFACE STRUCTURING

(71) Applicant: Nautilus Subsidiary, Inc., Seattle, WA (US)

(72) Inventors: Pierre Indermuhle, Berkeley, CA (US); Christina E. Inman, San Mateo, CA (US)

(73) Assignee: Nautilus Subsidiary, Inc., Seattle, WA (US)

( * ) Notice: Subject to any disclaimer, the term of this patent is extended or adjusted under 35 U.S.C. 154(b) by 988 days.

(21) Appl. No.: 18/052,179

(22) Filed: Nov. 2, 2022

(65) Prior Publication Data

US 2023/0149883 A1 May 18, 2023

Related U.S. Application Data

(60) Provisional application No. 63/275,298, filed on Nov. 3, 2021.

(51) Int. Cl.
*C03C 17/28* (2006.01)
*B01J 19/00* (2006.01)

(52) U.S. Cl.
CPC .. *B01J 19/0046* (2013.01); *B01J 2219/00608* (2013.01); *B01J 2219/00637* (2013.01); *B01J 2219/00711* (2013.01); *B01J 2219/00725* (2013.01); *C03C 17/28* (2013.01); *C03C 2218/32* (2013.01); *C03C 2218/328* (2013.01); *C03C 2218/34* (2013.01)

(58) Field of Classification Search
None
See application file for complete search history.

(56) References Cited

U.S. PATENT DOCUMENTS

| | | | |
|---|---|---|---|
| 5,624,711 | A | 4/1997 | Sundberg et al. |
| 5,688,642 | A | 11/1997 | Chrisey et al. |
| 6,528,264 | B1 | 3/2003 | Pal et al. |
| 6,949,638 | B2 | 9/2005 | Mittmann et al. |
| 7,736,906 | B2 | 6/2010 | Winkler et al. |
| 7,951,601 | B2 | 5/2011 | Kuimelis et al. |

(Continued)

FOREIGN PATENT DOCUMENTS

| | | | |
|---|---|---|---|
| WO | WO 2005/005039 | A1 | 1/2005 |
| WO | WO 2014028940 | A1 | 2/2014 |

(Continued)

OTHER PUBLICATIONS

Leuschel, B., et al., "Deep-UV photoinduced chemical patterning at the micro- and nanoscale for directed self-assembly," Scientific Reports, 2018, 8:10444, 1-15.

(Continued)

*Primary Examiner* — Heather Calamita
*Assistant Examiner* — Elizabeth Rose Lafave
(74) *Attorney, Agent, or Firm* — Morgan, Lewis & Bockius LLP

(57) ABSTRACT

Systems and methods for the formation of single-analyte arrays are described. Array sites are formed via the patterning of surface-linked organic layers by electromagnetic radiation. Each array site may be modified after patterning to produce a chemistry at the array site that facilitates the controlled deposition of a single analyte at the array site.

20 Claims, 26 Drawing Sheets

Specification includes a Sequence Listing.

(56) References Cited

U.S. PATENT DOCUMENTS

| | | | | |
|---|---|---|---|---|
| 8,728,767 | B2 | 5/2014 | Shapero | |
| 9,833,761 | B2 | 12/2017 | Banyai et al. | |
| 10,213,762 | B2 | 2/2019 | McGall et al. | |
| 10,473,654 | B1 | 11/2019 | Mallick | |
| 10,987,648 | B2 | 4/2021 | Peck et al. | |
| 11,203,612 | B2 | 12/2021 | Gremyachinskiy et al. | |
| 11,282,586 | B2 | 3/2022 | Patel et al. | |
| 11,505,796 | B2 | 11/2022 | Aksel et al. | |
| 2004/0241675 | A1* | 12/2004 | Gillner | C12Q 1/6837 435/6.11 |
| 2005/0079529 | A1 | 4/2005 | Fodor et al. | |
| 2006/0138083 | A1 | 6/2006 | Ryan et al. | |
| 2006/0194258 | A1* | 8/2006 | Pirrung | G01N 21/6452 435/7.1 |

FOREIGN PATENT DOCUMENTS

| | | | |
|---|---|---|---|
| WO | WO 2019036055 | A1 | 2/2019 |
| WO | WO 2019083856 | A1 | 5/2019 |
| WO | WO 2019236749 | A1 | 12/2019 |
| WO | WO 2020106889 | A1 | 5/2020 |
| WO | WO 2020223368 | A1 | 11/2020 |
| WO | WO 2021087402 | A1 | 5/2021 |
| WO | WO 2021252800 | A1 | 12/2021 |
| WO | WO 2022103887 | A1 | 5/2022 |
| WO | WO 2022159520 | A1 | 7/2022 |
| WO | WO 2022159663 | A1 | 7/2022 |
| WO | WO 2022271983 | A1 | 12/2022 |

OTHER PUBLICATIONS

Quilis, N., et al., "Tunable laser interference lithography preparation of plasmonic nanoparticle arrays tailored for SERS," Nanoscale, 2018, 10:10268-10276.

Wilson, K., et al. "Direct patterning of coplanar polyethylene glycol alkylsilane monolayers by deep-ultraviolet photolithography as a general method for high fidelity, long-term cell patterning and culture," J. Vac. Sci. Technol B, Mar./Apr. 2011, 29(2): 021020-1-021020-10.

* cited by examiner

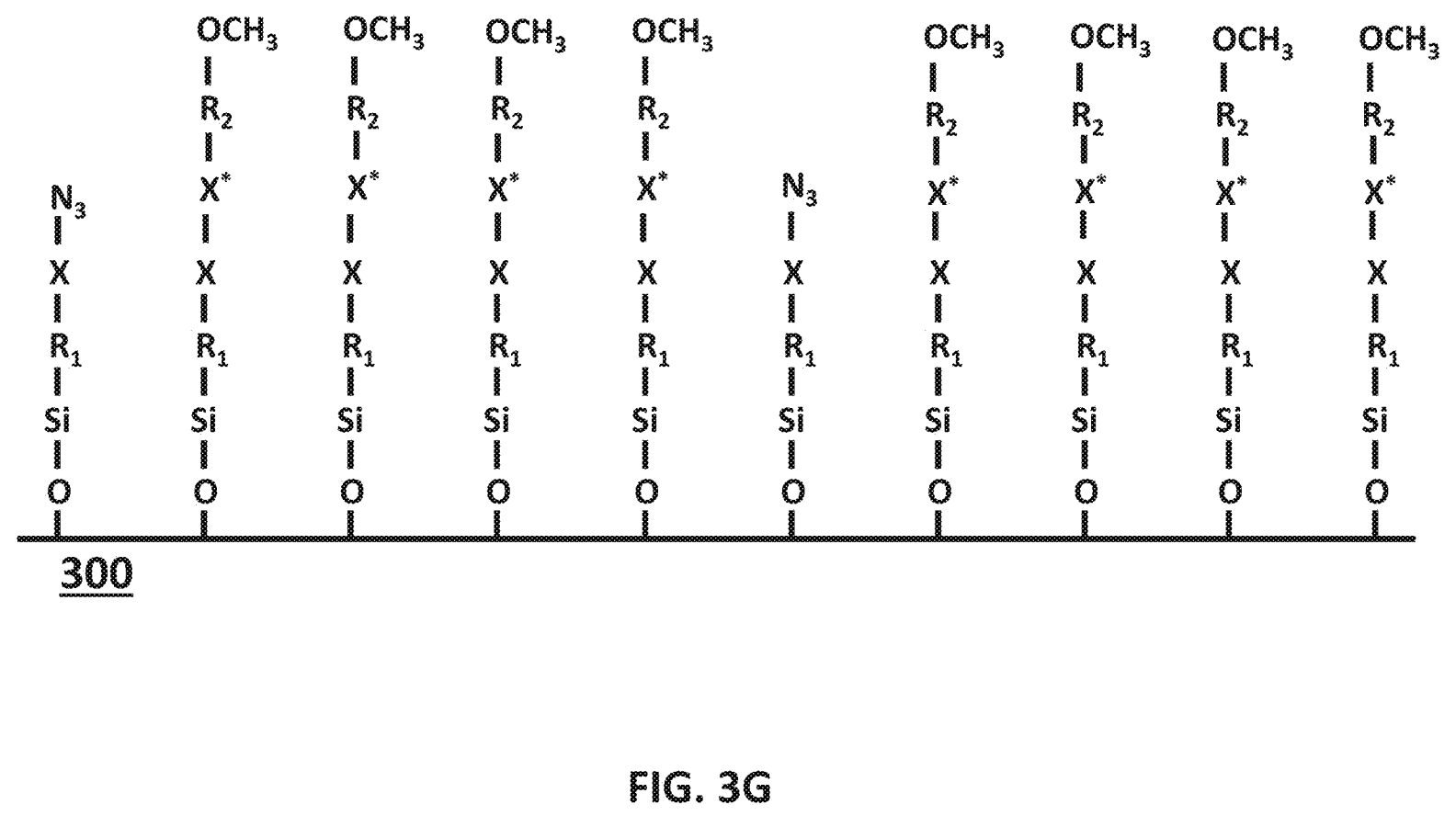

300

$N_3$—X—$R_1$—Si—O—

$OCH_3$—$R_2$—X*—X—$R_1$—Si—O—

$OCH_3$—$R_2$—X*—X—$R_1$—Si—O—

$OCH_3$—$R_2$—X*—X—$R_1$—Si—O—

$OCH_3$—$R_2$—X*—X—$R_1$—Si—O—

$N_3$—X—$R_1$—Si—O—

$OCH_3$—$R_2$—X*—X—$R_1$—Si—O—

$OCH_3$—$R_2$—X*—X—$R_1$—Si—O—

$OCH_3$—$R_2$—X*—X—$R_1$—Si—O—

$OCH_3$—$R_2$—X*—X—$R_1$—Si—O—

FIG. 3G

Figure 4:
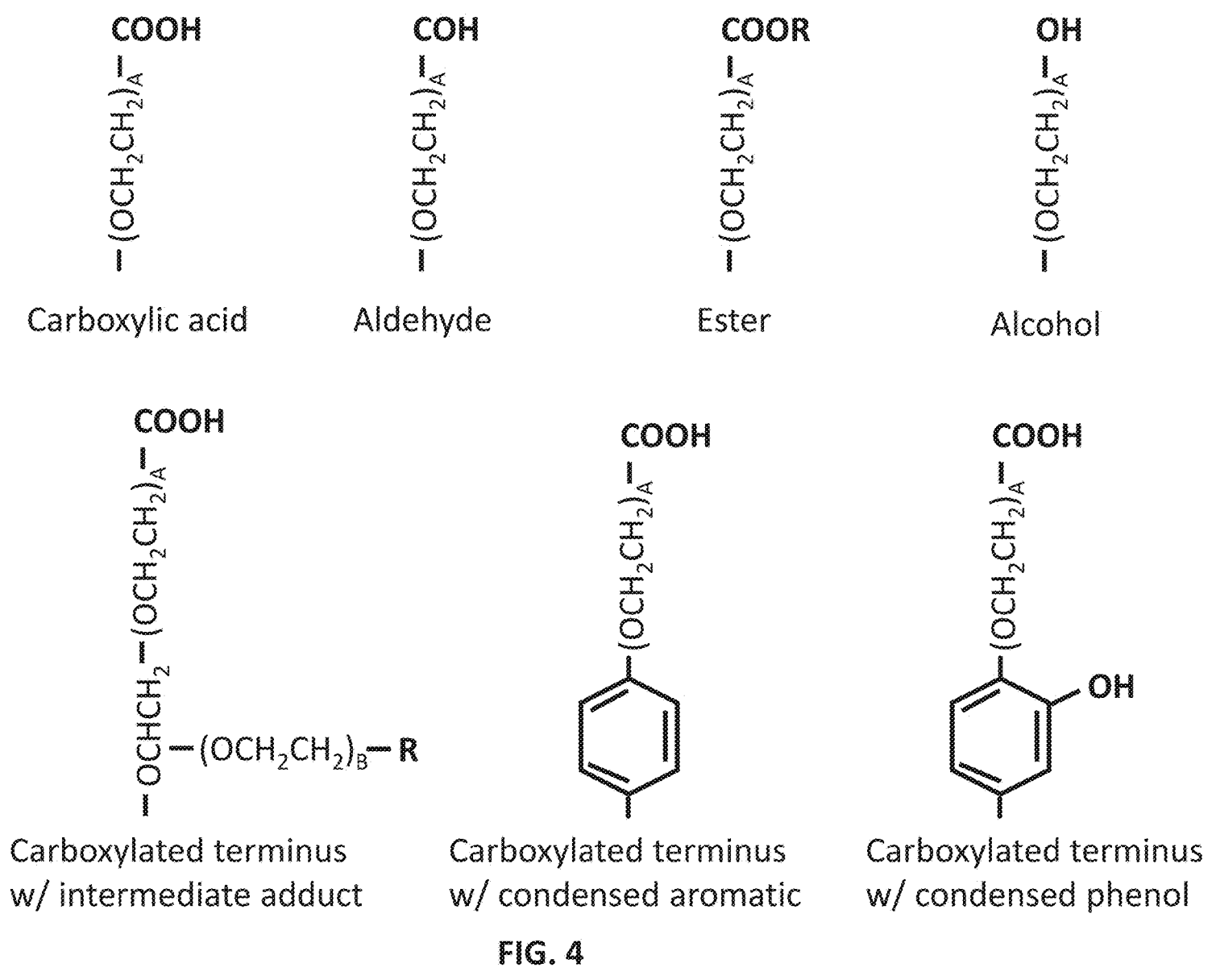

COOH
$-(OCH_2CH_2)_A-$
Carboxylic acid

COH
$-(OCH_2CH_2)_A-$
Aldehyde

COOR
$-(OCH_2CH_2)_A-$
Ester

OH
$-(OCH_2CH_2)_A-$
Alcohol

COOH
$-(OCH_2CH_2)_A-$
$-OCHCH_2-$
$-(OCH_2CH_2)_B-R$
Carboxylated terminus w/ intermediate adduct COOH
$-(OCH_2CH_2)_A-$
Carboxylated terminus w/ condensed aromatic COOH
$-(OCH_2CH_2)_A-$
OH
Carboxylated terminus w/ condensed phenol

R1 — COOH
SOCl2
NH3
NHS-R2
R1 — C — N — R2
O
H

R1 — COH
HCN
LiAlH3
H2O
NHS-R2
R1 — C — CH2 — N — R2
O
H

R1 — COO — R3
NH3
NHS-R2
R1 — C — N — R2
O
H 1030
1020
OH—(OCH2CH2)n—X*—X—R—Si—O
1000
1010
1014
1012

SEQUENCE LISTING

```
Sequence total quantity: 1
SEQ ID NO: 1            moltype = DNA  length = 19
FEATURE                 Location/Qualifiers
source                  1..19
                        mol_type = other DNA
                        organism = synthetic construct
SEQUENCE: 1
atggtagaag gagaggtgt                                              19
```

SYSTEMS AND METHODS FOR SURFACE STRUCTURING

CROSS REFERENCE TO RELATED APPLICATIONS

This application claims priority to U.S. Provisional Patent Application No. 63/275,298, filed Nov. 3, 2021, the content of which is hereby incorporated by reference, in its entirety, for all purposes.

SEQUENCE LISTING

This application contains a Sequence Listing which has been submitted electronically in XML file format and is hereby incorporated by reference in its entirety. The XML file, created on Feb. 9, 2023, is named 130173-01-5004-WO_Sequence Listing.xml and is 8,192 bytes in size.

BACKGROUND

The surfaces of solid supports, such as glass, silicon, or acrylic polymers, can be modified to include compounds that mediate the interactions of other molecules with the surface. In some cases, the surface-linked compounds may form layers (e.g., monolayers, bilayers, etc.) adjacent to the surface of the solid support. Diverse chemistries of surface-linked compounds are available to control the interactions between a solid support surface and other molecules, such as by inhibiting non-specific binding of certain molecules with the surface, or by facilitating specific binding interactions between the surface and other certain molecules.

SUMMARY

In an aspect, provided herein is a method, comprising: a) providing a solid support comprising a surface and a substantially uniform layer on the surface, wherein the substantially uniform layer comprises a plurality of molecules that are coupled to the surface; and b) applying electromagnetic radiation to an area of the surface to disrupt a first subset of the plurality of molecules within a region of the surface, wherein the region of the surface retains a second subset of the plurality of molecules or a derivative thereof after applying the electromagnetic radiation to the area of the surface.

In another aspect, provided herein is a solid support comprising a surface, wherein the surface comprises: a) a first region comprising a first plurality of molecules that are coupled to the first region of the surface, wherein the first plurality of molecules form a substantially homogeneous layer on the first region of the surface; and b) a second region comprising a second plurality of molecules that are coupled to the second region of the surface, wherein the second plurality of molecules form a spatially and compositionally heterogeneous layer on the first region of the surface.

In another aspect, provided herein is a solid support comprising a surface, wherein the surface comprises: a) a first region comprising a first plurality of molecules that are conjugated to the first region of the surface, wherein the first plurality of molecules form a substantially homogeneous layer, and wherein a molecule of the first plurality of molecules comprises: i) a first linking moiety that conjugates the molecule of the first plurality of molecules to the surface; and ii) a passivating moiety that is conjugated to the linking moiety; and b) a second region comprising a second plurality of molecules that are conjugated to the second region of the surface, wherein a molecule of the second plurality of molecules comprises: i) optionally, a derivative of the molecule of the first plurality of molecules that is conjugated to the surface; ii) a second linking moiety, wherein the linking moiety is configured to conjugate the molecule of the second plurality of molecules to the surface or the derivative of the molecule of the first plurality of molecules; and iii) a coupling moiety that is configured to couple an analyte-displaying particle to the surface.

In another aspect, provided herein is a method of preparing a solid support, the method comprising: a) providing a solid support comprising a surface, wherein the surface comprises: i) a first region comprising a first plurality of molecules that are coupled to the first region of the surface, wherein the first plurality of molecules form a substantially homogeneous layer on the first region of the surface; and ii) a second region comprising a second plurality of molecules that are coupled to the second region of the surface, wherein the second plurality of molecules form a spatially and compositionally heterogeneous layer on the second region of the surface; and b) two or more of the steps of: (i) identifying a first physical property of the first region of the surface; (ii) identifying a second physical property of the second region of the surface; and (iii) based upon the first physical property or the second physical property, determining a subsequent processing step.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 3A, 3B, 3C, 3D, 3E, 3F, and 3G show various configurations of substantially uniform surface layers comprising a plurality of surface-linked molecules, including oligonucleotides (SEQ ID NO:1), in accordance with some embodiments.

FIG. 4 displays multiple possible derivatives of a surface-linked moiety comprising a linear PEG chain, in accordance with some embodiments.

FIG. 6 depicts a reaction scheme for modifying an oxidized, surface-linked moiety, in accordance with some embodiments.

DETAILED DESCRIPTION

Figures 1A, 1B:
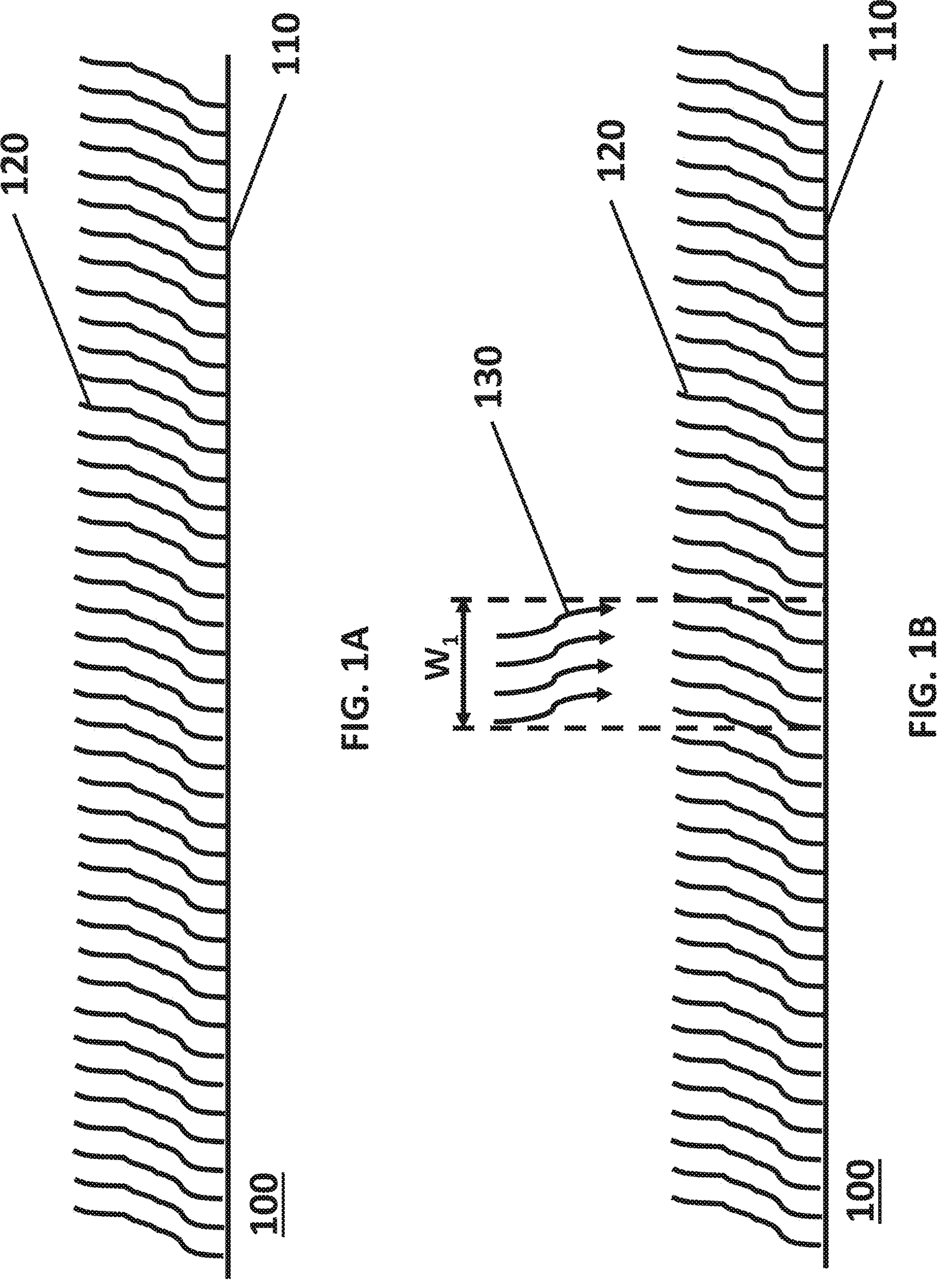
FIGS. 1A, 1B, 1C, and 1D illustrate steps of a method of forming a modified region of a surface on a solid support, in accordance with some embodiments.

For many single-analyte processes or assays, it is preferable to form arrays that display single analytes in a high-density format while maintaining sufficient separation between analytes to permit individual detection and/or interrogation of each analyte on the array. It is advantageous to form arrays with tailored surface structures and/or chemistries that permit the controlled deposition of analytes at intended display sites while inhibiting the deposition of analytes or other present molecules at interstitial regions that separate analyte display sites. Accordingly, candidate materials for single-analyte array solid supports (e.g., glass, silicon, acrylics, etc.) may be chosen due to the availability of surface-patterning methods (e.g., photolithography, lift-off methods, nano-imprint lithography, etc.) and/or surface modification chemistries (e.g., chemical vapor deposition, liquid-phase deposition, atomic layer deposition, etc.).

A consideration in selecting a single-analyte array formation method is the likelihood of generating spatial or compositional heterogeneity amongst analyte display sites and/or interstitial regions, thereby affecting the separation of analytes or the level of resolution achievable between analytes on the array. Preferably, a method of array formation should involve a minimal number of processes and/or process components (e.g., reagents, devices, etc.) as each additional process or component may introduce a characteristic level of defect formation that compounds array defects formed by prior processes or components. For example, formation of a nanopatterned array by a photolithographic lift-off method, involving the steps of photomask deposition, surface patterning, and photomask removal, may cause random formation of photomask layer heterogeneity (e.g., patches of thin or non-existent photomask), surface patterning heterogeneity (e.g., incomplete lithography) and incomplete photomask removal.

Provided herein are methods for forming single-analyte arrays with a minimal number of processing steps. The provided single-analyte arrays may be characterized by a high analyte display site density and a low density of array defects. Surprisingly, spatial and/or compositional heterogeneity formed on a solid support surface during the described methods are utilized to increase the spatial and/or compositional uniformity of the final single-analyte array. The methods provided herein utilize a direct form of surface patterning by electromagnetic radiation to form analyte display sites with a minimal number of processing steps. The provided methods forego the need for additional lithographic methods to form discrete, resolvable analyte display sites. Moreover, the provided methods also utilize a minimal number of processing reagents, thereby decreasing the likelihood of spatial and/or compositional heterogeneity arising due to reagent impurities.

Further provided herein are methods for depositing single analytes at analyte display sites on the single-analyte arrays. The methods, compositions, and systems provided herein may be useful for any single-analyte process or assay, including but not limited to single-molecule protein identification, single-molecule nucleic acid sequencing, single-molecule protein sequencing, and single-molecule receptor-ligand assays.

As used herein, the term "uniform" refers to a property or characteristic of a system or composition in which differences in the property or characteristic are spatially, temporally, or compositionally indistinguishable. A property or characteristic of a system or composition may be spatially, temporally, or compositionally indistinguishable if a measure of statistical dispersion or shape for the property or characteristic (e.g., a relative standard deviation, an absolute standard deviation, a variance, a percentile, a moment, etc.) has a value below a threshold for the measure of statistical dispersion or shape, in which the threshold for the measure of statistical dispersion or shape is dependent upon the system or composition being observed. For example, a property or characteristic may be uniform if it has a coefficient of variability below a value of about 1, 0.5, 0.1, 0.05, 0.01, etc. Alternatively, a property or characteristic of a system or composition may be spatially, temporally, or compositionally indistinguishable if a measure of the property or characteristic, or a measure of variability thereof, is substantially identical between a first area, time, or sample and a second area, time or sample. A measure of a property or characteristic, or a measure of variability thereof, may differ by no more than, for example, 10%, 9%, 8%, 7%, 6%, 5%, 4%, 3%, 2%, 1%, 0.5%, 0.1%, 0.05%, 0.01%, or less than 0.01%, between a first area, time, or sample and a second area, time or sample. As used herein, the term "non-uniform" refers to a property or characteristic of a system or composition in which differences in the property or characteristic are spatially, temporally, or compositionally distinguishable. Uniformity or non-uniformity of a system or composition can optionally be determined at a resolution that is comparable to, higher than, or lower than, the resolution at which the system or composition is used in a method set forth herein. For example, uniformity of a surface layer can be determined at a resolution that is comparable to, higher than, or lower than, the resolution at which molecules conjugated to the surface layer are detected As used herein, the term "average," when used in reference to a measure of a property or characteristic of a system or composition set forth herein, refers to a mathematical mean for the measure of the property or characteristic (e.g., an arithmetic mean, a geometric mean, a harmonic mean, etc.). For example, a beam of electromagnetic radiation with a substantially Gaussian power density profile may have an average power density that is calculated as the arithmetic mean of the Gaussian profile. An average measure of a property or characteristic may be further characterized by a measure of statistical dispersion or shape, such as a relative standard deviation, an absolute standard deviation, a variance, a percentile, or a statistical moment. For example, an average property or characteristic may have a coefficient of variability of no more than about 1, 0.5, 0.25, 0.1, 0.05, 0.01, 0.005, 0.001, or less than 0.001. Alternatively or additionally, an average property or characteristic may have a coefficient of variability of at least about 0.001, 0.005, 0.01, 0.05, 0.1, 0.25, 0.5, 1, or more than 1.

Methods of Single-Analyte Array Formation

Provided herein are methods for forming patterned arrays that are configured to display single analytes with sufficient separation between single analytes to permit detection and/or interrogation of each single analyte at single-analyte resolution. The arrays may be formed on a surface of a solid support that, prior to an array formation method, comprises a substantially uniform layer of molecules. For example, an array may be formed on a glass solid support that comprises a surface functionalized with a monolayer of polyethylene glycol (PEG) or oligonucleotides. After providing a solid support containing a surface with a substantially uniform layer of molecules, one or more regions of the surface may be altered by applying electromagnetic radiation to the one or more regions of the surface, thereby altering the substantially uniform layer of molecules at the one or more regions of the surface. For example, applying laser radiation to one or more regions of a surface containing a substantially uniform PEG monolayer may ablate some or all of the PEG moieties within the one or more regions of the surface, thereby forming regions of spatial or compositional heterogeneity within the substantially uniform layer of molecules.

After forming one or more regions on a surface of a solid support, a new surface chemistry may be formed at the one or more regions (e.g., by vapor-phase or liquid-phase deposition), resulting in a region of altered surface chemistry within a substantially uniform layer of molecules on the surface that is favorable for controlling analyte deposition and display on the array. For example, a method described herein may be utilized to form one or more regions of covalent-binding moieties (e . . . g, Click-type reactive groups) within a substantially uniform passivated surface layer (e.g., a PEG-coated surface). The one or more regions of covalent-binding moieties may provide analyte display sites for a single-analyte array. In another example, a method described herein may be utilized to form one or more regions of passivated surface chemistry (e.g., PEG moieties) within a substantially uniform layer of binding moieties (e.g., surface-linked oligonucleotides). The one or more regions of passivated surface chemistry may form interstitial regions that inhibit binding of analytes or other moieties within the interstitial regions. Surprisingly, it may be advantageous to incompletely remove molecules from within a region of a surface when electromagnetic radiation is applied as residual molecules from the original substantially uniform layer may provide additional pathways for forming altered surface chemistries at the region of the surface.

Figures 1C, 1D:
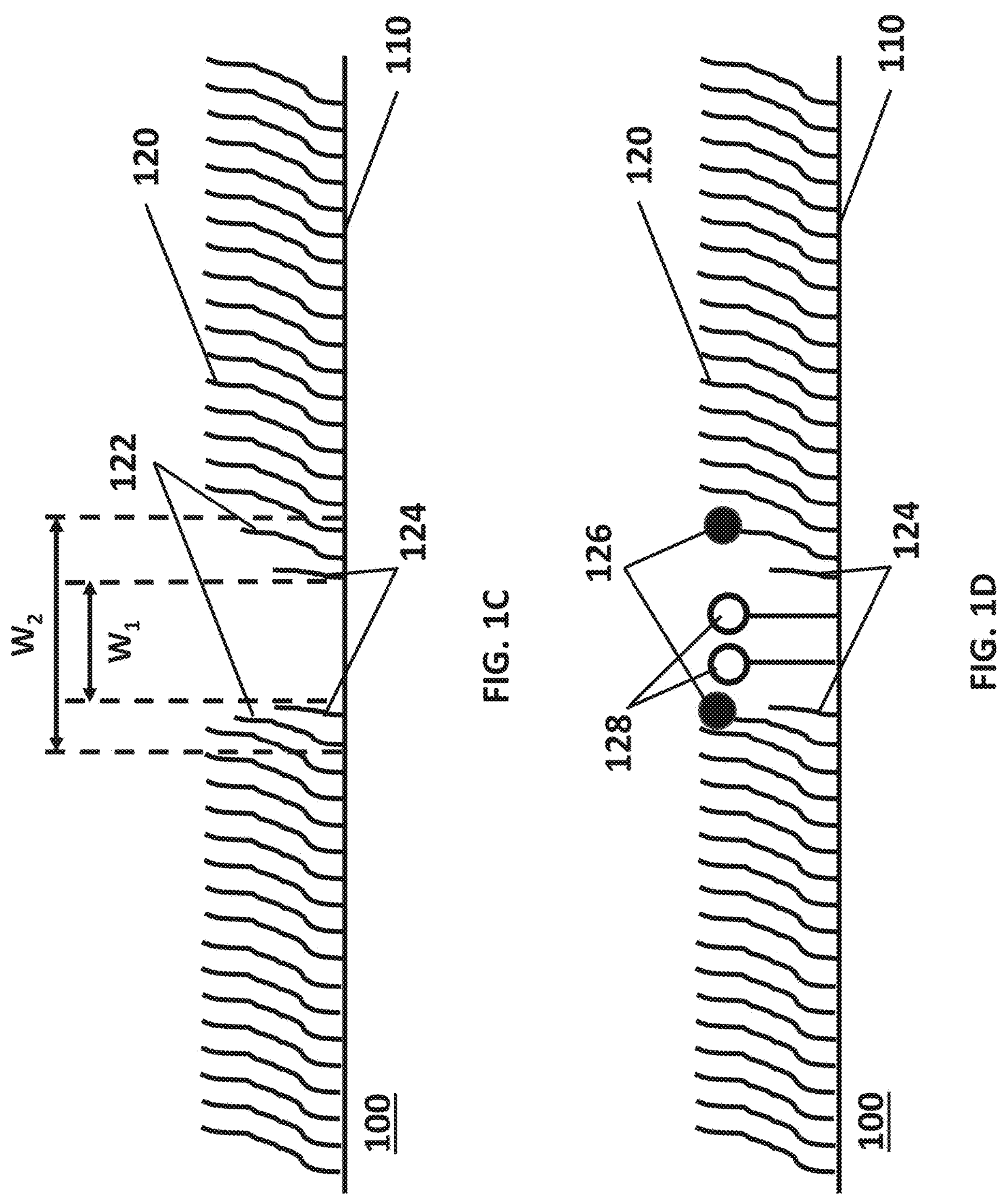

FIGS. 1A-1D illustrate a method of forming a region of altered surface chemistry on a surface. FIG. 1A shows a cross-sectional view of a solid support 100 comprising a substantially uniform layer or coating of molecules 120 adjacent to a surface 110 of the solid support 100. FIG. 1B depicts applying a field of electromagnetic radiation 130 that is applied to a first area of the surface 110 having a width of $W_1$. FIG. 1C illustrates the surface 110 after applying electromagnetic radiation 130. Within the first area of the surface 110 marked by width $W_1$, the substantially uniform layer or coating of molecules 120 has been completely or almost completely ablated. Within a second area of the surface 110, marked by the portion of the surface 110 between widths $W_2$ and $W_1$, the substantially uniform layer or coating of molecules 120 has been partially or incompletely ablated, leaving a heterogeneous plurality of molecules in the second area, including reactive derivative molecules 122 and inert derivative molecules 124. FIG. 1D depicts the subsequent modification of the electromagnetically-altered region of the surface 110. A first plurality of molecules 126 may be added to the altered region of the surface 110 by modifying reactive derivative molecules 122 to form the first plurality of molecules 126. A second plurality of molecules 128 may be added to the altered region of the surface 110 by conjugating the second plurality of molecules 128 to surface sites exposed by laser ablation.

Figure 2A:
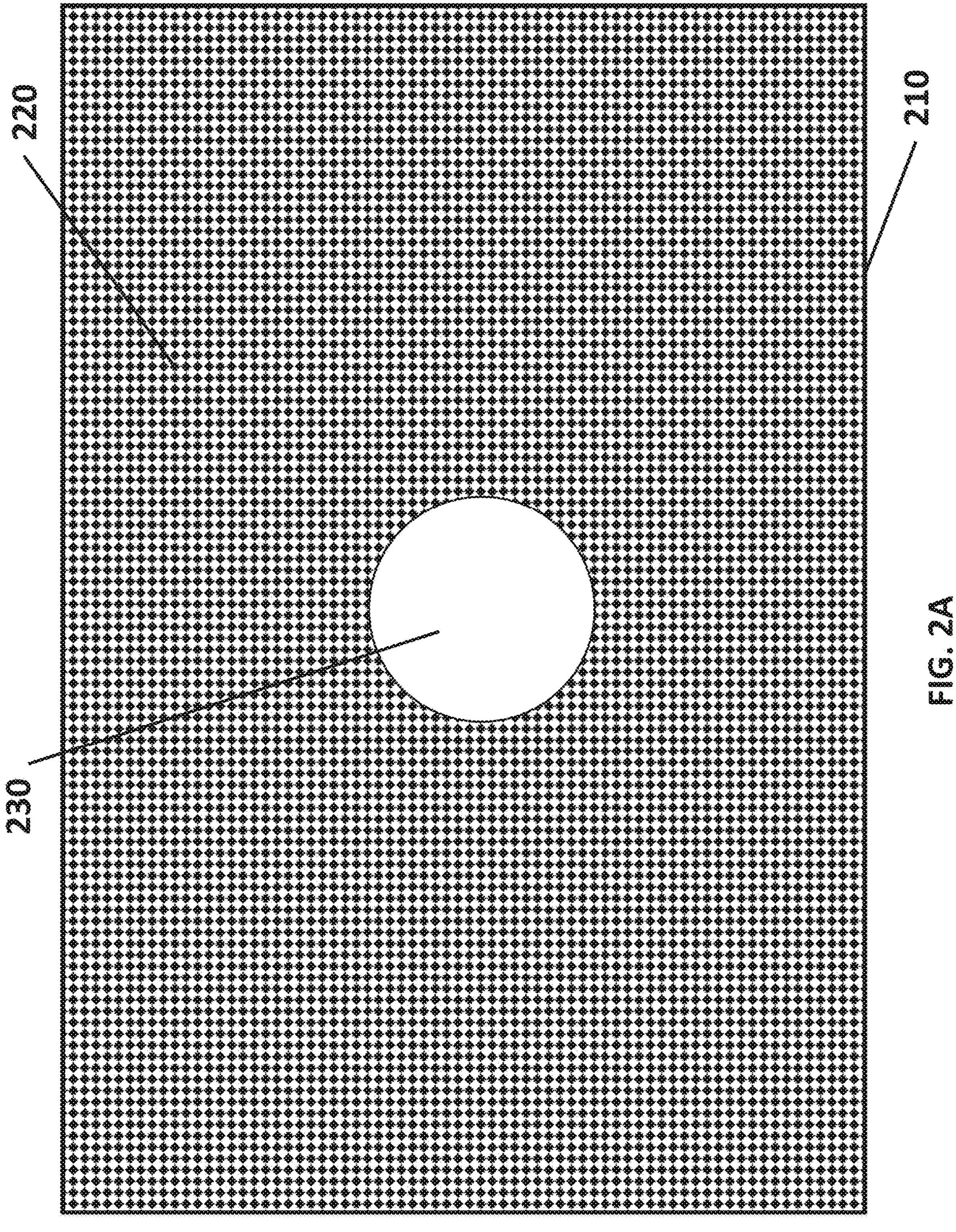
FIGS. 2A, 2B, 2C, 2D, and 2E depict various aspects of modified surface regions formed by a method as set forth herein, in accordance with some embodiments.
Figure 2B:
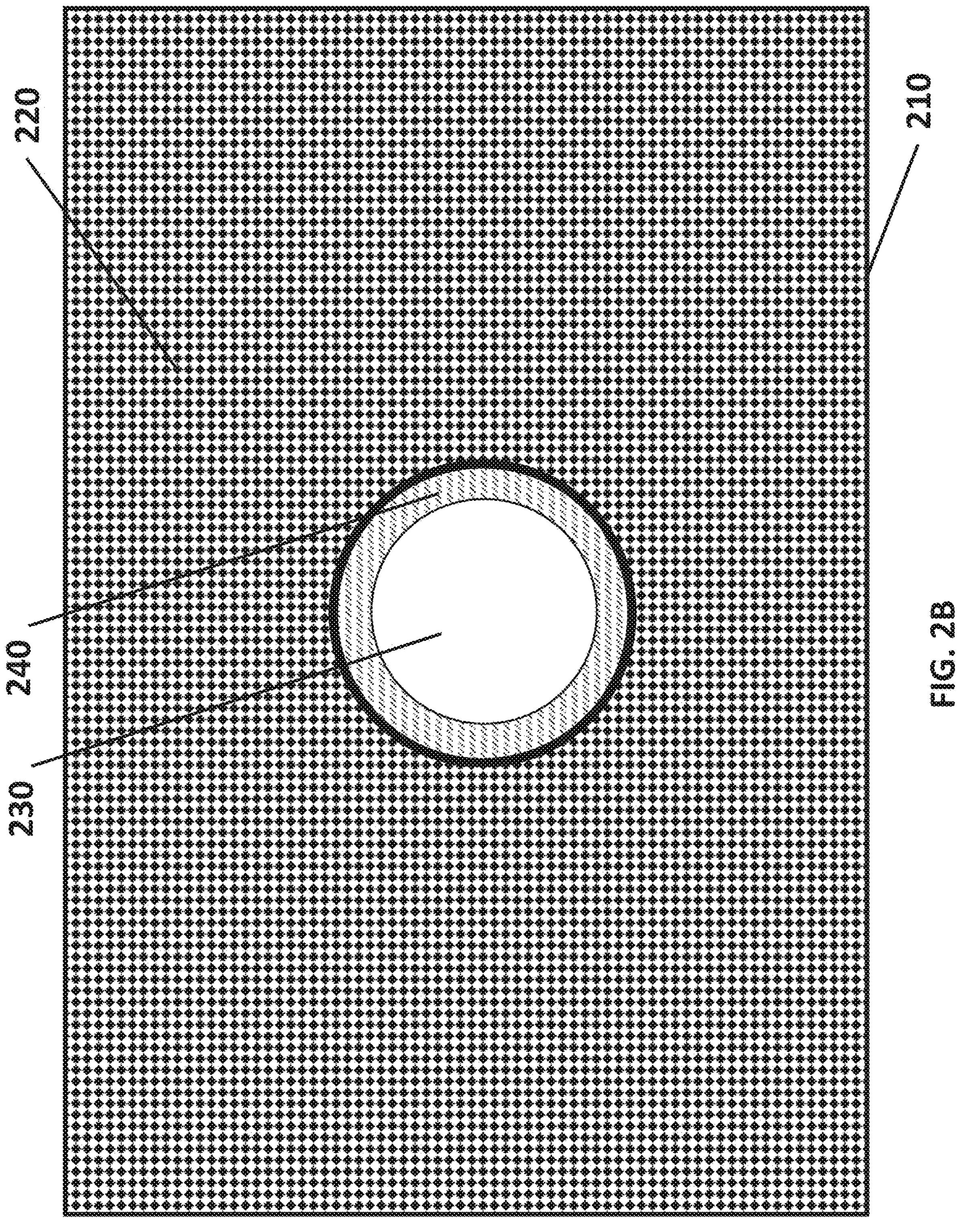
Figure 2C:
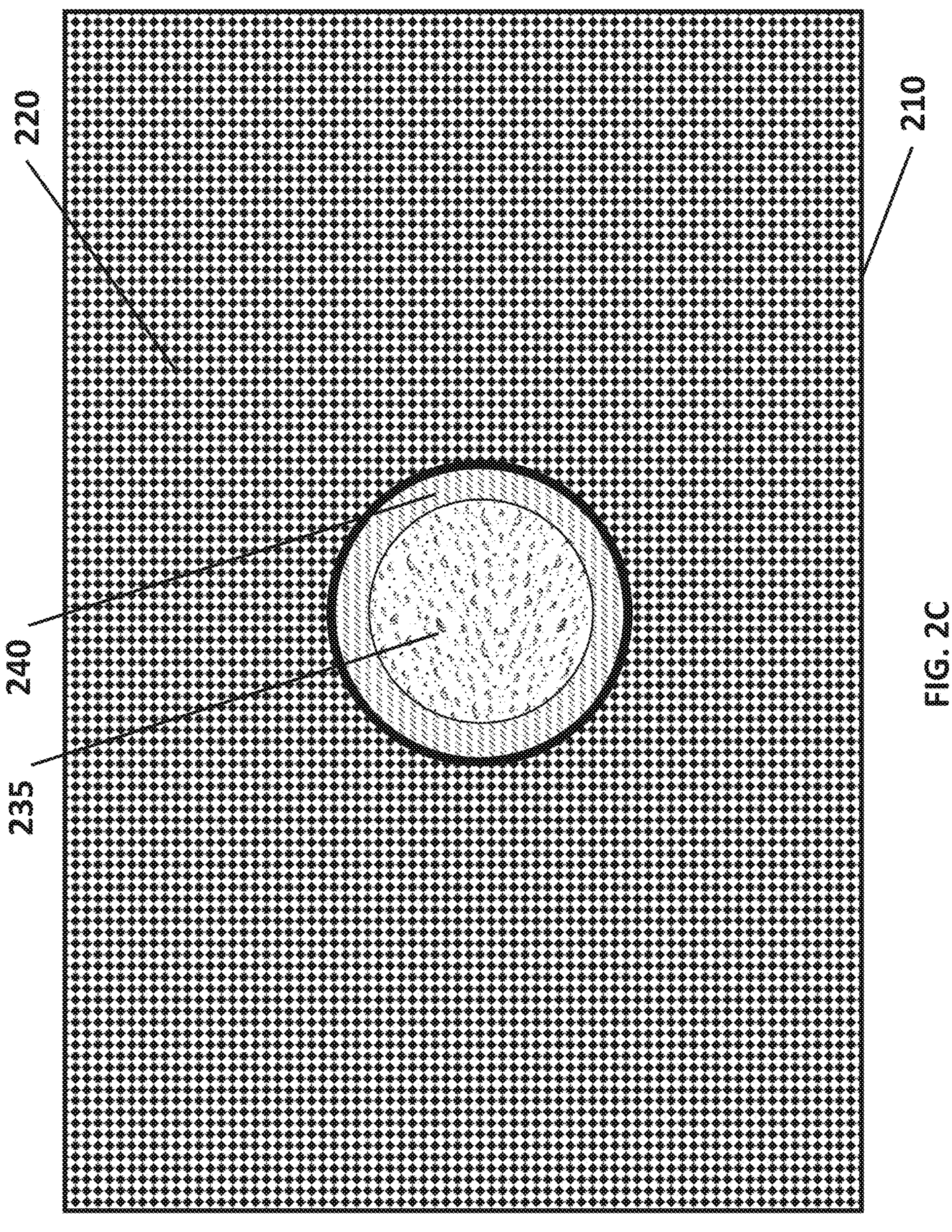
Figure 2D:
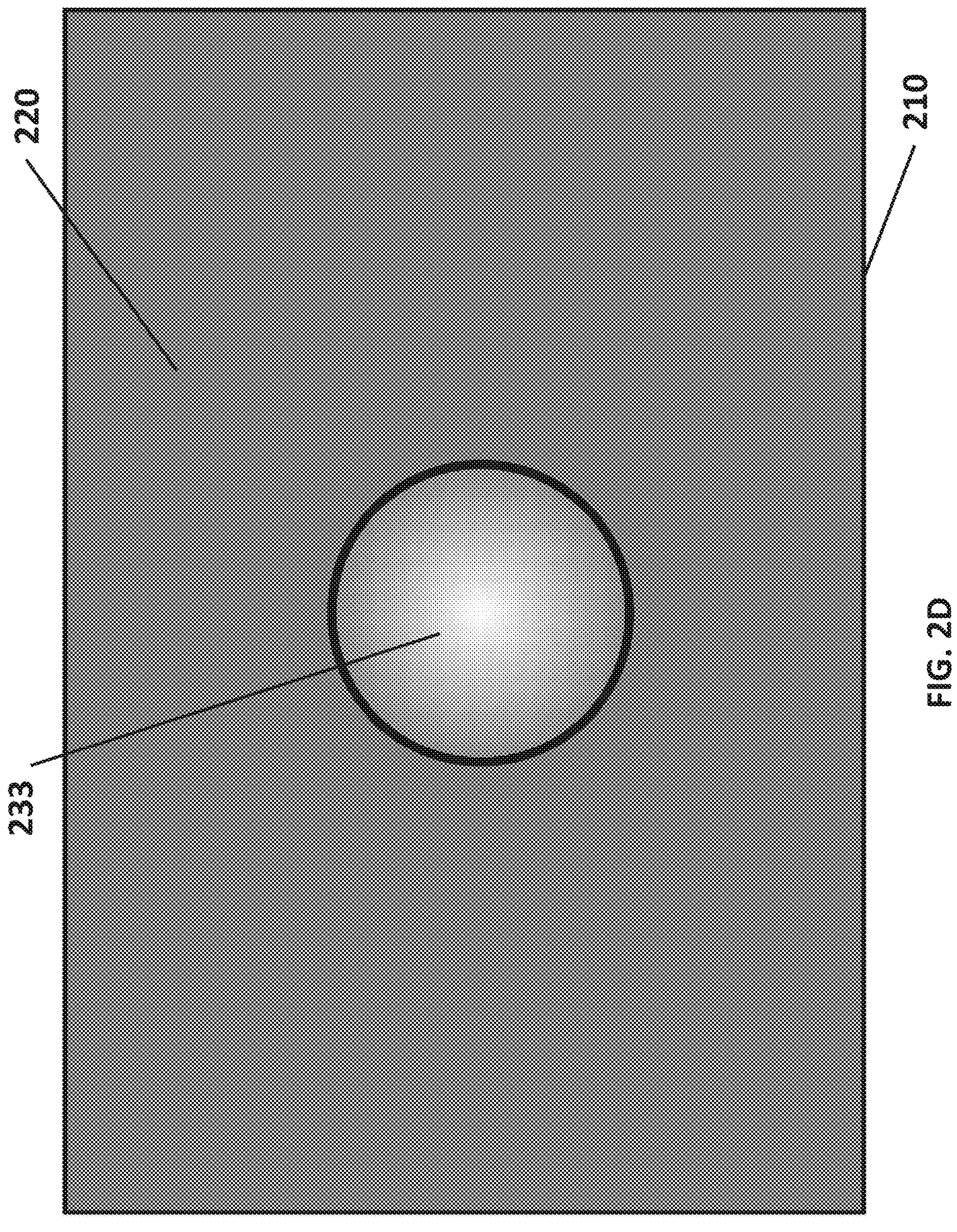
Figure 2E:
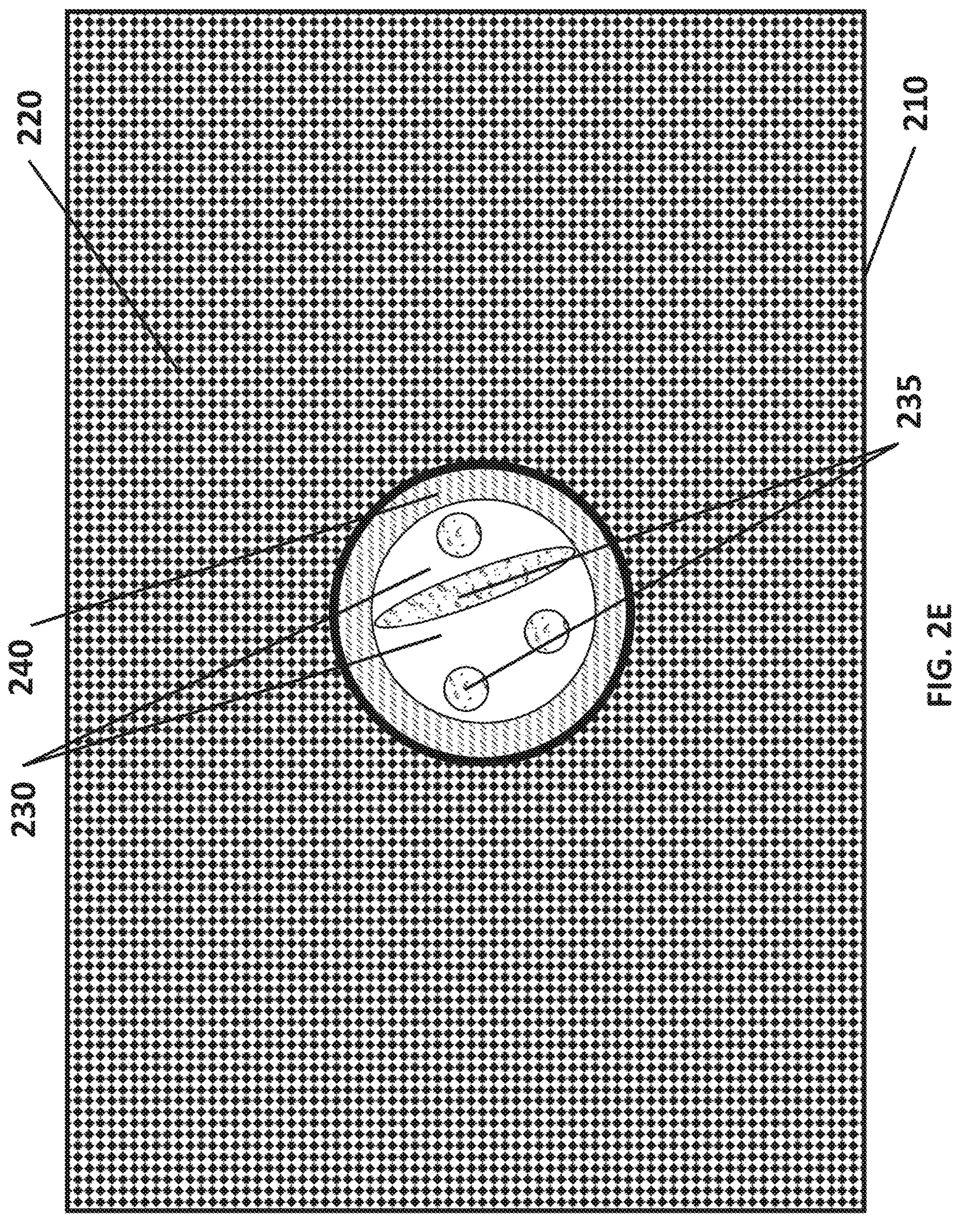

FIGS. 2A-2C illustrate top-down views of a portion of a solid support surface that has received electromagnetic radiation under differing conditions. FIG. 2A depicts a surface 210 containing a substantially uniform layer or coating of molecules 220 and a region of the surface 230 that contains no detectable amount of residual molecules or derivatives thereof from the original substantially uniform layer or coating of molecules. The depicted configuration of FIG. 2A may be formed under a condition of precise irradiation of the region of the surface by an electromagnetic field for a controlled length of time. FIG. 2B shows a surface 210 containing a substantially uniform layer or coating of molecules 220 and a portion of the surface 230 that contains no detectable amount of residual molecules or derivatives thereof from the original substantially uniform layer or coating of molecules, as well as a transitional area of the surface 240 between the fully ablated portion of the surface 230 and the substantially uniform layer or coating of molecules 220. The depicted configuration of FIG. 2B may be formed under a condition such as rapid but intense irradiation by an electromagnetic field, or prolonged heating of the underlying solid support after complete ablation of surface molecules (i.e., removal of all surface-coupled molecules) from the portion of the surface 230. FIG. 2C illustrates a surface 210 containing a substantially uniform layer or coating of molecules 220 and a portion of the surface 235 that contains a detectable amount of residual molecules or derivatives thereof from the original substantially uniform layer or coating of molecules, as well as a transitional area of the surface 240 between the fully ablated portion of the surface 230 and the substantially uniform layer or coating of molecules 220. The detectable amount of residual molecules on the portion of the surface 235 may be spatially or compositionally heterogeneous or homogeneous. The depicted configuration of FIG. 2C may be formed under a condition such as brief or low-intensity irradiation of the portion of the surface 235, thereby not ablating all surface-linked molecules within the portion of the surface 235. FIG. 2D depicts a surface 210 containing a substantially uniform layer or coating of molecules 220 and a portion of the surface 233 with a continuous or semi-continuous variation of spatial and/or compositional density of residual molecules or derivatives thereof from the originally substantially uniform layer or coating of molecules. In some cases, the continuous or semi-continuous variation of spatial and/or compositional density of residual molecules or derivatives thereof may vary from fully ablated at an internal point of the portion of the surface 233 to substantially unaffected at the boundary with the substantially uniform layer or coating of molecules 220. FIG. 2E illustrates a surface 210 containing a substantially uniform layer or coating of molecules 220 and a portion of the surface containing areas of complete ablation 230 of surface-linked molecules and areas that contain a detectable amount of residual molecules or derivatives thereof 235 from the original substantially uniform layer or coating of molecules.

As shown in FIG. 2E, areas of complete ablation 230 of surface-linked molecules and areas that contain a detectable amount of residual molecules or derivatives thereof 235 may be non-continuous (i.e., fully separated from other regions with identical or similar surface chemistry by areas of differing surface chemistry).

An array patterning process may comprise, prior to patterning the array, providing a solid support with a surface coating or layer. In a first configuration, the surface coating or layer may be substantially uniform across a surface of a solid support. In a second configuration, the surface coating or layer may be substantially uniform across an area of a surface of a solid support. In a third configuration, a solid support may comprise a surface with a first area with a first substantially uniform layer or coating and a second area with a second substantially uniform coating or layer. In a particular configuration of the third configuration, the first substantially uniform layer or coating may be the same as the second substantially uniform layer or coating. In another particular configuration of the third configuration, the first substantially uniform layer or coating may differ from the second substantially uniform layer or coating.

A solid support may comprise any suitable material that is configured to receive and/or retain a substantially uniform layer or coating adjacent to a surface of the solid support. A solid support may comprise a rigid substrate or material, such as a glass (e.g., borosilicate glass), a semiconductor (e.g., silicon), a mineral (e.g., fused silica, quartz), a metal (e.g., gold, titanium, silver, copper, tungsten, platinum, etc.), a metal oxide (e.g., titanium oxide, silica, alumina, etc.), or an acrylic. A solid support may comprise a flexible or deformable material, such as a thermoplastic (e.g., polyethylene, polypropylene, etc.) or a hydrogel. In some configurations, a surface or an area of a surface of a solid support may be substantially planar. For example, a solid support may comprise a modest pitch over an entire surface, but the pitch is negligible within an area of the surface where electromagnetic radiation is to be applied by a method set forth herein. In other configurations, a surface or an area of a surface of a solid support may be non-planar. In particular configurations, a surface or an area of a surface of a solid support may comprise a well, pit, depression, or a pore-like structure. For example, a surface or an area of a surface of a solid support may comprise a picowell (e.g., a well with a volume less than about 1 nanoliter (nL), a nanowell (e.g., a well with a volume from about 1 nL to about 999 nL), or a microwell (e.g., a well with a volume greater than about 999 nL). In other particular configurations, a surface or an area of a surface of a solid support may comprise a raised feature. For example, a surface or an area of a surface of a solid support may comprise a pillar, post, ridge, dome, or any other feature that rises above a mean plane that defines the surface or the area of the surface of the solid support.

A method, as set forth herein, may comprise a step of providing a solid support comprising a surface with a substantially uniform layer or coating adjacent to the surface. Providing a solid support comprising a surface with a substantially uniform layer or coating adjacent to the surface may comprise the steps of: a) contacting the surface of the solid support with a plurality of molecules; and b) depositing the plurality of molecules on the surface of the solid support, thereby forming the substantially uniform layer or coating. In some cases, before contacting a surface of a solid support with a plurality of molecules, the surface may comprise a plurality of functional groups that are configured to couple the plurality of molecules. When a plurality of functional groups are present on a surface of a solid support, depositing a molecule of a plurality of molecules on the surface of the solid support may comprise conjugating a complementary functional group of the molecule to a functional group of the plurality of functional groups. For example, a surface-linked functional group may comprise a first member of a Click-type reaction pair and a molecule to be deposited on the surface may comprise a second member of a Click-type reaction pair. In another example, a silicon-containing surface may comprise a plurality of hydroxyl functional groups that are configured to form a covalent bond with a silane reagent (e.g., (3-aminopropyl) trimethoxysilane (APTMS)). Exemplary functional group and complementary functional group pairs may include Click-type reaction pairs, amines and activated esters, and amines and epoxides.

A solid support may be provided with a surface or an area of a surface containing a substantially uniform layer or coating. A layer or coating may be substantially uniform if it can be characterized as possessing a spatial homogeneity on a surface or an area of a surface, a compositional homogeneity on a surface or an area of a surface, a surface property (e.g., layer or coating thickness, hydrophobicity, hydrophilicity, surface electrical charge, etc.) that varies minimally from an average value for a surface or an area of the surface, or a combination thereof. For example, a PEG-functionalized surface of a glass substrate may be characterized as substantially uniform if the PEG surface density varies minimally from an average value of PEG surface density for the entire surface (i.e., no areas of the surface have a local PEG surface density that deviates from an average PEG surface density for the entire surface of no more than about 10%, 9%, 8%, 7%, 6%, 5%, 4%, 3%, 2%, or 1%, etc.). In another example, a PEG-functionalized surface of a glass substrate containing a mixture of linear and branched PEG molecules may be characterized as substantially uniform if the PEG surface densities of both types of PEG molecules vary minimally from average PEG surface densities for both types of PEG molecules for the entire surface (i.e., no areas of the surface have a local PEG surface density for either the linear or branched PEG molecules that deviates from an average PEG surface density for either the linear or branched PEG molecules over the entire surface of no more than about 10%, 9%, 8%, 7%, 6%, 5%, 4%, 3%, 2%, or 1%, etc.). In another example, a PEG-functionalized surface of a glass substrate may be characterized as substantially uniform if a local surface property (e.g., PEG layer thickness) varies by no more than about 10%, 9%, 8%, 7%, 6%, 5%, 4%, 3%, 2%, 1% or less than 1% from an average surface property of the surface or an area of the surface.

Prior to applying electromagnetic radiation, a substantially uniform layer or coating comprising a plurality of molecules may be spatially and/or compositionally homogeneous. In some cases, a substantially uniform layer or coating comprising a plurality of molecules may be spatially homogeneous. For example, a surface may comprise a plurality of molecules containing a first species of molecule and a second species of molecules, in which the respective surface densities of the first molecule and the second molecule at a first area of the surface are substantially identical to the respective surface densities of the first molecule and the second molecule at a second area of the surface (for example, surface density values of comparable species at the first and second areas within about 10%, 5%, 1%, 0.5%, 0.1%, or less than 0.1% of each other). In other cases, a substantially uniform layer or coating comprising a plurality of molecules may be compositionally homogeneous. For example, a surface may comprise a single species of molecule with any detectable impurities beneath a detectable level. In some cases, a plurality of molecules may be spatially and/or compositionally homogeneous if the plurality of molecules contains no detectable amount of an impurity or a fraction comprising multiple impurities. In other cases, a plurality of molecules may be spatially and/or compositionally homogeneous if an impurity or a fraction comprising multiple impurities has a mass or molar fraction below a threshold level relative to the plurality of molecules. A plurality of molecules may comprise an impurity fraction of no more than about 10%, 5%, 1%, 0.5%, 0.1%, 0.01%, 0.001%, 0.0001%, 0.00001%, 0.000001%, or less than about 0.000001% on a mass or molar basis. Alternatively or additionally, a plurality of molecules may comprise an impurity fraction of at least about 0.000001%, 0.00001%, 0.0001%, 0.001%, 0.01%, 0.1%, 0.5%, 1%, 5%, 10%, or more than about 10% on a mass or molar basis. An impurity in a plurality of molecules may comprise any unwanted, unintended, or detrimental chemical species, such as a contaminant, a derivative of a molecule of the plurality of molecules, a degradation product of a molecule of the plurality of molecules, an isomer of a molecule of the plurality of molecules, a concatemer of a molecule of the plurality of molecules, an aggregate of two or more molecules of the plurality of molecules, a solvent molecule, a stabilizer molecule (e.g., a surfactant), or a combination thereof. For example, a surface of a solid support comprising a substantially uniform layer of azide-terminated silanes may comprise a detectable amount (e.g., less than about 1% molar) of an amine-terminated or carboxylate-terminated silane impurity due to decomposition of the azide-terminated silanes during production, storage, or surface deposition.

A substantially uniform layer or coating may comprise a plurality of molecules, in which the plurality of molecules contains a first species of molecule and a second species of molecule. In some cases, a first species of molecule may comprise a first reactive moiety and a second species of molecule may comprise a second reactive moiety (e.g., amine and epoxy, methoxy and azide, etc.). In some cases, a first species of molecule may comprise a reactive moiety and a second species of molecule may comprise a non-reactive moiety (e.g., a coupling moiety, a passivating moiety). For example, a substantially uniform layer may be formed by reacting an initial substantially uniform layer of spatially homogeneous terminal azide moieties with dibenzocyclooctylene (DBCO)-polyethylene glycol (PEG) moieties to form a substantially uniform surface layer comprising a high molar fraction (e.g., 80%, 85%, 90%, 95%, 99%, etc.) of terminal PEG moieties and a lower molar fraction (e.g., 1%, 5%, 10%, 15%, 20%, etc.) of terminal azide moieties (see for example FIG. 3G). In some cases, a a first species of molecule may comprise a first non-reactive moiety and a second species of molecule may comprise a second non-reactive moiety. For example, a substantially uniform layer may comprise a spatially homogeneous mixture of passivating molecules (e.g., PEG) and coupling molecules (e.g., streptavidin) (see for example FIG. 3F).

A solid support may be provided with a surface coating or layer that is adjacent to a surface or an area of the surface of the solid support. A surface coating or layer may be contacted to a surface or an area of the surface of the solid support. A surface coating or layer may be adhered to a surface or an area of the surface of the solid support. A surface coating or layer may be adhered by an adhesion mechanism such as mechanical adhesion, chemical adhesion, dispersive adhesion, electrostatic adhesion, diffusive adhesion, or a combination thereof. In some configurations, a surface coating or layer may be formed by a method such as vapor-phase deposition, liquid-phase deposition, atomic layer deposition, molecular layer deposition, or a combination thereof. A surface coating or layer may be adhered to a surface or an area of a surface of a solid support by one or more covalent bonds (e.g., covalent bonding of a silane reagent to a silicon or glass surface).

A solid support may be provided with a surface that is substantially flat or planar. A solid support may be provided with a surface that is not flat or planar. A solid support may be provided with a surface that comprises one or more structured features, such as a raised feature (e.g., a ridge, a pillar, a post) or an indented feature (e.g., a well, a trough, a pore, etc.). A solid support may be provided with a surface that comprises one or more nanostructured features. A nanostructured feature may be formed by a lithographic method. A solid support may comprise a material that intrinsically comprises surface features (e.g., nanoparticles embedded in a matrix, etc.). A solid support with a structured feature may comprise a plurality of structured features. A plurality of structured features may comprise an ordered or patterned array of structured features. A plurality of structured features may comprise an unordered or random array of structured features. Applying electromagnetic radiation to a surface of a solid support may comprise applying electromagnetic radiation to a structured feature of the surface. For example, electromagnetic radiation may be selectively applied to the raised surfaces of a plurality of nanostructured pillars on an ordered array of pillars. Alternatively, electromagnetic radiation may be selectively applied to the depressed surfaces of a plurality of nanostructured pillars on an ordered array of pillars.

A solid support may be provided with a surface coating or layer that comprises a material that alters a chemistry before, during, or after applying electromagnetic radiation to a surface of the solid support. In some configurations, a surface coating or layer may comprise a photodegradation catalyst. A photodegradation catalyst may comprise an organic photodegradataion catalyst or an inorganic photodegradation catalyst. An inorganic photodegradation catalyst may comprise a metal or metal oxide (e.g., Cu, Ti, Pd, Pt, $TiO_2$, ZnO, $Nb_2O_5$, etc.). Exemplary photodegradation catalyst materials and systems are described in Kou, et al, "Selectivity Enhancement in Heterogeneous Photocatalytic Transformations," *Chem. Rev*. (2017), Schneider, et al., "Understanding $TiO_2$ Photocatalysis: Mechanisms and Materials," *Chem. Rev*., (2014), and Fagnoni, et al., "Photocatalysis for the Formation of the C—C Bond," *Chem. Rev*. (2007), each of which is incorporated by reference in its entirety. In other configurations, a surface coating or layer may comprise a photodegradation inhibitor. A photodegradation inhibitor may comprise a light absorbing material, a radical scavenger, a photoquencher, a pigment, or a combination thereof. A photodegradation inhibitor may be an inorganic photodegradation inhibitor or an organic photodegradation inhibitor. Exemplary photodegradation inhibitor materials and systems are described in Yousif, et al., "Photodegradation and Photostabilization of Polyers, Especially Polystyrene: Review," SpringerPlus (2013), which is incorporated by reference in its entirety.

Figure 10A:
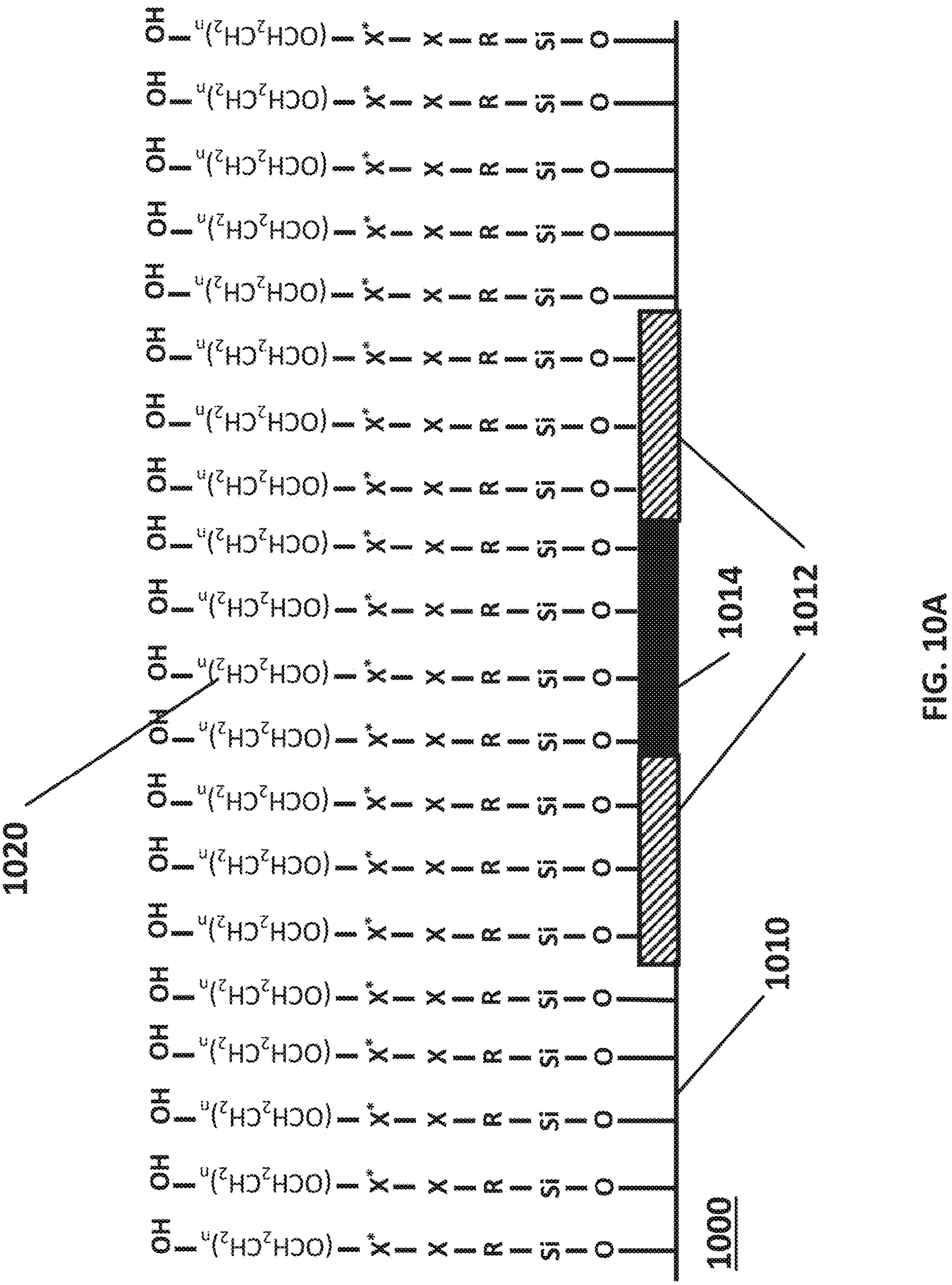
FIGS. 10A, 10B, and 10C depict steps of a method for forming a spatially and/or compositionally heterogeneous region on a surface that contains photoreactive materials, in accordance with some embodiments.
Figure 10B:
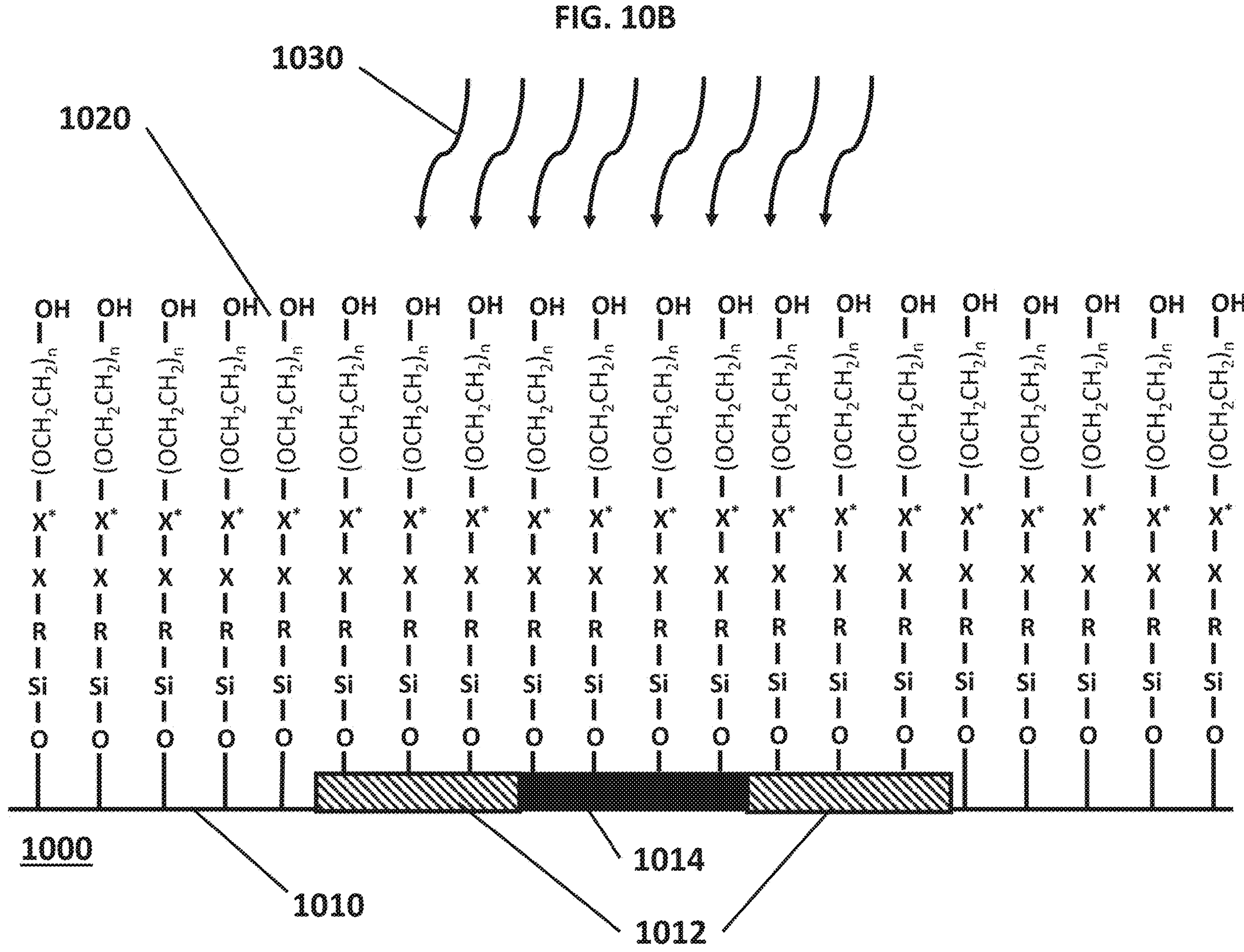
Figure 10C:
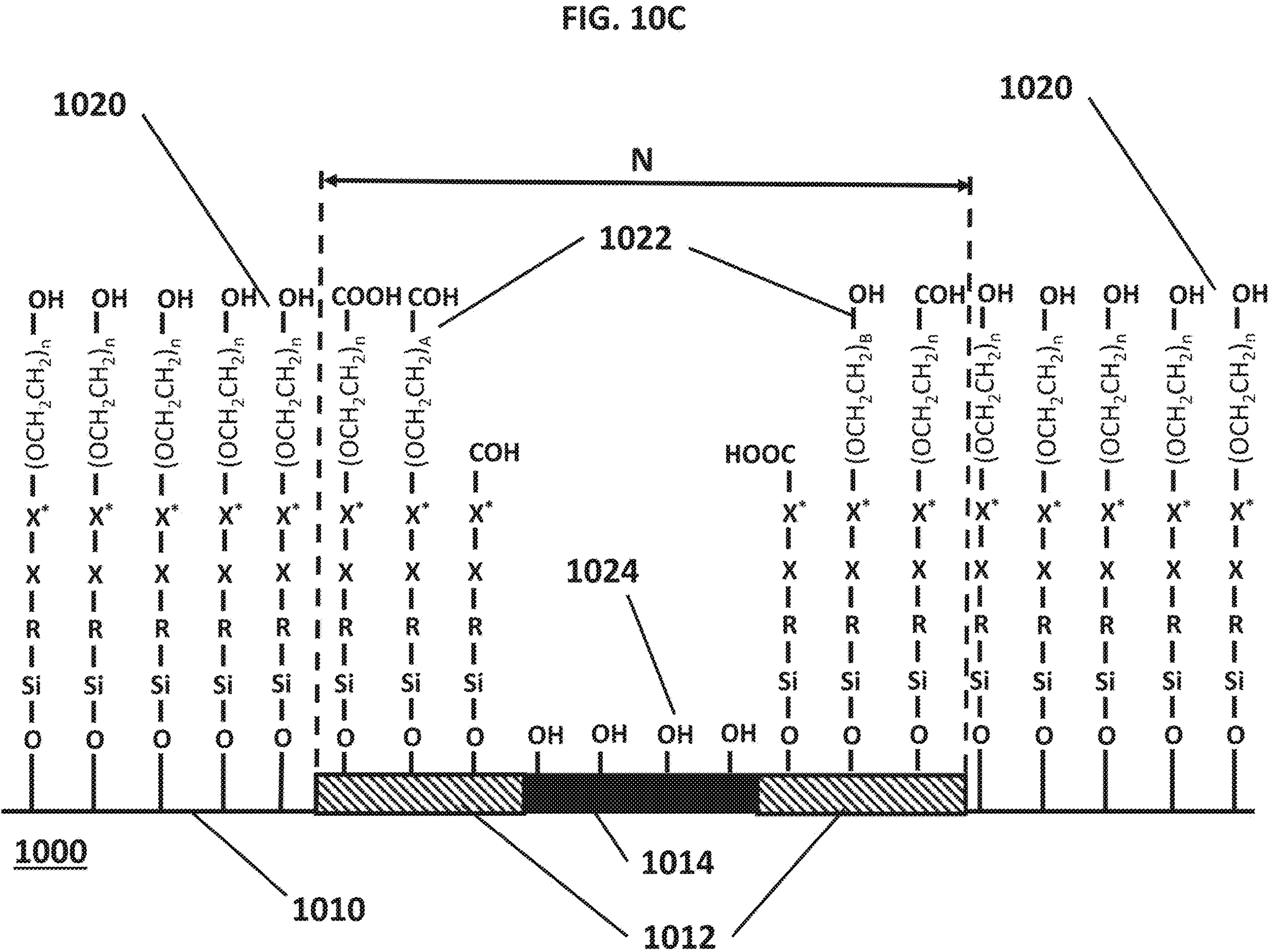

A photoreactive material (e.g., a photodegradation catalyst, a photodegradation inhibitor) may be deposited on a solid support or an area thereof. A photoreactive material may be deposited in a uniform manner (e.g., a homogeneous surface density of the photoreactive material). A photoreactive material may be deposited in a random manner. A photoreactive material may be deposited in a patterned or ordered manner. FIGS. 10A-10C depict steps of a method for forming a region comprising a spatially and/or compositionally heterogeneous plurality of molecules on a solid support containing a one or more photoreactive materials. FIG. 10A illustrates providing a solid support 1000 comprising a surface 1010 with a substantially uniform layer 1020 of PEG moieties. Adjacent to the surface 1010 is a deposited area of a photodegradation catalyst 1014 that is surrounded by areas of photodegradation inhibitor 1012. FIG. 10B illustrates a step of applying electromagnetic radiation 1030 to a portion of the solid support 1000 comprising the substantially uniform layer 1020 of PEG moieties. FIG. 10C depicts a resulting region N comprising a spatially and/or compositionally heterogeneous plurality of molecules. The region N may comprise areas of complete ablation or residual surface-linked functional groups 1024, and areas of surface-linked molecules 1022, including molecules of the originally-present plurality of PEG moieties from the substantially uniform layer 1020, and derivates thereof. The derivative molecules of the surface-linked molecules 1022 may include cleaved or adduct PEG derivatives of chain length A or B, where (A≤n≤B), and oxidized variants thereof.

A surface coating or layer may comprise a monolayer, such as a self-assembled monolayer. A surface coating or layer may comprise a bilayer or polylayer. A surface coating or layer may comprise a plurality of atoms, molecules, or particles. A plurality of atoms, molecules, or particles within a surface coating or layer may be compositionally heterogeneous if the plurality of atoms, molecules or particles contains more than one type or species of atom, molecule, or particle. For example, a compositionally heterogeneous surface layer may comprise a mixture of (3-aminopropyl) trimethoxysilane (APTMS) and (3-gylcidyloxypropyl) trimethoxysilane (GOPS). A plurality of atoms, molecules, or particles within a surface coating or layer may be compositionally homogeneous if the plurality of atoms, molecules or particles contains no detectable chemical impurities, or contains a detectable chemical impurity beneath a threshold value for a chemical impurity content (e.g., no more than about 10%, 5%, 1%, 0.5%, 0.1%, 0.01%, 0.001%, 0.0001%, 0.00001%, 0.000001%, or less than 0.000001% on a mass or molar basis). For example, a PEG surface layer with an average PEG molecular weight of 5000 Daltons (Da) may be considered compositionally homogeneous if no more than about 10% of PEG molecules in the surface layer deviate by more than #1000 Da from the average PEG molecular weight. A compositionally heterogeneous surface layer or coating may comprise a first molecule comprising a passivating moiety and a second molecule comprising a coupling moiety. A compositionally heterogeneous surface layer or coating may comprise a first molecule comprising a first passivating moiety and a second molecule comprising a second passivating moiety, in which the first passivating moiety differs from the second passivating moiety. A compositionally heterogeneous surface layer or coating may comprise a first molecule comprising a first coupling moiety and a second molecule comprising a second coupling moiety, in which the first coupling moiety differs from the second coupling moiety. A compositionally heterogeneous surface layer or coating may comprise a first plurality of molecules comprising a passivating moiety and a second plurality of molecules that do not contain a passivating moiety. A compositionally heterogeneous surface layer or coating may comprise a first plurality of molecules comprising a coupling moiety and a second plurality of molecules that do not contain the coupling moiety. In some particular configurations, a compositionally heterogeneous surface layer may comprise a first plurality of molecules comprising a reactive coupling moiety and a second plurality of molecules that do not contain the reactive coupling moiety. For example, an area of a surface may comprise a spatially homogeneous mixture of azide-terminated silanes and non-reactive alkyl silanes.

A plurality of atoms, molecules, or particles within a surface coating or layer may be structurally heterogeneous if the plurality of atoms, molecules or particles contains more than one type of atomic, molecular, or particle structure. For example, a surface coating comprises a plurality of metal atoms may be considered structurally heterogeneous if the plurality of atoms arrange into more than one crystal structure. A plurality of atoms, molecules, or particles within a surface coating or layer may be structurally homogeneous if the plurality of atoms, molecules or particles contains no detectable structural impurities, or contains a detectable structural impurity beneath a threshold value for a structural impurity content (e.g., no more than about 10%, 5%, 1%, 0.5%, 0.1%, 0.01%, 0.001%, 0.0001%, 0.00001%, 0.000001%, or less than 0.000001% on a mass or molar basis). For example, a surface containing a layer of linear PEG molecules may be considered structurally homogeneous if the PEG molecules contain less than about 10% branched PEG molecules by weight.

A surface coating or layer may comprise any suitable chemical species. A chemical species that forms a surface coating or layer on a solid support may be selected based upon the chemistry of the solid support. For example, a silane reagent may be selected for deposition on a silicon-containing substrate. In another example, a phosphate or phosphonate reagent may be selected for deposition on a metal oxide substrate (e.g., zirconium oxide). A surface coating or layer may comprise an organic chemical species, an inorganic species, an organometallic species, or a combination thereof. A surface coating or layer may comprise a passivating molecule that is configured to inhibit non-specific binding of other molecules to a surface at which the passivating molecule is attached. A passivating molecule may prevent non-specific binding of other molecules to a surface by a mechanism such as steric obstruction, electrostatic repulsion, or magnetic repulsion. A passivating molecule may comprise a hydrophilic moiety. A passivating molecule may comprise a hydrophobic moiety. A passivating molecule may comprise a macromolecule. Exemplary passivating molecules may include polyethylene glycols (PEGs), linear alkyl moieties, branched alkyl moieties, fluorinated hydrocarbons, linear polysaccharides (e.g., cellulose), and branched polysaccharides (e.g., dextrans). A surface coating or layer comprising a plurality of passivating molecules may comprise a mixture of species of passivating molecules. For example, a PEG surface layer may comprise a plurality of PEG molecules with a broad molecular weight distribution. In another example, a surface coating may comprise a mixture of molecules with linear and branched structures (e.g., linear PEG and PEG-ylated dendrimers). A surface coating or layer may comprise a coupling molecule that is configured to form a specific binding interaction with another molecule. A coupling molecule may be configured to form a covalent bonding interaction. For example, a coupling molecule may comprise a reactive moiety, such as a Click-type reactive moiety. Exemplary reactive moieties may include functional groups such as activated esters, acyl groups, aldehydes, alkenes, alkynes, amines, azides, boronates, carboxylic acids, cyanates, epoxides, imines, nitrates, nitriles, oximes, phosphates, sulfoxides, thiocyanates, thioesters, thiols, and combinations thereof. A coupling molecule may be configured to form a non-covalent binding interaction, such as an electrostatic interaction, a magnetic interaction, hydrogen bonding, or receptor-ligand binding. Exemplary coupling molecules that may be configured to form a non-covalent binding interaction include electrically-charged molecules (e.g., amines), magnetic nanoparticles, nucleic acids (e.g., DNA oligonucleotides), and a member of a receptor-ligand binding pairs (e.g., streptavidin-biotin, SpyCatcher-SpyTag, SnoopCatcher-SnoopTag, SdyCatcher- SdyTag, etc.). A surface coating or layer may comprise a plurality of molecules, in which the plurality of molecules contains a first species of passivating molecule and a second species of passivating molecule. A surface coating or layer may comprise a plurality of molecules, in which the plurality of molecules contains a first species of coupling molecule and a second species of coupling molecule. A surface coating or layer may comprise a plurality of molecules, in which the plurality of molecules contains a passivating molecule and a coupling molecule.

Figures 3A, 3B:
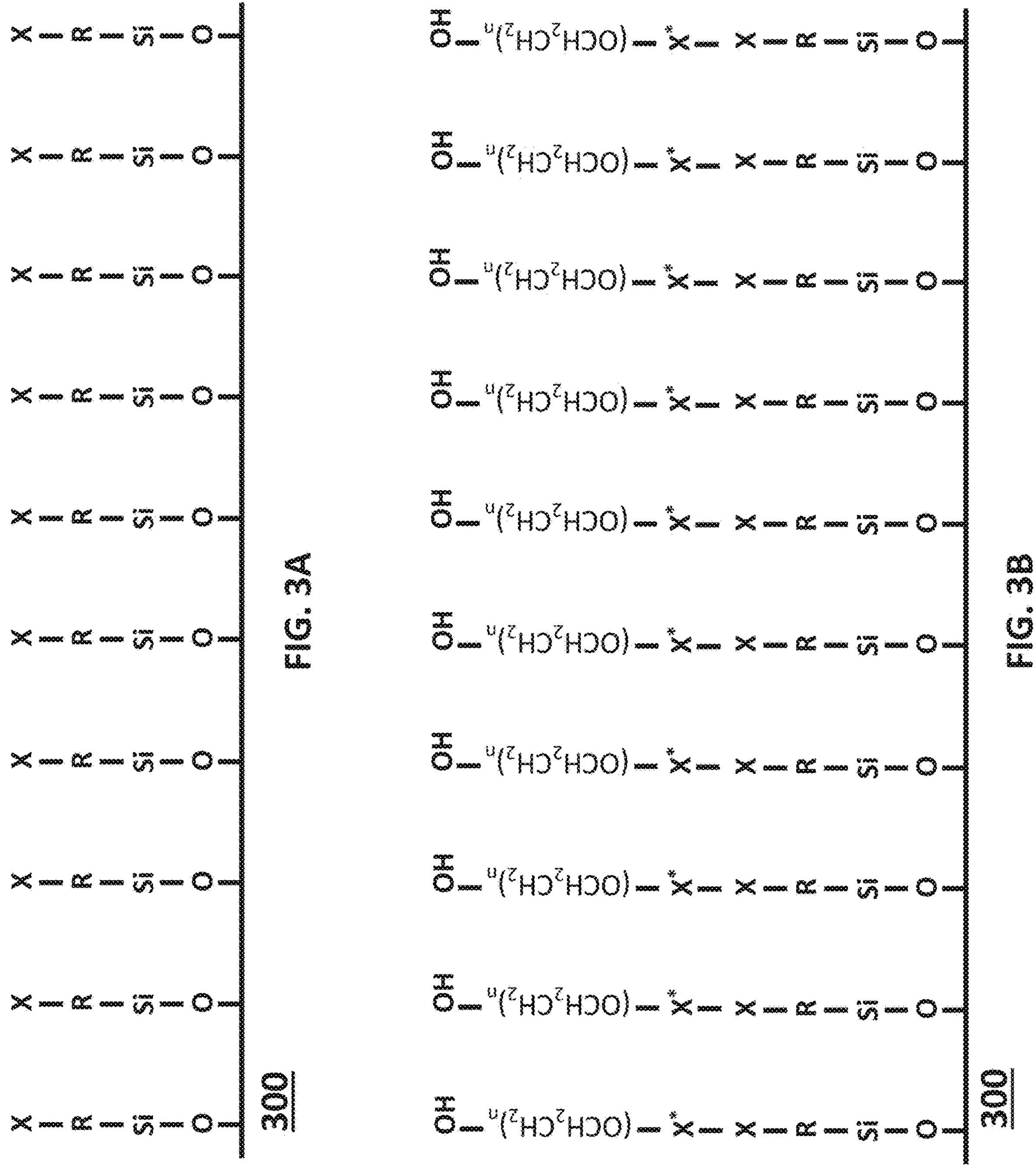
Figure 3C:
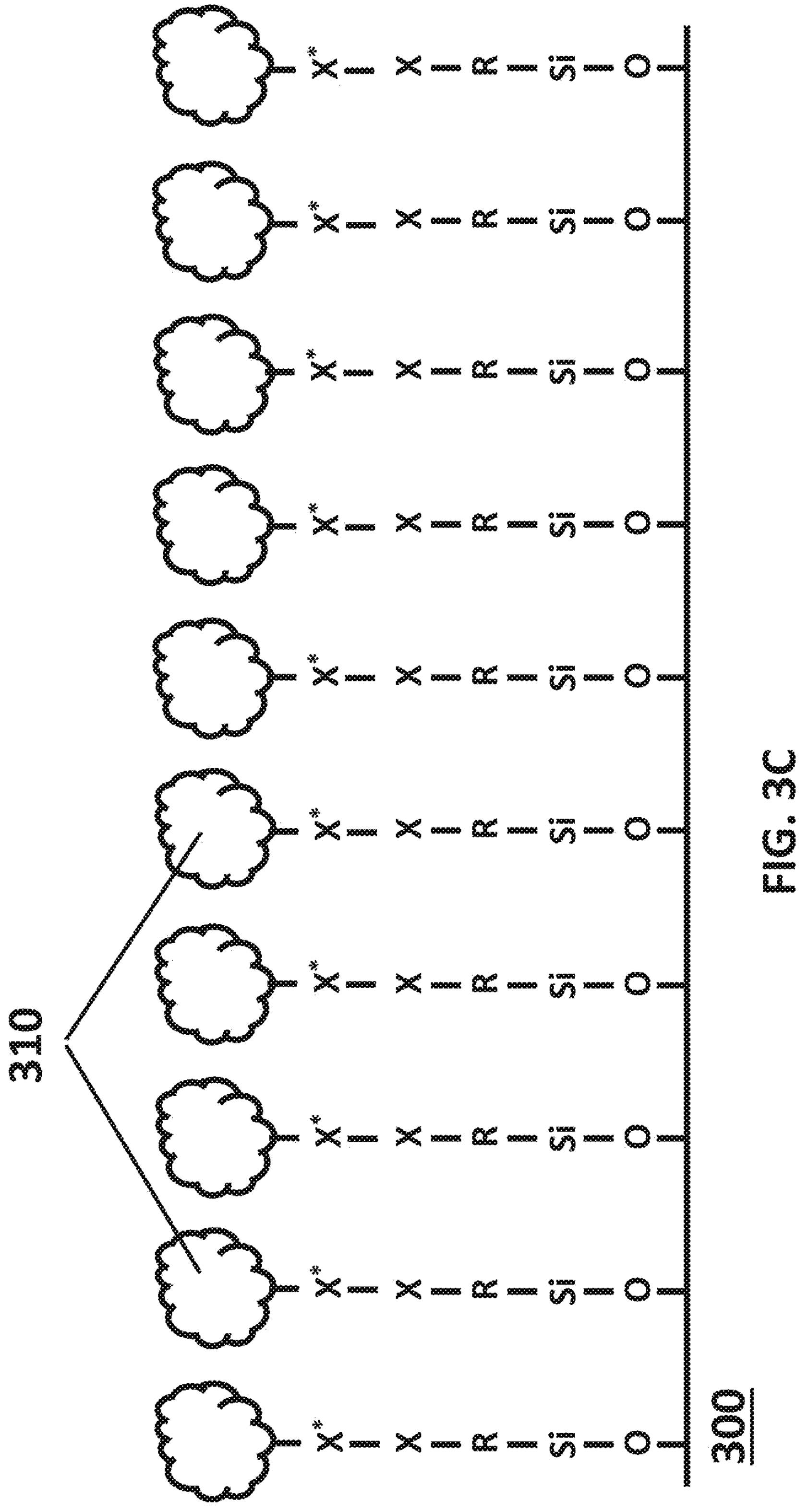
Figure 3D:
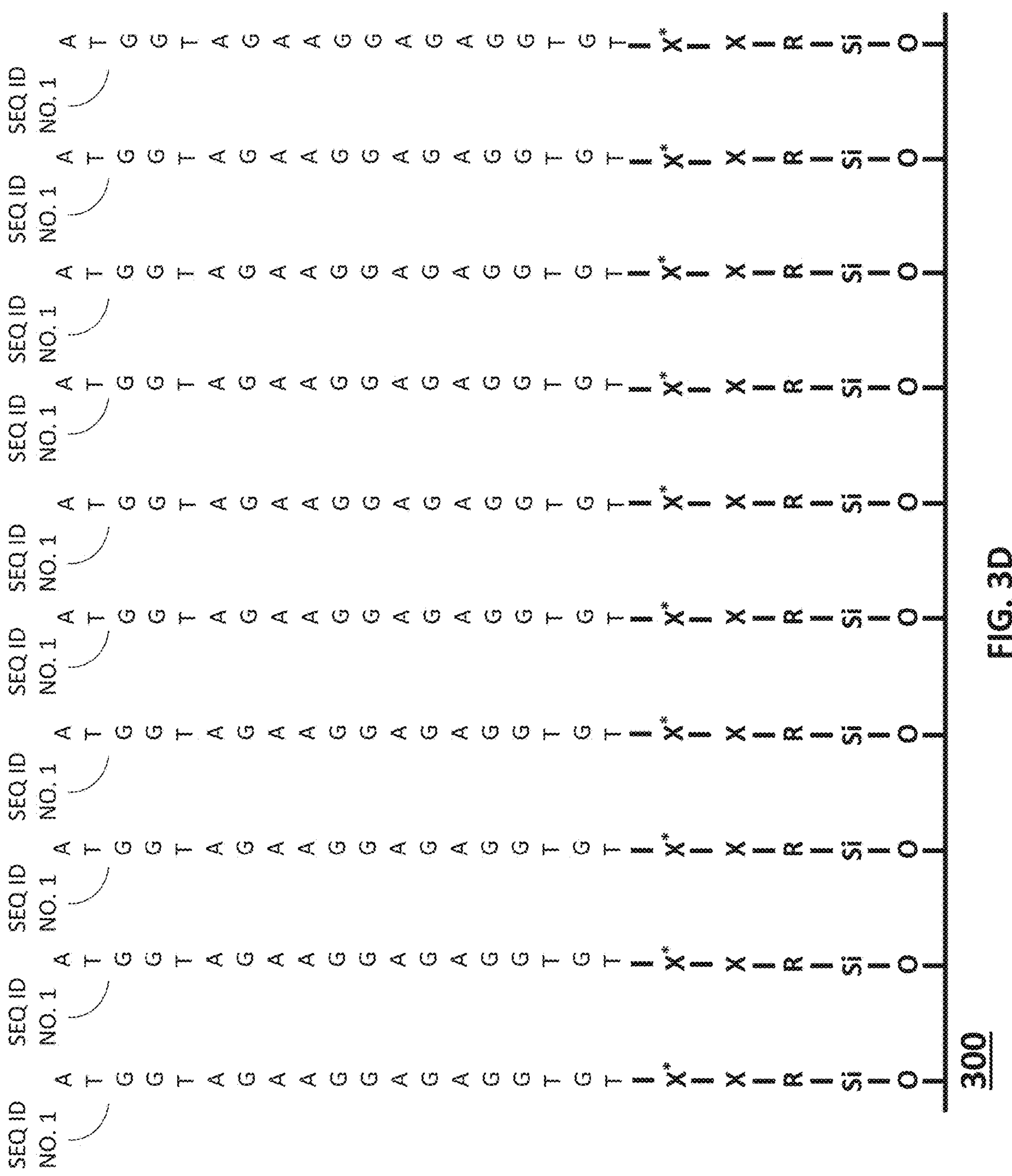
Figure 3E:
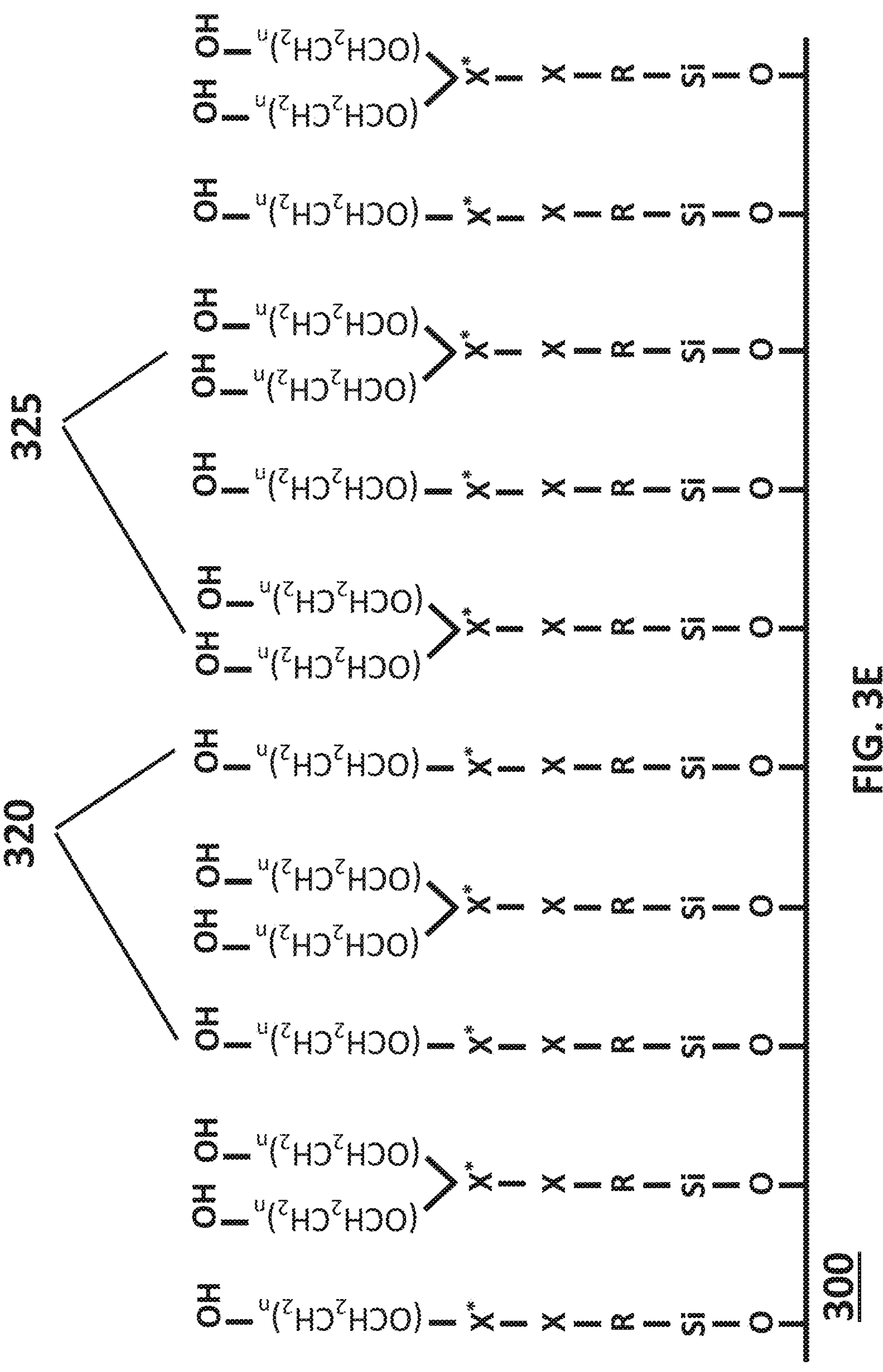
Figure 3F:
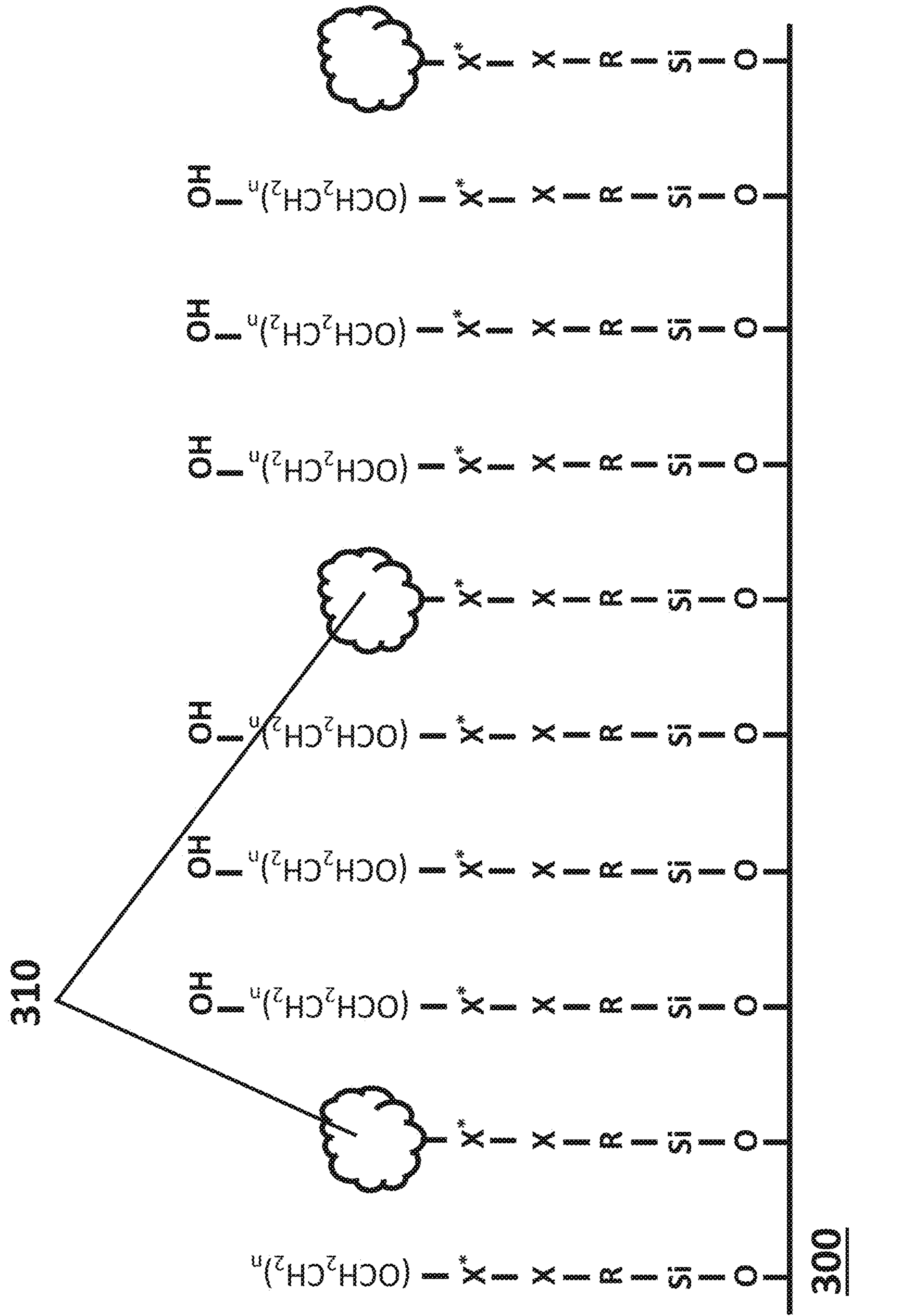

FIGS. 3A-3D depict examples of a surface 300 with a surface coating or layer, in accordance with some embodiments set forth herein. FIG. 3A depicts a surface 300 of a solid support (e.g., glass, silicon) with a substantially uniform layer of covalently-bonded silane molecules. Each silane molecule contains a linker or chain moiety R (e.g., an alkyl group, a fluorinated alkyl group, PEG, a secondary amine, etc.) and a terminal moiety X (e.g., a reactive moiety, a primary amine, etc.). Based upon the selection of the R and X moieties, the plurality of molecules may comprise passivating molecules and/or coupling molecules. FIG. 3B depicts a surface 300 with a substantially uniform layer of passivating PEG molecules. The surface 300 of FIG. 3B may be formed by reacting a plurality of surface-linked molecules containing reactive X moieties, as depicted in FIG. 3A, with PEG molecules having a structure of X*—$(OCH_2CH_2)_n$—OH, where X* is a complementary reactive moiety to reactive moiety X. For example, a surface 300 provided with a substantially uniform layer of azide-terminated silane molecules may be reacted with dibenzocyclooctylene (DBCO)-terminated PEG molecules, thereby conjugating the PEG molecules to the silane molecules by a Click-type DBCO-azide reaction. FIG. 3C depicts a surface 300 containing a substantially uniform surface layer of coupling molecules 310 (e.g., streptavidin, SpyCatcher, etc.). The substantially uniform layer of coupling molecules may be formed by a similar reactive strategy as described for FIG. 3B. FIG. 3D depicts a surface 300 containing a substantially uniform surface layer of coupling oligonucleotides. The substantially uniform layer of coupling oligonucleotides may be formed by a similar reactive strategy as described for FIG. 3B (e.g., DBCO-terminated oligonucleotides contacted with a plurality of surface-linked, azide-terminated silane molecules). FIG. 3E depicts a surface 300 containing a substantially uniform surface layer, in which the substantially uniform layer comprises a spatially-uniform mixture of linear PEG chains 320 and branched PEG chains 325. FIG. 3F depicts a surface 300 containing a substantially uniform surface layer, in which the substantially uniform layer comprises a spatially-uniform mixture of linear PEG chains and coupling molecules 310 (e.g., streptavidin, oligonucleotides, reactive moieties, etc.). The substantially uniform layers of depicted in FIG. 3E or 3F may be formed by a similar reactive strategy as described for FIG. 3B, in which the relative stoichiometry of surface-linked molecules may be controlled by a ratio of groups reacted with the initial reactive surface layer of FIG. 3A. Alternatively, an initial surface layer may be formed comprising two orthogonal reactive moieties, followed by reaction of differing moieties containing complementary reactive handles to the two orthogonal reactive moieties, thereby controlling the selectivity of deposition of the differing moieties. FIG. 3G depicts a surface 300 containing a substantially uniform surface layer, in which the substantially uniform layer comprises a spatially-uniform mixture of linear PEG chains and unreacted reactive moieties. The substantially uniform layers of depicted in FIG. 3G may be formed by incomplete reaction of the PEG chain moieties with a reactive surface such as the one depicted in FIG. 3A, for example due to limited reaction time or limiting quantities of the PEG chain moieties. The skilled person will readily recognize that a surface comprising a uniform layer of molecules may be formed by any suitable method, including single-step and multi-step methods. For example, a surface as depicted in FIG. 3B may be formed by a single-step deposition of a PEGylated silane, or by deposition of a functionalized silane (as shown in FIG. 3A), followed by reaction of the functionalized silane with a reactive PEG moiety.

In an aspect, provided herein is a method comprising the steps of: a) providing a solid support comprising a surface and a substantially uniform layer on the surface, wherein the substantially uniform layer comprises a plurality of molecules that are coupled to the surface, and b) applying electromagnetic radiation to a region of the surface to disrupt a first subset of the plurality of molecules within the region of the surface, wherein the region of the surface retains a second subset of the plurality of molecules or a derivative thereof after applying the electromagnetic radiation to the region of the surface.

A method, as set forth herein, may include a step of applying electromagnetic radiation to a region of a surface of a solid support. The application of electromagnetic radiation may disrupt or alter one or more molecules of a substantially uniform layer containing a plurality of molecules on a surface of a solid support. Disruption and/or alteration of surface-linked molecules by the application of electromagnetic radiation to a surface of a solid support may proceed by numerous chemical and/or physical mechanisms. In some cases, a molecule may be cleaved from a surface by absorption of a photon of electromagnetic radiation such that the entire molecule is separated from the surface. In another case, a molecule may be cleaved from a surface by absorption of a photon of electromagnetic radiation such that a first moiety of the molecule remains linked to the surface while a second moiety of the molecule is separated from the surface. In another case, a molecule may be cleaved from a surface by absorption of a photon of electromagnetic radiation such that a first moiety of the molecule remains linked to the surface while a second moiety of the molecule separates from the molecule then reacts with the surface to form two surface-linked molecules. In another case, a molecule may be fragmented into two or more vapor-phase species by absorption of two or more photons. The two or more vapor-phase species may be separated from the surface, or may react with the surface or other surface-linked molecules. Additionally, disruption or alteration of surface-linked molecules may occur by thermal mechanisms. In some cases, heating of a surface may occur due to application of electromagnetic radiation, thereby altering or disrupting one or more surface-linked molecules. Alterations and/or disruptions of surface-linked molecules may include partial or complete cleavage of molecules from the surface, and/or condensation reactions that form aromatic moieties and other condensed species. In another case, thermal energy may be transferred from molecules directly affected by electromagnetic radiation (e.g., molecules within a focal point of an electromagnetic beam) to molecules that are not directly affected by electromagnetic radiation. Molecular cleavage or fragmentation products (e.g., reactive species such as radicals, ions, oxidized products, etc.) may be diffused or convected through non-irradiated, surface-linked molecules, thereby causing partial or complete cleavage of molecules or formation and/or deposition of condensation products or adducts at non-irradiated areas of a surface. In another case, if electromagnetic radiation is applied to a surface in the presence of oxygen or other oxidizing species, partial or complete combustion of a surface-linked molecule may occur. Combustion of a surface-linked molecule may cause fragmentation of a molecule, as well as formation of vapor-phase species that are capable of transferring thermal energy or reacting with other surface-linked molecules. In some cases, a first molecule may be disrupted or altered by a first physical mechanism, and a second molecule may be disrupted or altered by a second physical mechanism, in which the first physical mechanism and the second physical mechanism differ, thereby forming a spatially and/or compositionally heterogeneous layer on a region of a surface. In some cases, a first molecule may be disrupted or altered by a first physical mechanism, and a second molecule may be disrupted or altered by a second physical mechanism, in which the first physical mechanism and the second physical mechanism differ but form the same product, thereby forming a spatially and/or compositionally heterogeneous layer on a region of a surface. For example, a first surface-linked PEG moiety may be cleaved at a specific location of its PEG chain by a photochemical mechanism, and a second surface-linked PEG moiety may be cleaved at the same specific location of its PEG chain by a thermal mechanism, thereby forming two cleaved PEG moieties with identical chain lengths. In some cases, a first molecule may be disrupted or altered by a first physical mechanism, and a second molecule may be disrupted or altered by a second physical mechanism, in which the first physical mechanism and the second physical mechanism are the same, thereby forming a spatially and/or compositionally heterogeneous layer on a region of a surface. In some cases, a first molecule may be disrupted or altered by a first physical mechanism, and a second molecule may be disrupted or altered by a second physical mechanism, in which the first physical mechanism and the second physical mechanism are the same but form differing products, thereby forming a spatially and/or compositionally heterogeneous layer on a region of a surface. For example, a first surface-linked PEG moiety may be cleaved at a specific location of its PEG chain by a photochemical mechanism, and a second surface-linked PEG moiety may be cleaved at a different specific location of its PEG chain by the photochemical mechanism, thereby forming two cleaved PEG moieties with differing chain lengths.

Application of electromagnetic radiation to a surface or an area of a surface of a solid support comprising a substantially homogeneous layer containing a plurality of molecules may facilitate the formation of a derivative molecule of a molecule of the plurality of molecules. A derivative molecule may comprise a cleavage product, an elimination product, an addition product, an adduct, a condensation product, and oxidation product, a reduction product, or a combination thereof of a molecule of a plurality of molecules. For example, a derivative of a surface-linked, high molecular weight, linear PEG molecule may comprise a cleaved PEG chain with a terminal oxidized functional group on the cleaved PEG chain. FIG. 4 depicts examples of PEG derivative molecules that may arise due to electromagnetic irradiation in the presence of an oxidizing species (e.g., air, oxygen, water, carbon dioxide, carbon monoxide, etc.). Cleavage of PEG chains may facilitate formation of an oxidized functional group (e.g., a carboxylic acid, aldehyde, ester, or alcohol) at a cleavage site. Reaction of cleaved PEG chains with other cleaved PEG chains may facilitate adduct formation. Thermal condensation of cleaved PEG chains may facilitate condensation, thereby forming an aromatic moiety. Oxidation of condensed aromatic moieties may facilitate the formation of phenolic moieties within PEG chains. The skilled person will readily recognize innumerable variations of the species depicted in FIG. 4 that may arise due to chemical and/or physical mechanisms induced by electromagnetic irradiation of a plurality of molecules. The skilled person will further recognize similarly diverse groups of derivative molecules that may arise from the electromagnetic irradiation of other surface-linked species, such as alkyl chains or fluorinated alkyl chains.

Figure 5A:
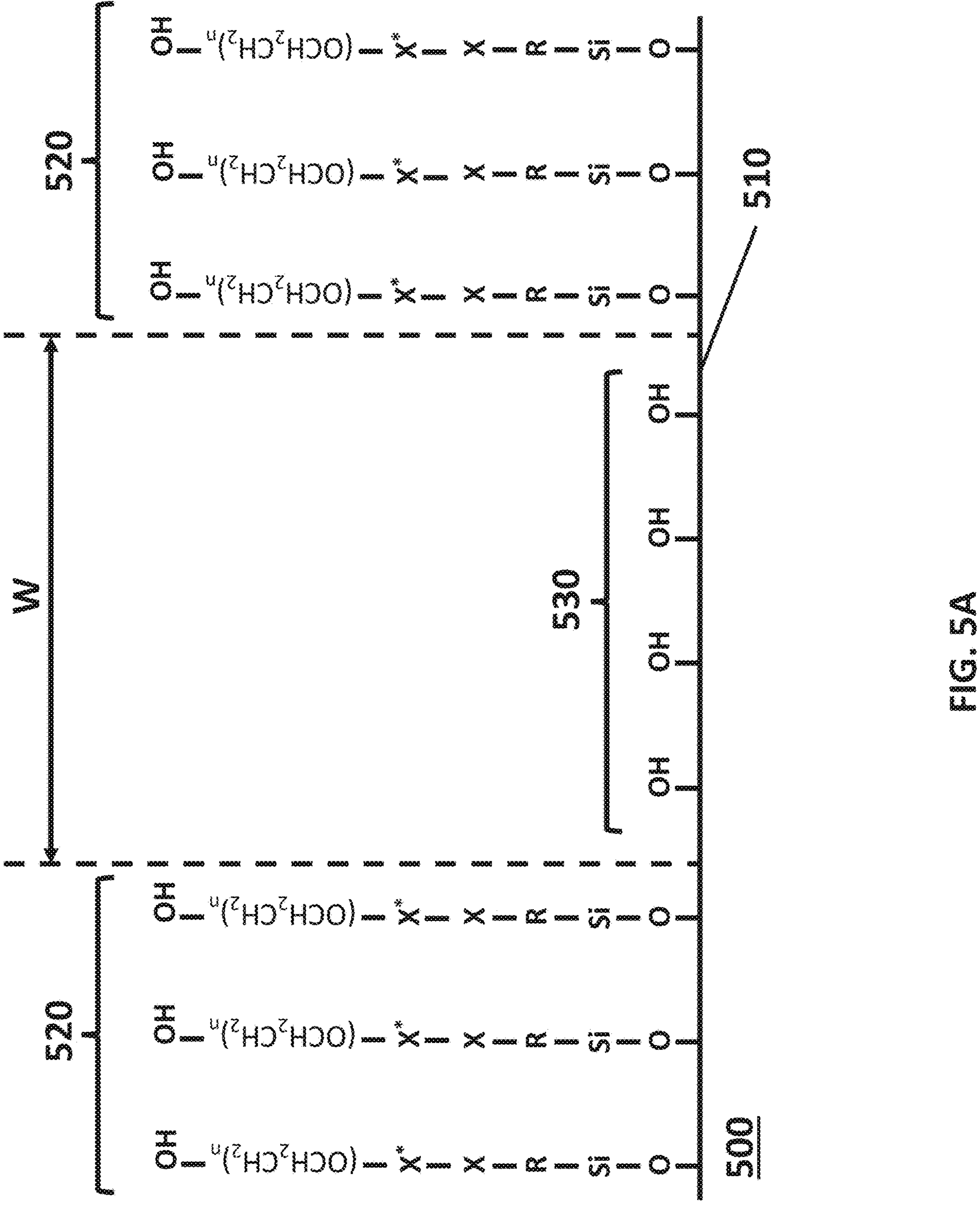
FIGS. 5A and 5B illustrate examples of modified areas of a surface formed by a method as set forth herein, in accordance with some embodiments.
Figure 5B:
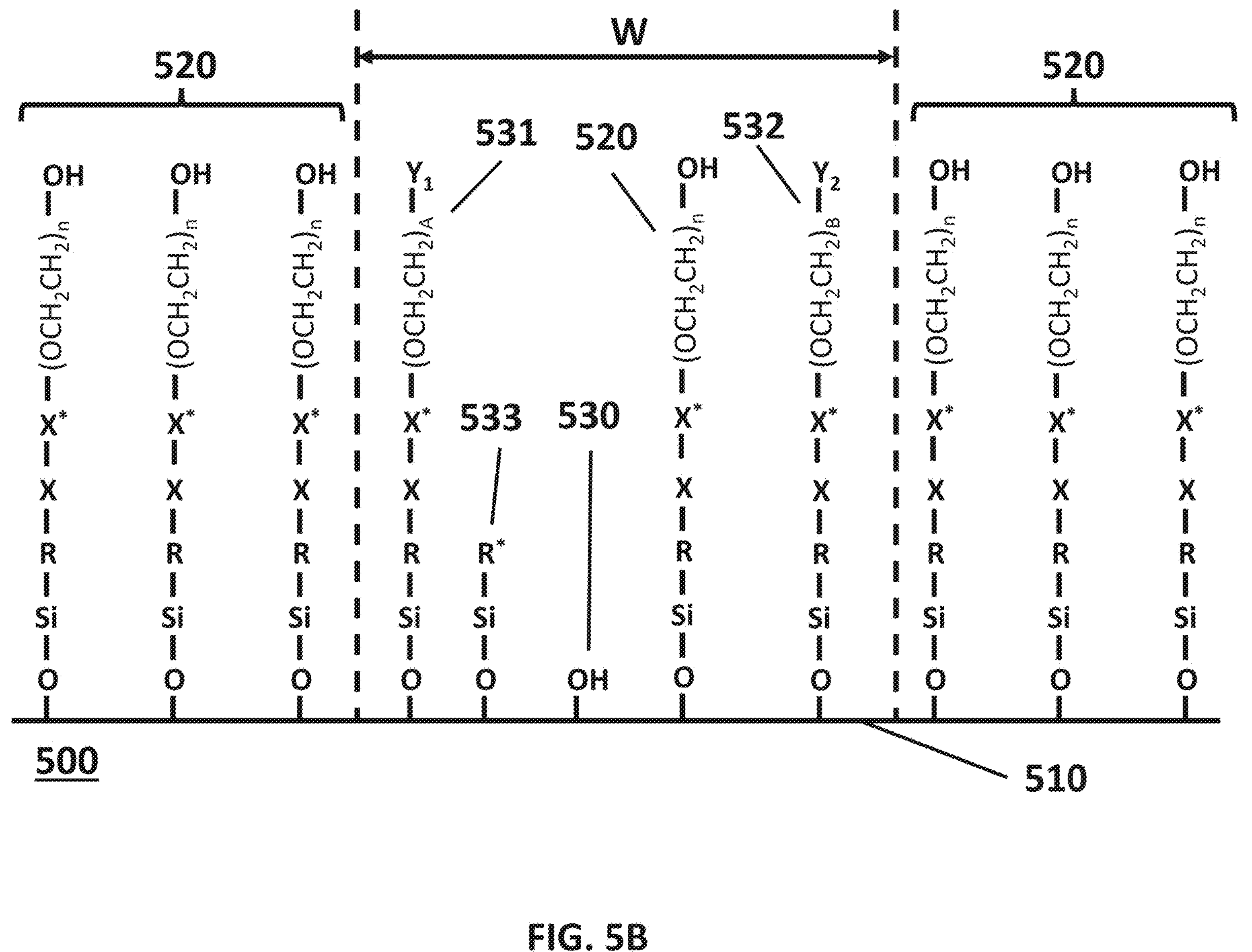

FIGS. 5A and 5B illustrate differing results from applying electromagnetic radiation to a substantially uniform layer comprising a plurality of molecules, such as a composition depicted in FIG. 3B. FIG. 5A shows a solid support 500 comprising a surface 510 with a substantially uniform layer containing a plurality of molecules 520. Each molecule of the plurality of molecules 520 comprises a PEG chain comprising n polymerized monomers and an organosilane moiety that couples a PEG chain to the surface 510. Electromagnetic radiation has been applied to the surface 510 or to the plurality of molecules 520 coupled thereto, resulting in the formation of a region of the surface having a width W with complete cleavage of all molecules from the surface 510 within the region. After cleavage of all molecules from the region of the surface 510, each molecular attachment site is oxidized to form a surface layer of hydroxyl groups 530 at the surface 510 within the affected region. FIG. 5B depicts a result of a method in which applying electromagnetic radiation to the surface or to a plurality of molecules coupled thereto results in less than complete cleavage of molecules from a region of the surface having width W. Some molecules may be completely cleaved, resulting in the formation of a hydroxyl group 530 at the molecular attachment site. The region of the surface 510 may further comprise a spatially and/or compositionally heterogeneous mixture of molecules of the plurality of molecules 520, as well as derivative molecules of a molecule of the plurality of molecules 520. Derivative molecules may include partial PEG cleavage products 531 and 532, having PEG monomer lengths A and B, respectively, and terminal functional groups $Y_1$ and $Y_2$, respectively. Derivative molecules may further include complete PEG cleavage product 533, thereby producing a modified or altered surface-linked organosilane with terminal moiety R*.

Figure 6:
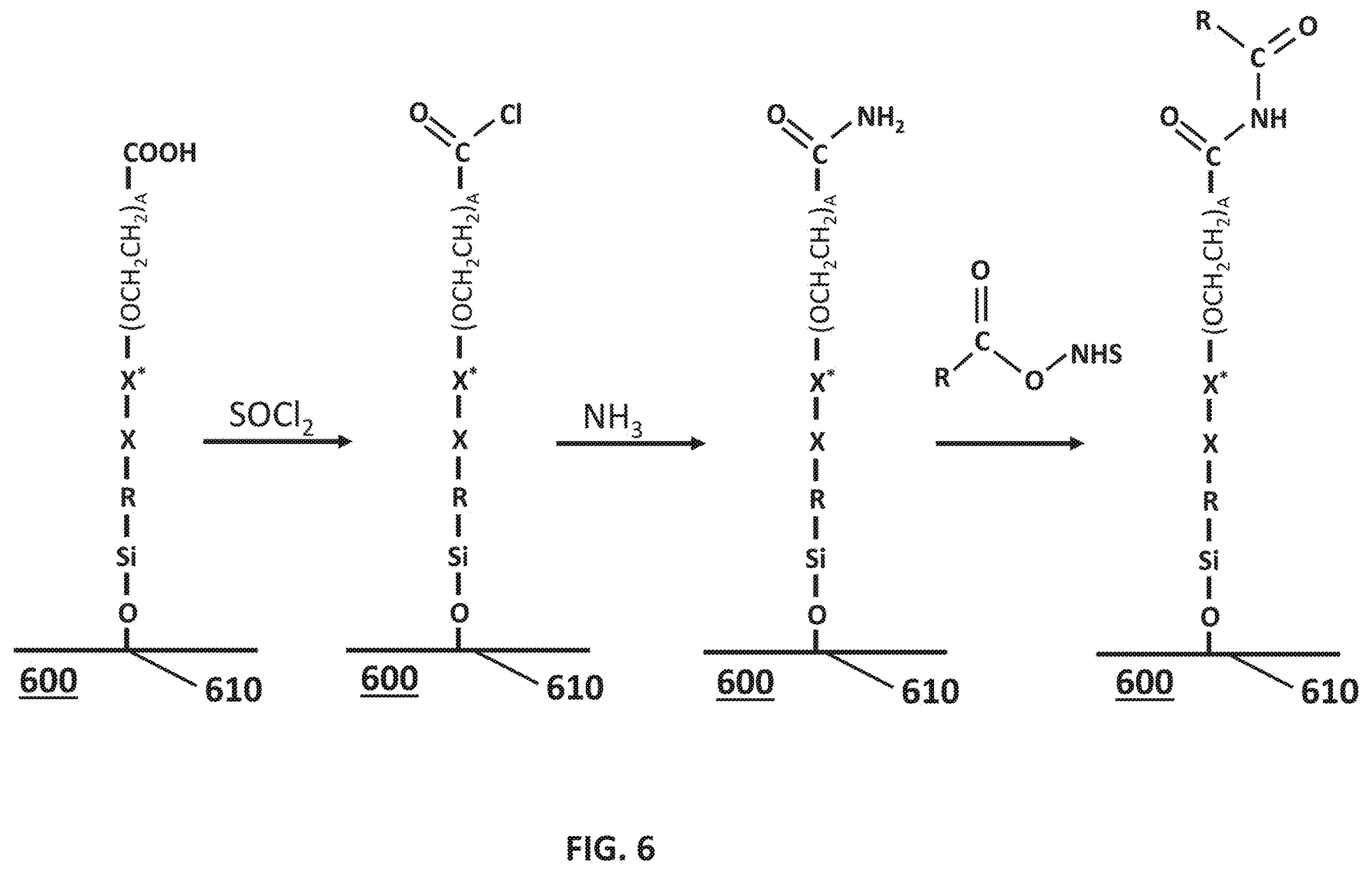

Surprisingly, methods set forth herein may be particularly advantageous when application of electromagnetic radiation to a substantially uniform layer of molecules produces a spatially and/or compositionally heterogeneous layer of molecules at a region of the surface. Chemical and/or physical mechanisms that cause incomplete removal of surface-linked molecules or that cause formation of derivative molecules of the original surface-linked molecules may be advantageous for at least the reasons that: 1) chemical derivative molecules at a defined region of a surface facilitate a diversity of further modifications to the surface chemistry of the defined region of the surface, 2) a low surface concentration of a particular chemical derivative molecule at the defined region of the surface may facilitate formation of a low-concentration modified surface chemistry at the region of the surface, and 3) incomplete removal of surface-linked molecules may permit smaller feature sizes in irradiated portions of a surface (e.g., a 200 nanometer (nm)-diameter irradiated area may only have complete ablation of surface-linked moieties in a 100 nm-diameter area of the surface. For example, FIG. 6 depicts a scheme for forming a low concentration of a terminal moiety R (e.g., a passivating moiety, a coupling moiety) on a surface 610 of a solid support 600. After applying electromagnetic radiation to a surface 610, a region of the surface 610 comprises a single surface-linked, partially cleaved PEG molecule containing A PEG monomers and a terminal carboxylic acid moiety. The terminal carboxylic acid moiety is modified through a sequence of three reactions (chloridation, amination, nucleophilic substitution of an activated ester) to conjugate a terminal moiety R to the surface-linked, partially cleaved PEG molecule. A method, as depicted in FIG. 6, may be advantageous when a terminal moiety R contains an expensive reagent or contains a component that is preferred to have a low concentration within a region of the surface formed by applying electromagnetic radiation.

After applying electromagnetic radiation to a surface or an area of a surface containing a plurality of molecules, a region of the surface may have a disrupted first subset of the plurality of molecules and a retained second subset of the plurality of molecules. The second subset of the plurality of molecules may comprise derivative molecules of the original plurality of molecules. The region of the surface may comprise a non-uniform distribution of a first subset of a plurality of molecules and a second subset of the plurality of molecules. For example, FIG. 2B depicts a region of a surface containing a central area 230 where a first subset of a plurality of molecules has been completely disrupted from the central area 230, and a second area 240 that surrounds the central area 230 where additional molecules of the first subset are disrupted, and a second subset of the plurality of molecules and derivative molecules thereof are retained. In another example, FIG. 2C depicts a central region of a surface 235 and a and a second area 240 that surrounds the central area 235, where a first subset of a plurality of molecules is disrupted from both areas, and a second subset of the plurality of molecules, or derivative molecules thereof, are retained in both areas, although the relative distribution of disrupted and/or retained molecules may differ between the central area 235 and the second area 240 (e.g., more disrupted molecules in the central area 235 and more retained molecules in the second area 240).

A region of a surface affected by the application of electromagnetic radiation may comprise an absence of a first subset of disrupted molecules. A disrupted molecule may refer to any molecule whose chemical structure is completely removed from a surface to which the molecule is coupled or conjugated. For example, a surface-linked organosilane may become disrupted when the silicon atom and any organic moieties conjugated to the silane are removed from the surface (as shown in FIG. 5A). In some cases, a disrupted molecule may refer to removal of a molecule that is coupled to a surface by a linking moiety (e.g., a photocleavable linker). In some particular cases, a molecule may be disrupted if the molecule is completely removed and a linking moiety is also fully removed from a surface. In other particular cases, a molecule may be disrupted if the molecule is completely removed and a linking moiety is not fully removed from a surface. For example, a molecule bound to a surface by a photocleavable linker may be removed by cleavage of the photocleavable linker, leaving behind a surface-coupled linking moiety comprising a portion of the photocleavable linker. A first subset of disrupted molecules may comprise a fraction of molecules originally present in a substantially uniform layer or coating at a region of a surface or an area of a surface. A first subset of disrupted molecules may be determined based upon determining a number of molecular attachment sites that are unoccupied after applying electromagnetic radiation or determining an effective surface area of a region of a surface that is devoid of coupled molecules. A first subset of disrupted molecules may comprise at least about 1%, 5%, 10%, 15%, 20%, 25%, 30%, 35%, 40%, 45%, 50%, 55%, 60%, 65%, 70%, 75%, 80%, 85%, 90%, 95%, 99%, 99.9%, 99.99%, 99.999%, or more than 99.999% of molecules originally present in a substantially uniform layer or coating at a region of a surface or an area of a surface. Alternatively or additionally, a first subset of disrupted molecules may comprise no more than about 99.999%, 99.99%, 99.9%, 99%, 95%, 90%, 85%, 80%, 75%, 70%, 65%, 60%, 55%, 50%, 45%, 40%, 35%, 30%, 25%, 20%, 15%, 10%, 5%, 1%, or less than 1% of molecules originally present in a substantially uniform layer or coating at a region of a surface or an area of a surface.

A region of a surface affected by the application of electromagnetic radiation may comprise a presence of a second subset of retained molecules. A retained molecule may refer to a molecule of the originally-present plurality of molecules of a substantially uniform layer or coating, as well as derivative molecules thereof. For example, a second subset of retained molecules may comprise a mixture of intact molecules from an original layer or coating, as well as derivative molecules such as thermally- or photolytically-degraded variants of originally-present molecules, or deposited thermal fragmentation products of originally-present molecules of the original layer or coating. A second subset of retained molecules may be determined based upon determining a number of molecular attachment sites that are occupied after applying electromagnetic radiation or determining an effective surface area of a region of a surface that is occupied by coupled molecules. A quantity of a second subset of retained molecules may exceed a quantity of an originally present plurality of molecules based upon number of molecules or surface density of molecules due to deposition of fragments, molecular adducts, or condensation products (e.g., aromatic species). For example, a second subset of retained molecules at a region of a surface may comprise 200% of an originally present plurality of molecules at the region of the surface on a molar basis. A second subset of retained molecules may comprise at least about 1%, 5%, 10%, 15%, 20%, 25%, 30%, 35%, 40%, 45%, 50%, 55%, 60%, 65%, 70%, 75%, 80%, 85%, 90%, 95%, 99%, 100%, 110%, 120%, 125%, 150%, 200%, 300%, 400%, 500%, 750%, 1000% or more than 1000% of molecules originally present in a substantially uniform layer or coating at a region of a surface or an area of a surface. Alternatively or additionally, a second subset of disrupted molecules may comprise no more than about 1000%, 750%, 500%, 400%, 300%, 200%, 150%, 125%, 120%, 110%, 100%, 99%, 95%, 90%, 85%, 80%, 75%, 70%, 65%, 60%, 55%, 50%, 45%, 40%, 35%, 30%, 25%, 20%, 15%, 10%, 5%, 1%, or less than 1% of molecules originally present in a substantially uniform layer or coating at a region of a surface or an area of a surface.

In some cases, applying electromagnetic radiation to an area of a surface to disrupt a first subset of a plurality of molecules may comprise selectively removing a first fraction of the first subset of the plurality of molecules and selectively reacting a second fraction of the first subset of the plurality of molecules. Selectively removing a first fraction of a first subset may refer to permanently removing the first fraction from any area adjacent to a solid support to which an original plurality of molecules is coupled. Selectively reacting a second fraction of a first subset may refer to reacting a first molecule of a first subset of molecules with a second molecule, in which the second molecule is coupled to a region of the surface. In some cases, selectively reacting a second fraction of the first subset of the plurality of molecules may comprise performing on a second molecule a chemical reaction selected from the group consisting of: a molecular addition, a molecular cleavage, a molecular rearrangement, a molecular condensation, an oxidation reaction, a reduction reaction, and a combination thereof. In some cases, a molecular addition reaction may comprise conjugating a second molecule to a first molecule or a molecular fragment thereof.

A region of a surface affected by the application of electromagnetic radiation may comprise a first subset of disrupted molecules and a second subset of retained molecules. In some cases, a sum of disrupted molecules and retained molecules may be greater than the total number of molecules originally present at the region of a surface. For example, a region of a surface with a molecular surface density of $1\times10^{12}$ molecules per square micron before applying electromagnetic radiation may have a first subset of disrupted molecules with a surface density of $9\times10^{11}$ molecules per square micron and a second subset of retained molecules and derivatives thereof with a surface density of $5\times10^{11}$ molecules per square micron after applying electromagnetic radiation. The apparent excess of the second subset of retained molecules and derivatives thereof may be due to, for example, fragmentation and redeposition of disrupted molecules at the region of the surface. In some cases, a first subset of disrupted molecules may comprise a molar excess relative to a second subset of retained molecules or derivatives thereof, such as at least about a 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 6-fold, 7-fold, 8-fold, 9-fold, 10-fold, 15-fold, 20-fold, 25-fold, 50-fold, 100-fold, 500-fold, 1000-fold, or a more than 1000-fold molar excess. Alternatively or additionally, a first subset of disrupted molecules may comprise a molar excess relative to a second subset of retained molecules or derivatives thereof, such as no more than about a 1000-fold, 500-fold, 100-fold, 50-fold, 25-fold, 20-fold, 15-fold, 10-fold, 9-fold, 8-fold, 7-fold, 6-fold, 5-fold, 4-fold, 3-fold, 2-fold, 1.9-fold, 1.8-fold, 1.7-fold, 1.6-fold, 1.5-fold, 1.4-fold, 1.3-fold, 1.2-fold, 1.1-fold, or less than about 1.1-fold molar excess. In other cases, a second subset of retained molecules or derivatives thereof may comprise a molar excess relative to a first subset of disrupted molecules, such as at least about a 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 6-fold, 7-fold, 8-fold, 9-fold, 10-fold, 15-fold, 20-fold, 25-fold, 50-fold, 100-fold, 500-fold, 1000-fold, or a more than 1000-fold molar excess. Alternatively or additionally, a second subset of retained molecules or derivatives thereof may comprise a molar excess relative to a first subset of disrupted molecules, such as no more than about a 1000-fold, 500-fold, 100-fold, 50-fold, 25-fold, 20-fold, 15-fold, 10-fold, 9-fold, 8-fold, 7-fold, 6-fold, 5-fold, 4-fold, 3-fold, 2-fold, 1.9-fold, 1.8-fold, 1.7-fold, 1.6-fold, 1.5-fold, 1.4-fold, 1.3-fold, 1.2-fold, 1.1-fold, or less than about 1.1-fold molar excess.

Applying electromagnetic radiation to an area of a surface containing a substantially uniform layer or coating adjacent to the surface may facilitate formation of a region on the surface comprising a spatially- and/or compositionally-heterogeneous layer of molecules. In some cases, an effective surface area of a region of the surface affected by applying electromagnetic radiation may be larger than an effective surface area of an area of the surface to which the electromagnetic radiation is applied. For example, secondary effects (e.g. thermal degradation, molecular reactions, etc.) may disrupt a subset of molecules on a portion of a surface that is not directly impinged by an electromagnetic radiation field. In other cases, an effective surface area of a region of the surface affected by applying electromagnetic radiation may be smaller than an effective surface area of an area of the surface to which the electromagnetic radiation is applied. For example, an electromagnetic radiation field with a non-homogeneous power distribution may be too weak to disrupt surface-linked molecules in certain areas of a surface at which the field is directed. An effective surface area of a region of a surface affected by electromagnetic radiation may be larger or smaller than an effective surface area of an area of the surface to which the electromagnetic radiation is applied by at least about 10%, 20%, 30%, 40%, 50%, 60%, 70%, 80%, 90%, 100%, 125%, 150%, 200%, 300%, 400%, 500%, 1000%, or more than 1000%, Alternatively or additionally, an effective surface area of a region of a surface affected by electromagnetic radiation may be larger or smaller than an effective surface area of an area of the surface to which the electromagnetic radiation is applied by no more than about 1000%, 500%, 400%, 300%, 200%, 150%, 125%, 100%, 90%, 80%, 70%, 60%, 50%, 40%, 30%, 20%, 10%, or less than 10%.

Figures 7A, 7B, 7C:
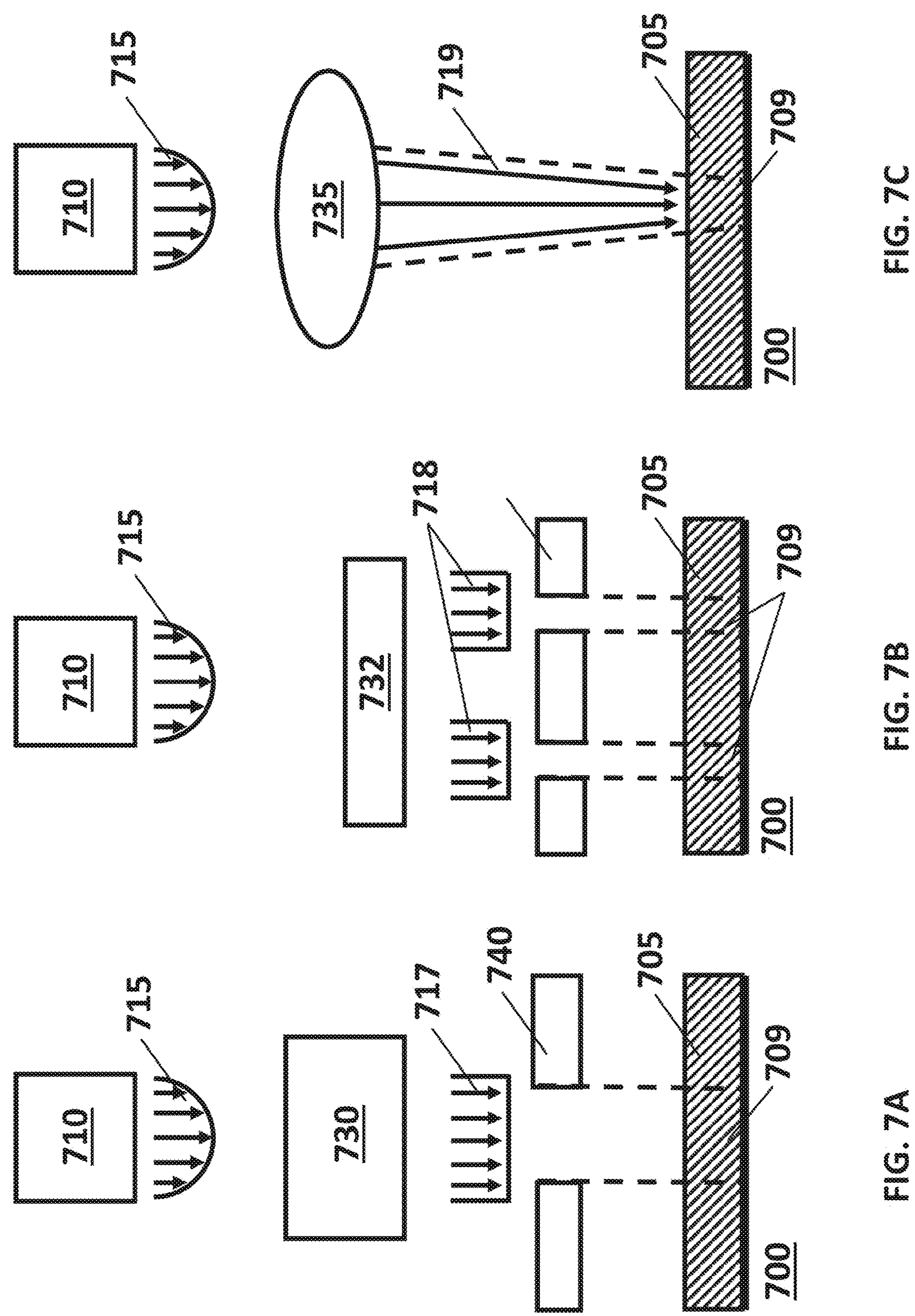
FIGS. 7A, 7B, 7C, 7D, and 7E show various optical systems for applying electromagnetic radiation to one or more areas of a surface of a solid support, in accordance with some embodiments.
Figure 7E:
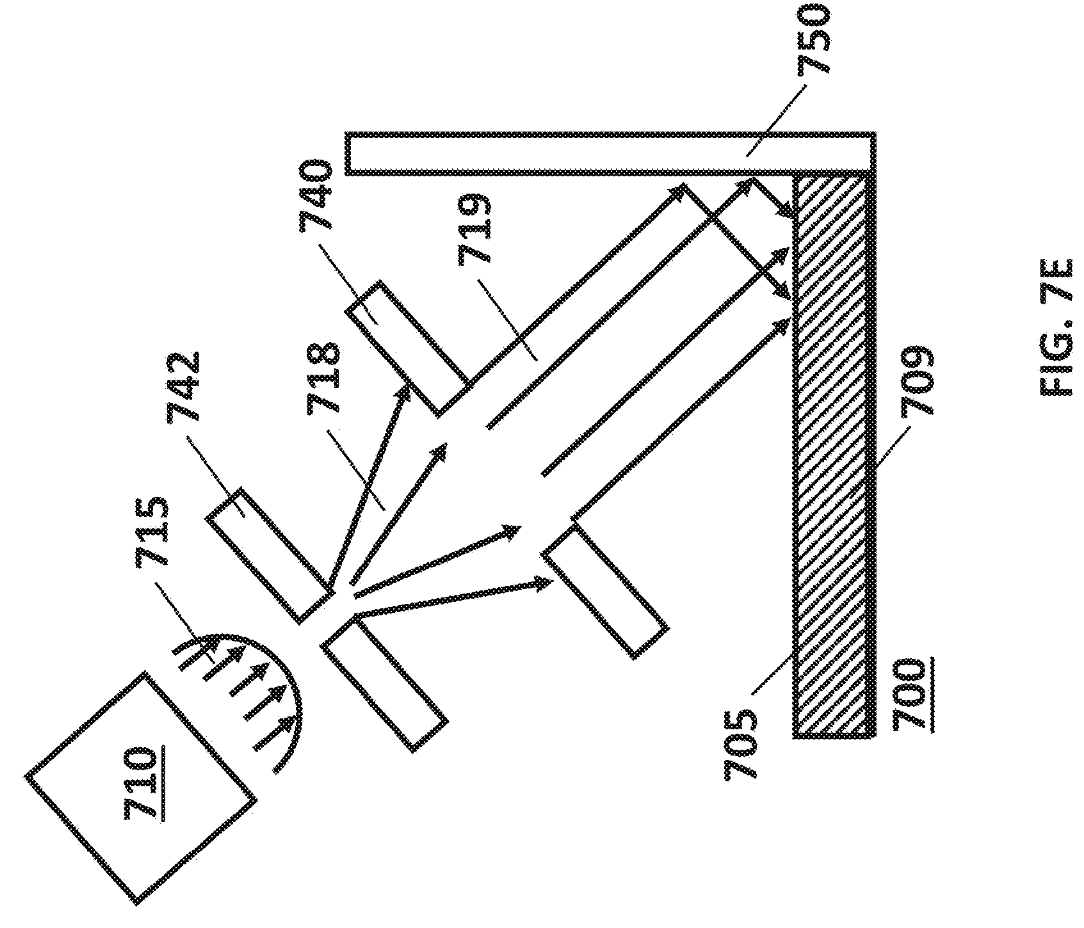
Figure 7D:
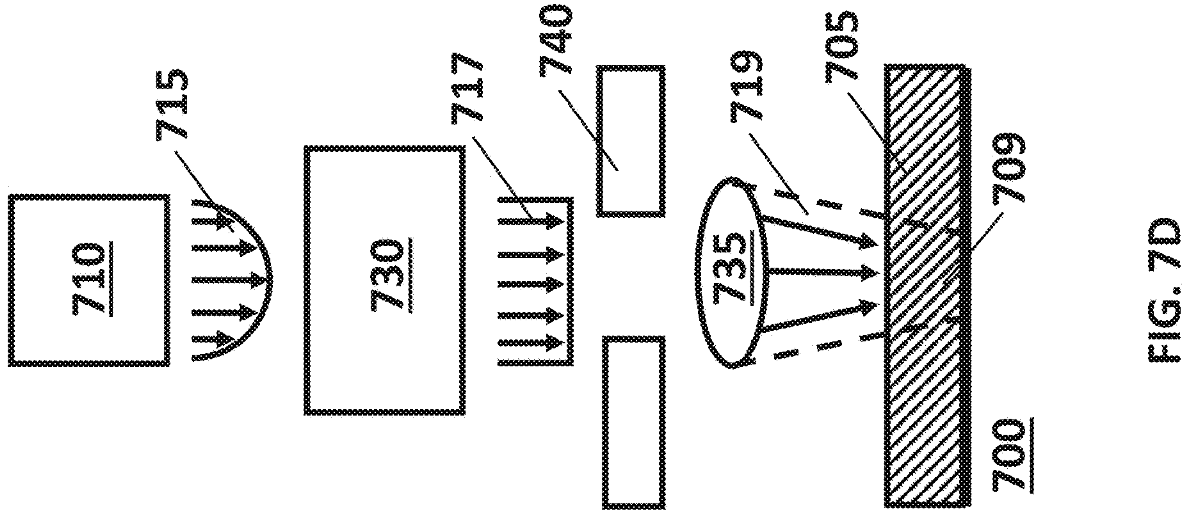
Figures 8A, 8B, 8C:
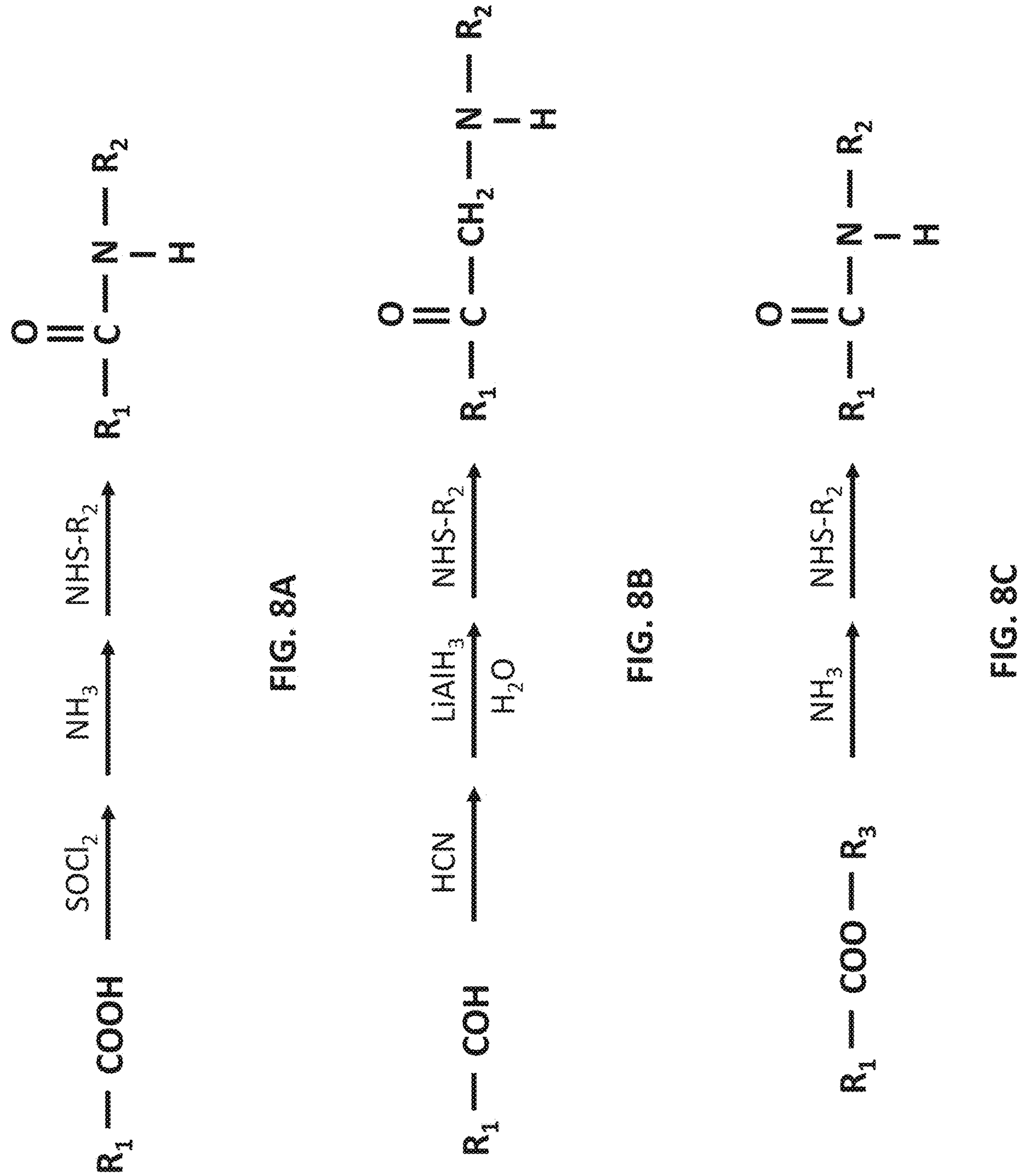
FIGS. 8A, 8B, 8C, 8D, and 8E display various reaction schemes for modifying derivative molecules, in accordance with some embodiments.
Figures 8D, 8E:
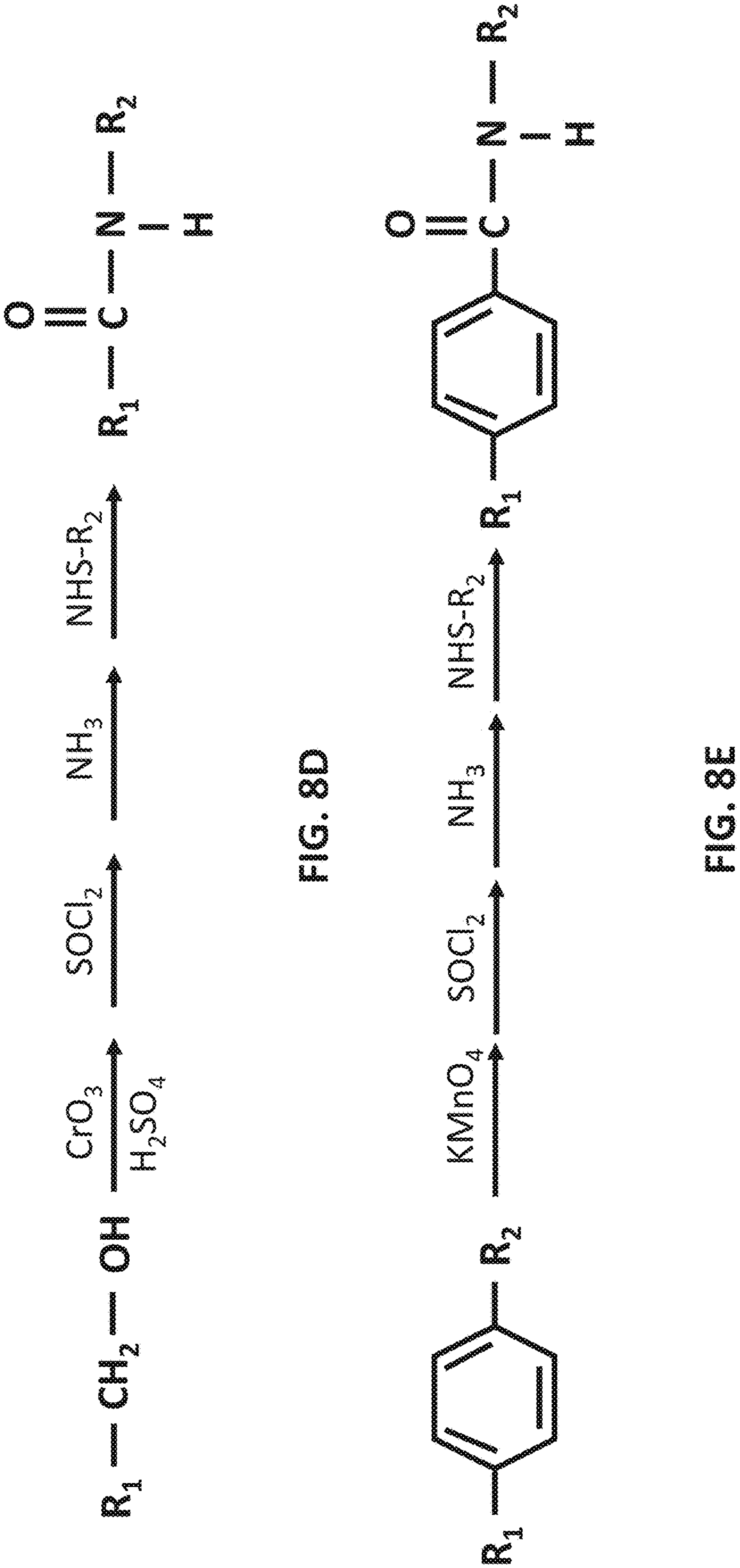

A method, as set forth herein, may comprise applying electromagnetic radiation to a surface or an area of a surface of a solid support. Electromagnetic radiation may be provided by any conceivable source, such as a laser, lamp, filament, or light-emitting diode. In some configurations, electromagnetic radiation may be provided by a system comprising a light source and one or more additional optical components, such as a beam homogenizer, a beam splitter, a collimating lens, a focusing lens, a defocusing lens, a mirror, a dichroic mirror, or a combination thereof. FIGS. 7A-7C depict optical systems for applying electromagnetic radiation to a solid support by a method set forth herein. FIG. 7A illustrates an optical system that provides electromagnetic radiation from a light source 710 to a solid support 700 that comprises a substantially uniform layer or coating 705. A non-homogeneous light field 715 is emitted from the light source 710 and is passed through a beam homogenizing device 730, thereby providing a homogenized light field 717. The homogenized light field 717 passes through a mask element 740 near, adjacent, or in contact to the solid support 700, thereby illuminating an area 709 of the solid support 700. FIG. 7B depicts a second optical system that provides electromagnetic radiation from a light source 710 to a solid support 700 that comprises a substantially uniform layer or coating 705. A non-homogeneous light field 715 is emitted from the light source 710 and is passed through a beam splitting device 732, thereby providing more than one split light field 718. The split light fields 718 pass through a mask element 740 near or adjacent to the solid support 700, thereby illuminating two or more areas 709 of the solid support 700. FIG. 7C shows a third optical system that provides electromagnetic radiation from a light source 710 to a solid support 700 that comprises a substantially uniform layer or coating 705. A non-homogeneous light field 715 is emitted from the light source 710 and is passed through a focusing device 735, thereby forming a focused light field 719. The focused light field 719 is directed to an area 709 of the solid support 700. The skilled person will readily recognize numerous combinations of optical elements to achieve desired electromagnetic field conditions at or adjacent to the solid support, such as combining beam splitters and beam homogenizers to produce multiple homogenized light fields 717 to multiple areas 709 of the solid support 700. FIG. 7D illustrates a fourth optical system that provides electromagnetic radiation from a light source 710 to a solid support 700 that comprises a substantially uniform layer or coating 705. A non-homogeneous light field 715 is emitted from the light source 710 and is passed through an optional beam homogenizing device 730, thereby providing a homogenized light field 717. The optionally-homogenized light field 717 passes through a mask element 740 and a subsequent focusing device (e.g., a focusing lens), thereby forming a focused light field 719. The focused light field 719 is directed to an area 709 of the solid support 700. FIG. 7E shows a fifth optical system containing an interferometer configuration that provides electromagnetic radiation from a light source 710 to a solid support 700 that comprises a substantially uniform layer or coating 705. A non-homogeneous light field 715 is emitted from the light source 710 and is passed through a beam expanding device 742 to provide an expanded light beam 718. The expanded light beam 718 is directed through a mask component 740 to form an impinging light beam 719. The impinging light beam 719 is directed at an oblique angle to the surface of the solid support 700. A portion of the impinging light beam is directed to an area 709 of the solid support. Additional light of the impinging light beam 719 is redirected by a reflective surface 750 (e.g., a Lloyd mirror) to form regions of constructive and destructive light interference at the area 709 of the solid support 700.

A method, as set forth herein, may comprise applying electromagnetic radiation to an area of a surface of a solid support, thereby disrupting a subset of a plurality of molecules that are present adjacent to the surface before applying electromagnetic radiation. Applying electromagnetic radiation to an area of a surface of a solid support may disrupt a subset of a plurality of molecules that are present at a region of the surface. In some cases, a first subset of molecules may be disrupted from a region of the surface that is larger than an area of the surface to which electromagnetic radiation is applied. For example, a high intensity light field may cause disruption of molecules adjacent to an area of a surface to which electromagnetic radiation is applied. In other cases, a first subset of molecules may be disrupted from a region of the surface that is the same size as an area of the surface to which electromagnetic radiation is applied. For example, a prolonged, low-intensity light field may only disrupt molecules in an area of a surface to which electromagnetic radiation is applied. In some cases, a first subset of molecules may be disrupted from a region of the surface that is smaller than an area of the surface to which electromagnetic radiation is applied. For example, a non-homogeneous light field (e.g., a light field with a parabolic intensity profile) may only disrupt molecules from a region of the surface that is smaller than an area to which the electromagnetic radiation is applied.

Provided electromagnetic radiation may be characterized according to one or more parameters, such as light wavelength, light wavelength range, light power density, total light energy input, illumination time, or a combination thereof. A field of electromagnetic radiation may be provided by a light source with a substantially homogeneous output wavelength (e.g., a laser). A field of electromagnetic radiation may be provided by a light source with a range of output wavelengths (e.g., a lamp, a light bulb). Table I provides a non-exhaustive list of laser light sources with characteristic output wavelengths.

TABLE I

| Laser Type | Output Wavelength (nm) |
|---|---|
| Hydrogen | 116 |
| Fluorine | 157 |
| Xenon | 172 |
| Argon Fluoride | 193 |
| Krypton Fluoride | 248 |
| Xenon Bromide | 282 |
| Xenon Chloride | 308 |
| Helium-Cadmium | 325 |
| Nitrogen | 337.1 |
| Xenon Fluoride | 351 |
| Argon Ion | 351 |
| Copper Vapor | 510.6 |
| Helium-Neon | 543.5 |
| Krytpon Ion | 647.1 |
| Ruby | 694.3 |
| Nd:$YVO_4$ | 914 |
| Yb:YAG | 1030 |
| Nd:YLF | 1047 |
| Nd:YAG | 1064 |
| Er:YAG | 1617 |
| Tm:YAG | 2000 |
| Ho:YAG | 2100 |
| Carbon Monoxide | 4800 |
| Carbon Dioxide | 10600 |

A field of electromagnetic radiation may have an output wavelength within a range of wavelengths, such as from about 1 nanometer (nm) to about 100 nm, about 1 nm to about 400 nm, about 1 nm to about 700 nm, about 1 nm to about 1 micron (μm), about 1 nm to about 10 μm, about 1 nm to about 20 μm, about 100 nm to about 400 nm, about 100 nm to about 700 nm, about 100 nm to about 1 micron (μm), about 100 nm to about 10 μm, about 100 nm to about 20 μm, about 400 nm to about 700 nm, about 400 nm to about 1 micron (μm), about 400 nm to about 10 μm, about 400 nm to about 20 μm, about 700 nm to about 1 micron (μm), about 700 nm to about 10 μm, about 700 nm to about 20 μm, about 1 μm to about 10 μm, about 1 μm to about 20 μm, or about 10 μm to about 20 μm. A light field may have an average or peak light field intensity of at least about 0.01 milliWatt per square centimeter ($mW/cm^2$), 0.1 $mW/cm^2$, 1 $mW/cm^2$, 5 $mW/cm^2$, 10 $mW/cm^2$, 20 $mW/cm^2$, 30 $mW/cm^2$, 40 $mW/cm^2$, 50 $mW/cm^2$, 60 $mW/cm^2$, 70 $mW/cm^2$, 80 $mW/cm^2$, 90 $mW/cm^2$, 100 $mW/cm^2$, 250 $mW/cm^2$, 500 $mW/cm^2$, 1000 $mW/cm^2$, or more than 1000 $mW/cm^2$.

Alternatively or additionally, a light field may have an average or peak light field intensity of no more than about 1000 $mW/cm^2$, 500 $mW/cm^2$, 250 $mW/cm^2$, 100 $mW/cm^2$, 90 $mW/cm^2$, 80 $mW/cm^2$, 70 $mW/cm^2$, 60 $mW/cm^2$, 50 $mW/cm^2$, 40 $mW/cm^2$, 30 $mW/cm^2$, 20 $mW/cm^2$, 10 $mW/cm^2$, 5 $mW/cm^2$, 1 $mW/cm^2$, 0.1 $mW/cm^2$, 0.01 $mW/cm^2$, or less than 0.01 $mW/cm^2$. A light field may be applied to an area of a surface of a solid support for an illumination time of at least about 0.1 seconds(s), 1 s, 5 s, 10 s, 20 s, 30 s, 40 s, 50 s, 60 s, 70 s, 80 s, 90 s, 100 s, 110 s, 120 s, 3 minutes (mins), 5 mins, 10 mins, 15 mins, 20 mins, 30 mins, 60 min, or more than 60 mins. Alternatively or additionally, a light field may be applied to an area of a surface of a solid support for an illumination time of no more than about 60 mins, 30 min, 20 min, 15 mins, 10 mins, 5 mins, 3 mins, 120 s, 110 s, 100 s, 90 s, 80 s, 70 s, 60 s, 50 s, 40 s, 30 s, 20 s, 10 s, 5 s, 1*s,* 0.1 s, or less than 0.1 s. Applying electromagnetic radiation to an area of a surface of a solid support may provide a total energy input to the area of the surface of at least about 0.1 nanoJoules (nJ), 1 nJ, 10 nJ, 100 nJ, 1 microJoule (μJ), 10 μJ, 100 μJ, 1 milliJoule (mJ), 10 mJ, 100 mJ, 1 Joule (J), 10 J, 100 J, 1000 J, or more than 1000 J. Alternatively or additionally, applying electromagnetic radiation to an area of a surface of a solid support may provide a total energy input to the area of the surface of no more than about 1000 J, 100 J, 10 J, 1 J, 100 mJ, 10 mJ, 1 mJ, 100 μJ, 10 μJ, 1 μJ, 100 nJ, 10 nJ, 1 nJ, or less than about 1 nJ.

Electromagnetic radiation may be provided to a surface or an area of a surface by directing the electromagnetic radiation through a mask component that is positioned adjacent to the surface or the area of the surface. A mask component may comprise a substrate comprising a first region or opening that is configured to transmit electromagnetic radiation and a second region that is configured to absorb, block, reflect, or attenuate electromagnetic radiation. A mask component may comprise a material that is configured to absorb, block, reflect, or attenuate electromagnetic radiation of a particular wavelength. For example, a chrome mask may be utilized to block or attenuate 193 nm light from a argon fluoride (ArF) laser. A mask component may be provided with one or more regions that are patterned to facilitate transmission of an electromagnetic radiation field to one or more areas of a surface of a solid support. A mask component may comprise a transmission-inhibiting material, such as a metal (e.g., chrome) or a dielectric material. A mask component may comprise a layered substrate, such as layered metals, layered dielectric materials, or combinations thereof. A mask component may further comprise a solid support, in which a masking layer (e.g., a metal, a dielectric material, etc.) is deposited onto the solid support. A solid support may comprise an optically transmissive substrate, such as glass, borosilicate glass, fused silica, or a quartz (e.g., high optical transmission quartz, high purity quartz, synthetic quartz, etc.). A mask component may comprise an optical passage that is configured to transmit electromagnetic radiation through the mask component. An optical passage may comprise an opening that does not contain any solid-phase and/or liquid-phase material within it. An optical passage may comprise a solid-phase and/or liquid-phase material that is configured to facilitate transmission of electromagnetic radiation. An optical passage may comprise an edge or an internal feature that is configured to minimize dispersion of electromagnetic radiation that is passed through the optical passage. For example, an optical passage may be configured to transmit an electromagnetic radiation field with a substantially uniform power density profile to a surface or an area of a surface of a solid support. An optical passage may comprise an edge or an internal feature that is configured to produce dispersion of electromagnetic radiation that is passed through the optical passage. For example, an entrance to an optical passage may be surrounded by a rough, thin, or otherwise disrupted layer of a non-transmissive material (e.g., chrome, a dielectric material) that is configured to produce a dispersed or non-uniform radiation power density profile at outer portions of an electromagnetic radiation field. A mask component may comprise any conceivable type of photomask, such as a copy mask, a 1× mask, a phase-shift mask, or a reticle. A reticle may have a characterized reduction ratio relative to a feature size to be produced on a surface, such as no more than about 10:1, 5:1, 4:1, 3:1, 2.5:1, 2:1, 1.5:1, or less than 1.5:1.

Alternatively or additionally, a reticle may have a characterized reduction ratio relative to a feature size to be produced on a surface, such as at least about 1.5:1, 2:1, 2.5:1, 3:1, 4:1, 5:1, 10:1, or more than 10:1.

A method, as set forth herein, may comprise applying electromagnetic radiation to an area of a surface of a solid support, in which the applying electromagnetic radiation comprises the steps of: a) providing a mask component adjacent to a substantially uniform layer, in which the mask component is optically non-transmitting at a wavelength of the electromagnetic radiation, and in which the mask component comprises an opening that is configured to transmit electromagnetic radiation to an area of the surface; and b) directing electromagnetic radiation through the opening, thereby applying electromagnetic radiation to the area of the surface. In some configurations, a mask component adjacent to a solid support or a substantially uniform layer or coating may be in contact with a surface or an area of a surface of a solid support or in contact with a substantially uniform layer or coating adjacent to the surface or the area of the surface. In other configurations, a mask component adjacent to a solid support or a substantially uniform layer or coating may not be in contact with a surface or an area of a surface of a solid support or in contact with a substantially uniform layer or coating adjacent to the surface or the area of the surface. A mask component may be separated or spaced from a solid support or a substantially uniform layer or coating by a separation distance, such as at least about 1 micron (μm), 10 μm, 100 μm, 500 μm, 1 millimeter (mm), 2 mm, 3 mm, 4 mm, 5 mm, 10 mm, 20 mm, 25 mm, 50 mm, 100 mm, 250 mm, 500 mm, 1 meter (m), or more than 1 m. Alternatively or additionally, a mask component may be separated or spaced from a solid support or a substantially uniform layer or coating by a separation distance, such as no more than about 1 m, 500 mm, 250 mm, 100 mm, 50 mm, 25 mm, 20 mm, 10 mm, 5 mm, 4 mm, 3 mm, 2 mm, 1 mm, 500 μm, 100 μm, 10 μm, 1 μm, or less than 1 μm.

A system for applying electromagnetic radiation to a solid support or a surface thereof may further comprise additional optical elements that interact with the electromagnetic radiation. Exemplary optical elements may include lenses (e.g., focusing lenses, defocusing lenses, collimating lenses, etc.), filters, mirrors or reflective materials, beam splitters, refractive elements, and any other conceivable optical element. In some configurations, an additional optical element may be configured to receive electromagnetic radiation before the electromagnetic radiation passes through a mask component. For example, a beam of electromagnetic radiation may be passed through a series of light-conditioning optics before being directed through a mask component to a surface of a solid support. In other configurations, an additional optical element may be configured to received light after the electromagnetic radiation passes through a mask component. For example, a focusing lens may be positioned between a mask component and a solid support. In another example, a region of a solid support comprising a spatially and/or compositionally heterogeneous plurality of molecules may be formed by a method such as light interference lithography (LIL), in which a electromagnetic radiation reflected off of a surface of a solid support is returned to the surface of the solid support by a Lloyd mirror. Exemplary methods and systems for LIL are described in Hennessy, ed., "Lithography: Principles, Processes, and Materials," (2011), and Quilis, et al., "Tunable Laser Interference Lithography Preparation of Plasmonic Nanoparticle Arrays Tailored for SERS," *Nanoscale*, (2018), each of which is incorporated by reference in its entirety. An exemplary optical system for forming a region comprising a spatially and/or compositionally heterogeneous plurality of molecules via a LIL process is depicted in FIG. 7E.

Electromagnetic radiation may be provided to an area of a surface of a solid support in a suitable atmosphere. In some cases, an atmosphere may comprise an oxidizing gas species, such as air, oxygen, ozone, water, carbon dioxide, hydrogen peroxide, chlorine, fluorine, a nitrogen oxide (NOX), or a sulfur dioxide (SOx). In other cases, an atmosphere may comprise a reducing gas species, such as hydrogen, carbon monoxide, or hydrogen sulfide. In other cases, an atmosphere may comprise an inert gas species, such as nitrogen, argon, or helium. A method, as set forth herein, may comprise a step of providing a flowing gas (e.g., a gas sweep) comprising, for example, an oxidizing atmosphere, a reducing atmosphere, or an inert atmosphere. A flowing gas comprising a particular atmosphere may be provided before, during, or after any step of a method, as set forth herein. For example, a flowing gas sweep comprising an oxidizing atmosphere (e.g., oxygen) may be provided during and after applying electromagnetic radiation to an area of a surface of a solid support. In some cases, a step of a method, as set forth herein, may occur under a reduced gas pressure (e.g., vacuum) relative to atmospheric pressure. In other cases, a step of a method, as set forth herein, may occur under an increased pressure relative to atmospheric pressure.

In some configurations, after applying electromagnetic radiation to an area of a surface of a solid support, the solid support, the surface, and/or the area of the surface may undergo one or more additional processes. In particular configurations, after applying electromagnetic radiation to an area of a surface of a solid support, the solid support, the surface, and/or the area of the surface may undergo an additional step or cycle of applying electromagnetic radiation. In some cases, an additional step or cycle of applying electromagnetic radiation may utilize a same wavelength of electromagnetic radiation as the original irradiation. In other cases, an additional step or cycle of applying electromagnetic radiation may utilize a different wavelength of electromagnetic radiation as the original irradiation. In some cases, two differing wavelengths of electromagnetic radiation may be used to cause two differing photochemistries. For example, a surface may be irradiated with a first more-energetic frequency of electromagnetic radiation that completely ablates from the surface a first subset of molecules of a plurality of molecules, then the surface may be irradiated with a second less-energetic frequency of electromagnetic radiation that partially cleaves a second subset of molecules of the plurality of molecules. In some cases, an additional step or cycle of applying electromagnetic radiation may occur at the same area of a surface of a solid support as the original irradiation. In some cases, an additional step or cycle of applying electromagnetic radiation may occur at a differing area of a surface of a solid support as the original irradiation. In some cases, an additional step or cycle of applying electromagnetic radiation may alter a region of the surface comprising a spatially and/or compositionally heterogeneous plurality of molecules (e.g., increasing a measure of spatial heterogeneity, increasing a measure of compositional heterogeneity, increasing a size of the region of the surface, etc.). In some cases, an additional step or cycle of applying electromagnetic radiation may form an additional region of the surface comprising a spatially and/or compositionally heterogeneous plurality of molecules. In particular configurations, after applying electromagnetic radiation to an area of a surface of a solid support, the solid support, the surface, and/or the area of the surface may undergo an additional chemical treatment. An additional chemical treatment may include a chemical reaction, a chemical deposition, a catalyst deposition, a nanoparticle or microparticle deposition, a chemical inhibitor deposition, a thermal treatment, an electrostatic treatment, a magnetic treatment, or any other conceivable chemical treatment. In particular configurations, after applying electromagnetic radiation to an area of a surface of a solid support, the solid support, the surface, and/or the area of the surface may undergo an additional step of rinsing or flushing the surface of the solid support. A rinsing or flushing process may include a liquid-phase medium, a gas-phase medium, or a combination thereof. A rinsing or flushing process may remove deposited, condensed, or otherwise bound species from a surface that has been treated by irradiation. The skilled person will readily recognize that a process may include a combination of multiple advantageous processes after applying electromagnetic radiation. For example, a region of a surface that has been treated with electromagnetic radiation may be rinsed with an aqueous or non-aqueous solvent, then chemically reduced to remove oxidized moieties from the region of the surface.

After applying electromagnetic radiation to an area of a surface of a solid support, a method, as set forth herein, may produce a region of the surface that is resolvable at single-analtye resolution. A region of the surface may be resolvable at single-analyte resolution if the region of the surface possesses one or more of the properties of: 1) having a sufficiently large effective surface area to couple a single analyte (e.g, a polypeptide, a nucleic acid, etc.); 2) having a sufficiently small effective surface area to couple no more than one single analyte; 3) having a sufficiently large effective surface area to be resolved from a background signal by a single-analyte detection technique (e.g., a single analyte at the region of the surface is observable by fluorescence microscopy above an autofluorescence background); and 4) is sufficiently separated from a second region of the surface configured to couple a single analyte such that a single analyte coupled to the region of the surface is resolvable from the second single analyte at the second region of the surface. For example, a method as set forth herein may produce first and second regions of a surface that are each configured to bind a particle of a nanostructured material, in which the first region is sufficiently separated from the second region to permit discrete detection of each particle of nanostructured material at single-analyte resolution when the particles of nanostructured material are deposited at the first and second regions of the surface. In a specific example, a method as set forth herein may produce first and second regions of a surface that are each configured to bind a structured nucleic acid particle (SNAP) (e.g., a DNA origami, a DNA nanoball, etc.), in which each SNAP is configured to couple a single analyte (e.g., a polypeptide, a nucleic acid, a metabolite, a nanoparticle, etc.), and in which the first region is sufficiently separated from the second region to permit discrete detection of each SNAP and/or single analyte at single-analyte resolution when the SNAPs or SNAP-analyte complexes are deposited at the first and second regions of the surface.

An area of a surface to which electromagnetic radiation is applied or a region of the surface formed by applying electromagnetic radiation to the surface may be characterized by an average surface area or an average effective surface area. An average surface area may refer to the detectable surface area of a region of a surface or an area of the surface, including surface area due to three-dimensional features (e.g., wells, pores, raised features). An average effective surface area may refer to the detectable surface area of a region of a surface or an area of the surface when the region of the surface or the area of the surface is projected onto an imaginary two-dimensional plane. A region of a surface or an area of a surface may have an average surface area or an average effective surface area of at least about 0.000001 square microns ($\mu m^2$), 0.00001 $\mu m^2$, 0.0001 $\mu m^2$, 0.001 $\mu m^2$, 0.01 $\mu m^2$, 0.1 $\mu m^2$, 1 $\mu m^2$, 10 $\mu m^2$, 100 $\mu m^2$, or more than 100 $\mu m^2$. Alternative or additionally, a region of a surface or an area of a surface may have an average surface area or an average effective surface area of no more than about 100 $\mu m^2$, 10 $\mu m^2$, 1 $\mu m^2$, 0.1 $\mu m^2$, 0.01 $\mu m^2$, 0.001 $\mu m^2$, 0.0001 $\mu m^2$, 0.00001 $\mu m^2$, 0.000001 $\mu m^2$, or less than about 0.000001 $\mu m^2$. A region of a surface or an area of a surface may have a shape, such as substantially circular, oval, square, rectangular, triangular, or irregular. A region of a surface or an area of a surface may be characterized by an average, minimum, or maximum characteristic length (e.g., length, width, depth, radius, diameter, circumference, etc.). A region of a surface or an area of a surface may have an average, minimum, or maximum characteristic length of at least about 1 nanometer (nm), 10 nm, 20 nm, 30 nm, 40 nm, 50 nm, 60 nm, 70 nm, 80 nm, 90 nm, 100 nm, 125 nm, 150 nm, 200 nm, 250 nm, 300 nm, 400 nm, 500 nm, 750 nm, 1 micron (μm), 10 μm, 50 μm, 100 μm, 250 μm, 500 μm, or more than 500 μm. Alternatively or additionally, a region of a surface or an area of a surface may have an average, minimum, or maximum characteristic length of no more than about 500 μm, 250 μm, 100 μm, 50 μm, 10 μm, 1 μm, 750 nm, 500 nm, 400 nm, 300 nm, 250 nm, 200 nm, 150 nm, 125 nm, 100 nm, 90 nm, 80 nm, 70 nm, 60 nm, 50 nm, 40 nm, 30 nm, 20 nm, 10 nm, 1 nm, or less than 1 nm.

After applying electromagnetic radiation, a region of a surface may comprises a derivative molecule of a molecule of the original plurality of molecules present before applying the electromagnetic radiation. In some cases, a derivative molecule may comprise a coupling moiety, such as an electrically-charged coupling moiety or a reactive moiety. A derivative molecule may comprise a reactive moiety containing a functional group selected from the group consisting of: a hydroxyl, a carboxylic acid, an ester, an ether, an aldehyde, a ketone, a carbonate, a peroxide, an acetal, an anhydride, an amide, an imide, a primary amine, a secondary amine, an azide, an alkene, an alkyne, an isocyanate, and a combination thereof.

A method, as set forth herein, may further comprise a step of, after applying electromagnetic radiation to an area of a surface, coupling a utility moiety to a region of the surface formed by applying the electromagnetic radiation. A utility moiety may provide a chemical property at a region of a surface that was not present within an original substantially uniform layer or coating at the region of the surface. For example, a passivating molecule may be coupled to a region of a surface that differs from a passivating molecule coupled to an area of the surface outside the region of the surface. A utility moiety may facilitate a molecular interaction that does not occur with an original substantially uniform layer or coating at the region of the surface. For example, a reactive coupling moiety may be coupled to a region of a surface within a substantially uniform layer of passivating molecules (e.g., PEG molecules), thereby providing a site for covalent attachment of a polypeptide or nucleic acid. A utility moiety may comprise a passivating molecule, a coupling molecule, or a combination thereof. In some cases, a utility moiety (e.g., a passivating molecule, a coupling molecule) may be coupled to a surface at a molecular attachment site in a region of a surface where a molecule of a first subset of disrupted molecules was located before applying electromagnetic radiation. In other cases, a utility moiety (e.g., a passivating molecule, a coupling molecule) may be coupled to a derivative molecule in a region of a surface where a molecule of a second subset of retained molecules was altered by applying electromagnetic radiation to an area of the surface. A utility moiety may optionally comprise a linking moiety that is configured to couple a utility moiety (e.g., a passivating moiety, a coupling moiety) to a surface attachment site or a derivative molecule. FIGS. 8A-8E provide a non-exhaustive summary of reactions that may be utilized to attach a utility moiety to a derivative molecule, as set forth herein. In FIGS. 8A-8E, $R_1$ may refer to a surface-linked moiety (e.g., an alkyl chain, a PEG chain, an organosilane, etc.) and $R_2$ may refer to a molecule comprising a utility moiety (e.g., a passivating moiety, a coupling moiety).

Figure 9A:
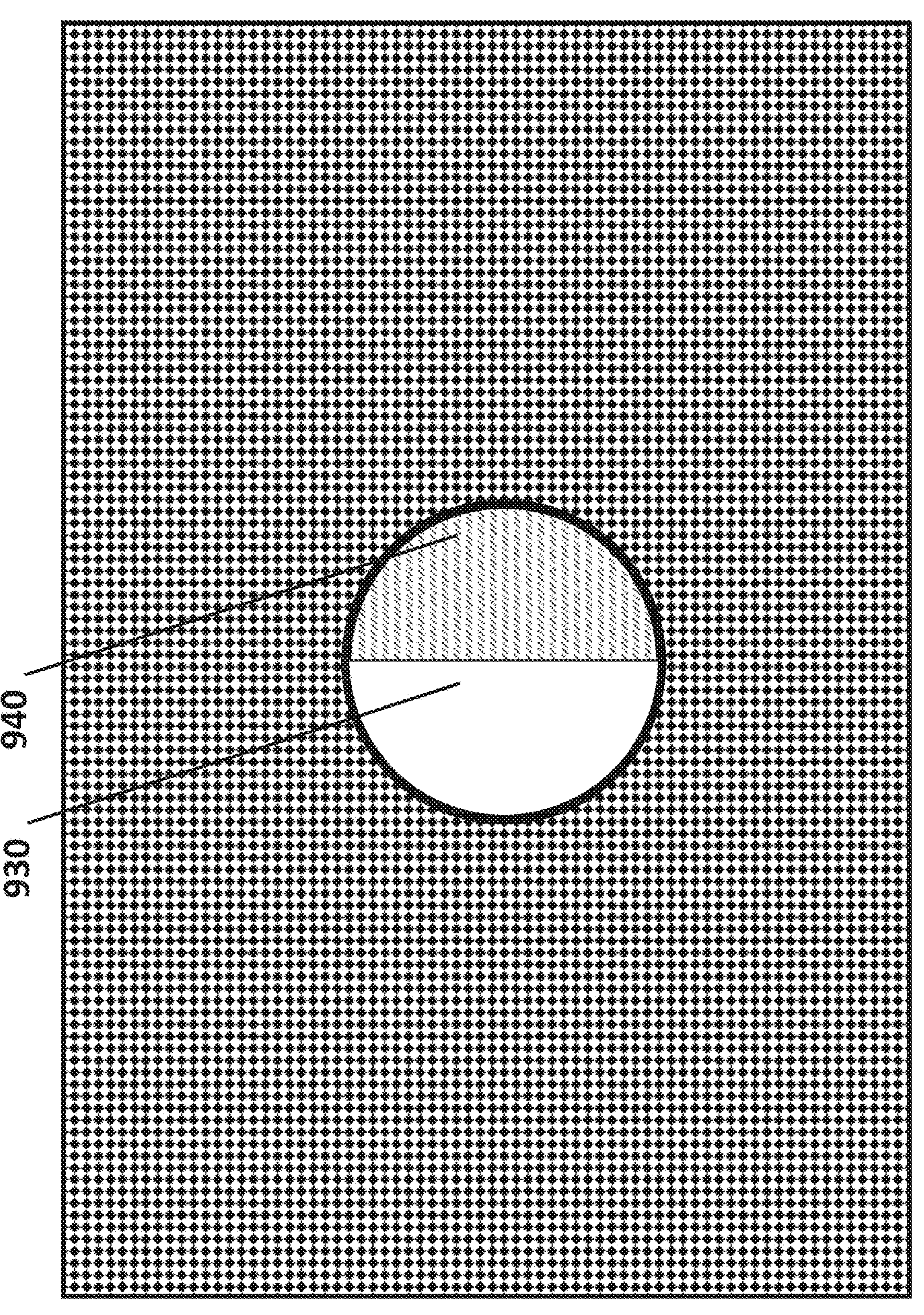
FIGS. 9A and 9B illustrate spatially heterogeneous arrangements of a plurality of molecules on a region of a surface, in accordance with some embodiments.
Figure 9B:
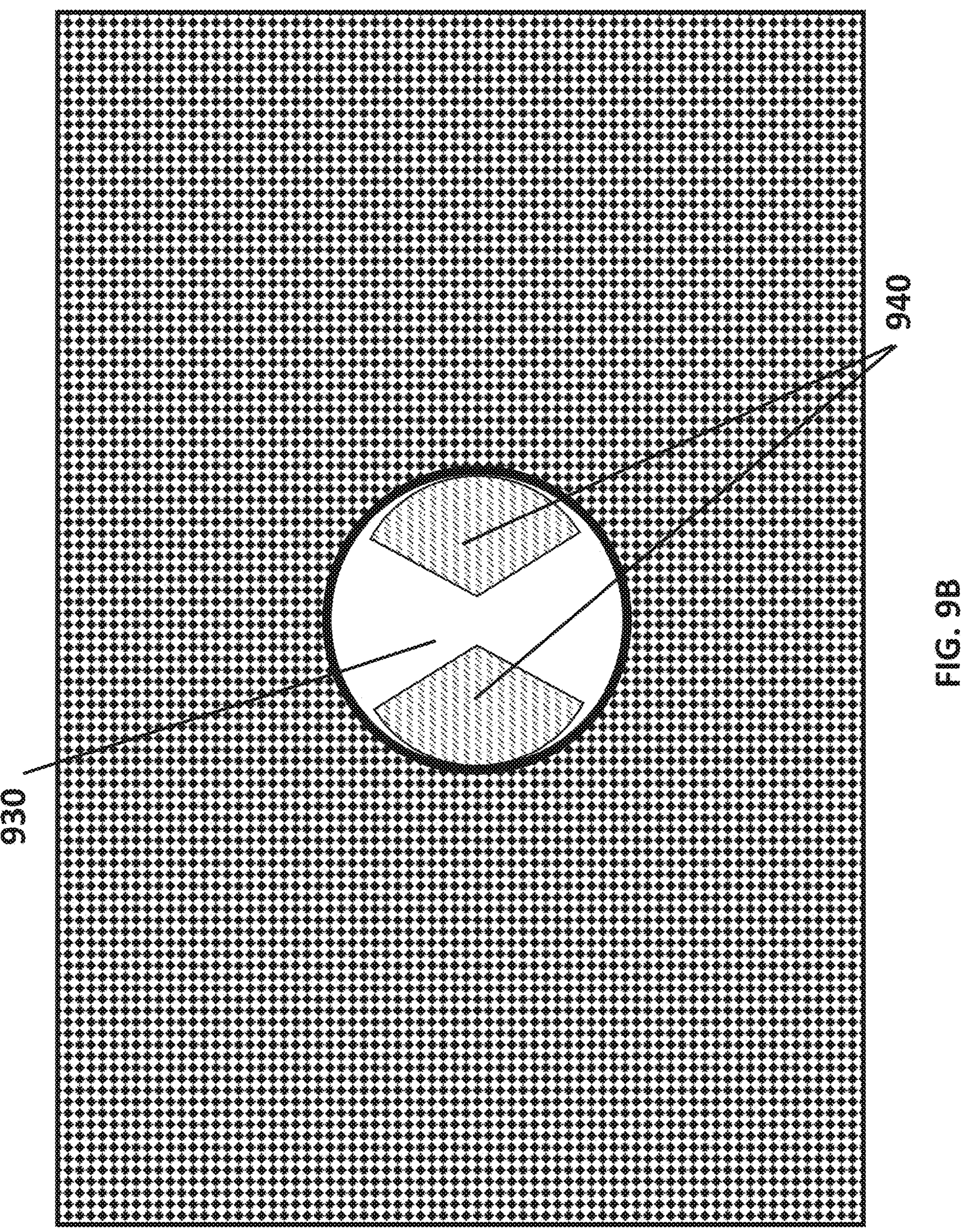

After applying electromagnetic radiation to an area of a surface, the surface may comprise a first subregion that is substantially devoid of any molecules of a plurality of molecules that were originally present in a substantially uniform layer or coating adjacent to the area of the surface, and a second subregion that comprises a derivative molecule of a molecule of the plurality of molecules. In some configurations, a second subregion may be continuous. FIG. 2B depicts a continuous annular second subregion comprising derivative molecules surrounding a central first subregion that is devoid of molecules. FIG. 9A depicts a continuous second subregion 940 comprising derivative molecules that does not surround a first subregion 930 that is devoid of molecules. In other configurations, a second subregion may be non-continuous. FIG. 9B illustrates a divided second subregion 940 that is partially surrounded by a first subregion 930. In some configurations, a second subregion or a portion thereof may be adjacent to an edge of a region of a surface. In other configurations, a second subregion or a portion thereof may not be adjacent to an edge of a region of a surface. A first subregion or a second subregion may comprise at least about 5%, 10%, 15%, 20%, 25%, 30%, 35%, 40%, 45%, 50%, 55%, 60%, 65%, 70%, 75%, 80%, 85%, 90%, 95%, 99%, 99.9%, or more than 99.9% of an effective surface area of a region of a surface. Alternatively or additionally, a first subregion or a second subregion may comprise no more than about 99.9%, 99%, 95%, 90%, 85%, 80%, 75%, 70%, 65%, 60%, 55%, 50%, 45%, 40%, 35%, 30%, 25%, 20%, 15%, 10%, 5%, or less than 5% of an effective surface area of a region of a surface.

A method, as set forth herein, may comprise forming an array comprising a plurality of surface sites and one or more interstitial regions that separate each surface site of the plurality of surface sites from each other surface site of the plurality of surface sites. A surface site of an array may be characterized as comprising a surface chemistry, surface structure, or surface property that differs from a surface chemistry, surface structure, or surface property of an interstitial region. In some configurations, a surface site may be configured to bind a single analyte (e.g., a polypeptide, a nucleic acid, a cell, a nanostructured particle, a combination thereof, etc.). In particular configurations, a surface site may be configured to bind no more than one single analyte. In some configurations, each surface site of a plurality of surface sites may be configured to bind a single analyte (e.g., a polypeptide, a nucleic acid, a cell, a nanostructured particle, a combination thereof, etc.). In particular configurations, each surface site of a plurality of surface sites may be configured to bind no more than one single analyte. In some configurations, a surface site may comprise a coupling moiety. In particular configurations, a surface site may comprise a plurality of coupling moieties. In other particular configurations, a surface site may comprise a coupling moiety that is coupled to a derivative molecule that is formed by applying electromagnetic radiation to a substantially uniform layer or coating comprising a plurality of molecules. In some configurations, each surface site of a plurality of surface sites may comprise a coupling moiety. In particular configurations, each surface site of a plurality of surface sites may comprise a plurality of coupling moieties. In other particular configurations, each surface site of a plurality of surface sites may comprise a coupling moiety that is coupled to a derivative molecule that is formed by applying electromagnetic radiation to a substantially uniform layer or coating comprising a plurality of molecules. In some configurations, an interstitial region of an array may be configured to inhibit binding of a molecule to a surface of a solid support. In some configurations, an interstitial region of an array may comprise a passivating moiety. In particular configurations, an interstitial region of an array may comprise a plurality of moieties.

An array comprising a plurality of surface sites may be formed by a method, as set forth herein. In some cases, an array of surface sites may be formed by a method comprising the steps of: a) providing a solid support containing a surface and a substantially uniform layer or coating on the surface, wherein the substantially uniform layer or coating comprises a plurality of molecules, and wherein each molecule of the plurality of molecules comprises a passivating moiety; b) applying electromagnetic radiation to two or more areas of the surface to disrupt a first subset of the plurality of molecules within two or more regions of the surface, wherein the two or more regions of the surface retain a second subset of the plurality of molecules or a derivative thereof after applying the electromagnetic radiation to the two or more areas of the surface; and c) coupling a second plurality of molecules to each region of the two or more regions of the surface, wherein each molecule of the second plurality of molecules comprises a utility moiety (e.g., a coupling moiety, a differing passivating moiety). For example, a patterned array of single-polypeptide binding sites may be formed in part by applying electromagnetic radiation to a patterned plurality of areas of a surface of a solid support comprising a substantially uniform layer or coating of passivating molecules. In other cases, an array of surface sites may be formed by a method comprising the steps of: a) providing a solid support containing a surface and a substantially uniform layer or coating on the surface, wherein the substantially uniform layer or coating comprises a plurality of molecules, and wherein each molecule of the plurality of molecules comprises a coupling moiety; b) applying electromagnetic radiation to one or more areas of the surface to disrupt a first subset of the plurality of molecules within one or more regions of the surface, wherein the one or more regions of the surface retain a second subset of the plurality of molecules or a derivative thereof after applying the electromagnetic radiation to the one or more areas of the surface; and c) coupling a second plurality of molecules to each region of the one or more regions of the surface, wherein each molecule of the second plurality of molecules comprises a utility moiety (e.g., a coupling moiety, a differing passivating moiety). For example, a patterned array of single-polypeptide binding sites may be formed in part by applying electromagnetic radiation to an entire surface of a solid support comprising a substantially uniform layer or coating of coupling molecules, with two or more areas of the surface blocked from receiving electromagnetic radiation by a mask component to form a patterned array of surface sites.

A patterned array comprising a plurality of surface sites may be formed by a method that includes a step of applying electromagnetic radiation to one or more areas of a surface of a solid support. In some cases, a patterned array comprising a plurality of surface sites may be formed by a method that includes a step of applying electromagnetic radiation to two or more areas of a surface of a solid support. In some particular cases, a method may comprise a step of applying electromagnetic radiation to each area of two or more areas of a surface simultaneously. In some particular cases, a method may comprise a step of applying electromagnetic radiation to each area of two or more areas of a surface sequentially. In some particular cases, a method may comprise a step of applying electromagnetic radiation to a subset of areas of two or more areas of a surface simultaneously. In some particular cases, a method may comprise a step of applying electromagnetic radiation to a subset of areas of two or more areas of a surface sequentially. In some cases, a method may comprise a step of repeating the application of electromagnetic radiation to an area of a surface, a subset of two or more areas of a surface, or each area of two or more areas of a surface.

A patterned array formed by a method, as set forth herein, may comprise a plurality of surface sites with an average spacing or separation between any two neighboring surface sites. Spacing or separation of surface sites may be measured as a point-to-point distance between surface site centers or surface site edges. An array may comprise an average spacing or separation between surface sites of at least about 10 nanometers (nm), 50 nm, 100 nm, 150 nm, 200 nm, 250 nm, 300 nm, 350 nm, 400 nm, 450 nm, 500 nm, 600 nm, 700 nm, 800 nm, 900 nm, 1 micron (μm), 5 μm, 10 μm, 20 μm, 50 μm, 100 μm, or more than 100 μm. An array may comprise an average spacing or separation between surface sites of no more than about 100 μm, 50 μm, 20 μm, 10 μm, 5 μm, 1 μm, 900 nm, 800 nm, 700 nm, 600 nm, 500 nm, 450 nm, 400 nm, 350 nm, 300 nm, 250 nm, 200 nm, 150 nm, 100 nm, 50 nm, 10 nm, or less than 10 nm.

A solid support or a coating or layer on a solid support may be characterized before, during, or after applying electromagnetic radiation to an area of a surface of the solid support. In some cases, a solid support or a coating or layer on a solid support may be characterized after coupling one or more utility moieties to a region of a surface altered or modified by applying electromagnetic radiation to the solid support. A solid support or a coating or layer on a solid support may be characterized to determine one or more chemical or physical properties of the solid support or a coating or layer on the solid support. A solid support or a coating or layer on a solid support may be characterized to determine a bulk chemical or physical property of the solid support or a coating or layer on the solid support. For example, a contact angle of a liquid on a surface of the solid support may be measured before and after applying electromagnetic radiation to determine a change in contact angle caused by the applied radiation. A solid support or a coating or layer on a solid support may be characterized to determine a single-analyte chemical or physical property of the solid support or a coating or layer on the solid support. For example, surface morphology and size for a group of surface sites formed by applying electromagnetic radiation to a solid support may be measured by atomic force microscopy. A characterization technique may provide a characteristic property, such as an absorbance frequency, a transmission frequency, an absorbance linewidth, a transmission linewidth, a surface roughness, an optical path length, an emission energy, an emission frequency, a feature size, a contact angle, or a surface energy. Exemplary characterization techniques may include surface plasmon resonance, atomic force microscopy, scanning electron microscopy, transmission electron microscopy, x-ray photoelectron spectroscopy, energy-dispersive x-ray spectroscopy, infrared spectroscopy, mass spectrometry, Raman spectroscopy, ultraviolet spectroscopy, contact angle measurement, contact angle hysteresis measurement, surface profilometry, surface interferometry, or a combination thereof. In some cases, a surface or a region of a surface may be characterized by a high-resolution optical technique (e.g., fluorescence microscopy) to A solid support produced by a method set forth herein may be characterized by a suitable technique. A solid support may be characterized to determine a suitable method for forming a surface site that is configured to couple a single analyte. For example, after applying electromagnetic radiation, a region of a surface altered by electromagnetic radiation may be characterized to identify a suitable chemistry to prepare the region of the surface to couple a single polypeptide or nucleic acid. In another aspect, provided herein is a method comprising: a) providing a solid support comprising a surface, in which the surface comprises: i) a first region comprising a first plurality of molecules that are coupled to the first region of the surface, wherein the first plurality of molecules form a substantially homogeneous layer on the first region of the surface; and ii) a second region comprising a second plurality of molecules that are coupled to the second region of the surface, in which the second plurality of molecules form a spatially and compositionally heterogeneous layer on the second region of the surface; and b) two or more of the steps of: i) identifying a first physical property of the first region of the surface; ii) identifying a second physical property of the second region of the surface; and iii) based upon the first physical property or the second physical property, determining a subsequent processing step.

A method of characterizing a solid support may comprise a subsequent processing step after identifying one or more properties or characteristics of the solid support, or a region thereof. In some cases, a subsequent processing step may be selected from a group consisting of: i) discarding the solid support; ii) applying additional electromagnetic radiation to the second region of the surface; iii) coupling a third plurality of molecules to the second region of the surface, iv) coupling a third plurality of molecules to the first region of the surface, or v) a combination thereof. In a particular configuration, coupling a third plurality of molecules to a second region may comprise coupling a molecule that is configured to couple an analyte to a surface of a solid support.

In some cases, a method of characterizing a solid support may comprise characterizing an array of surface sites formed on the solid support or a surface thereof. In some configurations, a surface of a solid support may comprise a plurality of second region, in which each second region comprises a second plurality of molecules that are coupled to each second region of the surface, in which the second plurality of molecules form a spatially and compositionally heterogeneous layer on each second region of the surface. In some particular configurations, a second region of the plurality of second regions may be non-contiguous to other second regions of the plurality of second regions. In some configurations, a plurality of second regions may form a patterned array.

An analyte may be coupled to a surface site formed on a surface of a solid support. An analyte may be coupled to a molecule coupled to a surface site, in which the molecule comprises a coupling moiety. For example, a surface site may comprise an oligonucleotide coupling moiety that is configured to hybridize to a complementary oligonucleotide that is conjugated to a polypeptide. In some cases, an analyte may be coupled to an intermediate moiety, in which the intermediate moiety is configured to form a coupling interaction with a coupling moiety that is coupled to a surface site. For example, a surface site may comprise a member of a Click-type reaction pair that is configured to covalently bond to a complementary member of a Click-type reaction pair that is coupled to a polypeptide-displaying DNA origami. In some cases, a plurality of analytes may be coupled to a plurality of surface sites of an array, in which each surface site comprises a single analyte of the plurality of analytes. Additional methods of coupling single analytes to arrays are set forth with particularity herein.

Single-Analyte Display Compositions

Further described herein are compositions that are formed on solid supports. In another aspect, provided herein is a solid support comprising a surface, in which the surface comprises: a) a first region comprising a first plurality of molecules that are coupled to the first region of the surface, in which the first plurality of molecules form a substantially homogeneous layer on the first region of the surface; and b) a second region comprising a second plurality of molecules that are coupled to the second region of the surface, in which the second plurality of molecules form a spatially and/or compositionally heterogeneous layer on the second region of the surface. In some configurations, a composition may comprise one or more first regions or one or more second regions. For example, an array of surface sites may be formed on a solid support that originally comprises a substantially uniform layer or coating on a surface or an area of a surface of the solid support, in which each surface site comprises a spatially and/or compositionally heterogeneous layer or coating. In some cases, a solid support composition may be formed by a method, as set forth herein.

In a particular configuration, a composition as set forth herein may comprise: a) a first region; b) a second region comprising a second plurality of molecules that are coupled to the second region of the surface, in which the second plurality of molecules form a spatially and/or compositionally heterogeneous layer on the second region of the surface; and c) a third region comprising no detectable molecules linked to the surface. In some configurations, a third region of a surface of a solid support may be characterized as containing no detectable molecules or derivatives thereof of a plurality of molecules that were originally present at the third region prior to applying electromagnetic radiation to the surface of the solid support. In some configurations, a third region of a surface of a solid support may be characterized as containing only a functional group at a surface site where a molecule of a plurality of molecules was originally present. For example, the laser ablation of an organosilane from a surface may form a third region containing surface-linked hydroxyl functional groups, in which the oxygen atom of the hydroxyl group is derived from the original organosilane molecule or an oxidative reaction of the surface (e.g., with water or oxygen). A third region may be a continuous region, such as the focal point of electromagnetic radiation on the surface. A second region may be a continuous region surrounding a third region (see, for example, FIG. 2B). A second region may be non-continuous, broken, random, or otherwise divided region. A third region may be non-continuous, broken, random, or otherwise divided region. In some cases, an irradiated portion of a surface of a solid support may produce a co-mingled second region and third region.

A composition may comprise a surface or an area of a surface containing a first region that comprises a first plurality of molecules, in which the first plurality of molecules form a substantially homogeneous layer or coating on the surface or the area of the surface. In some configurations, a first plurality of molecules may comprise a single species of molecules. For example, a first region of a surface of a silicon-containing solid support may comprise a plurality of surface-linked organosilanes, in which each organosilane comprises a linear PEG chain. A single species of molecules may refer to a plurality of molecules having identical chemical structures, or a high degree of structural similarity. For example, a single species of linear PEG molecules may comprise PEG chains that have size or length dispersity, but do not contain a detectable amount of branched or otherwise non-linear PEG chains. In another example, a single species of molecules may comprise a plurality of oligonucleotides, in which each oligonucleotide has an identical sequence or a differing sequence, but does not contain any non-natural nucleotides. In particular configurations, each molecule of a single species of molecules may comprise a passivating moiety, a coupling moiety, or a combination thereof. For example, a plurality of molecules may comprise a molecule containing an oligonucleotide that is coupled to a surface by an intermediate PEG moiety. In some configurations, a molecule of a plurality of molecules may comprise a coupling moiety containing a reactive moiety (e.g, a Click-type reactive moiety). In some configurations, a molecule of a plurality of molecules may comprise a coupling moiety containing a moiety that is configured to form a non-covalent interaction, such as a nucleic acid, an electrically-charged moiety, a magnetically-charged moiety, or a component of a receptor-ligand pair. In other configurations, a first plurality of molecules may comprise a first species of molecules and a second species of molecules. For example, a first species of molecules may comprise a first passivating moiety and a second species of molecules may comprise a second passivating moiety. In another example, a first species of molecules may comprise a first coupling moiety and a second species of molecules may comprise a second coupling moiety. In another example, a first species of molecules may comprise a passivating moiety and a second species of molecules may comprise a coupling moiety. In other configurations, a first plurality of molecules may comprise an impurity. An impurity may include a contaminant species of molecules. An impurity may comprise a structural or chemical derivative or isomer of a species present in a first plurality of molecules. An impurity may comprise a molecule of a second plurality of molecules, in which the molecule was transferred from a second region of a surface to a first region of the surface containing a first plurality of molecules.

A first region of a solid support may be characterized to identify one or more properties or characteristics of the first region or a first plurality of molecules coupled thereon. A surface property or characteristic may include a molecular surface density or a measure of variation thereof, a spatial or compositional dispersity of molecules (e.g., a measure of spatial dispersity of a plurality of molecules comprising a first species and second species of molecules), a surface energy or a measure of variation thereof, a surface contact angle or a measure of variation thereof, a layer thickness or a measure of variation thereof, or a combination thereof. A first plurality of molecules may be considered a substantially uniform layer or coating if a measured property or characteristic varies by no more than about 20%, 15%, 10%, 5%, 1%, 0.5%, 0.1%, 0.05%, 0.01%, 0.001%, or less than 0.001% from a reference value (e.g., an average value for an entire region of a surface, an average value for a set of N replicate surfaces, etc.). A property or characteristic of a first region of a surface may be measured by any suitable technique, such as surface plasmon resonance, atomic force microscopy, scanning electron microscopy, transmission electron microscopy, x-ray photoelectron spectroscopy, energy-dispersive x-ray spectroscopy, infrared spectroscopy, Raman spectroscopy, ultraviolet spectroscopy, contact angle measurement, surface profilometry, surface interferometry, or a combination thereof.

A composition may comprise a surface or an area of a surface containing a second region that comprises a second plurality of molecules, in which the second plurality of molecules form a spatially and/or compositionally heterogeneous layer or coating on the surface or the area of the surface. In some configurations, a second plurality of molecules may comprise a single species of molecules that comprise a spatially variable surface distribution over a second region of a surface or an area of a surface. For example, a second region of a solid support surface may comprise a spatially variable surface density of surface-linked PEG chains. In other configurations, a second plurality of molecules may comprise a first species of molecules and a second species of molecules, in which the first species of molecules and the second species of molecules may be spatially and/or compositionally variable. For example, a second region of a solid support surface may comprise a mixture of branched and linear PEG chains, in which the surface densities of each species vary between a first point of the second region and a second point of the second region. In a particular configuration, a second plurality of molecules may comprise a first species of molecules and a second species of molecules, in which the first species of molecules may comprises a first derivative molecule of a molecule of a first plurality of molecules, and the second species of molecules may comprises a second derivative molecule of the molecule of the first plurality of molecules. For example, a first region of a surface may comprise a plurality of linear PEG chains, and a second region of the surface may comprise a first molecule containing an oxidized linear PEG chain (e.g., a carboxylate-terminated PEG chain) and a second molecule containing a branched PEG chain or a branched PEG adduct. In other configurations, a first species of molecules may comprise a first derivative of a molecule of a first plurality of molecules, and a second species may comprise a surface-linked functional group. For example, a second region of a solid support surface may comprise an oxidized PEG chain and a surface-linked hydroxyl group or a surface-linked carboxylate group. In some cases, a surface-linked functional group may not comprise a linking moiety that couples the functional group to a surface.

A second region of a solid support surface may comprise a second plurality of molecules containing one or more species of molecules, in which the one or more species of molecules are spatially heterogeneous on the second region of the surface. For example, FIG. 2C depicts a second region of a surface in which most molecules of a second plurality of molecules are distributed in an annular first area surrounding a second area with a low quantity of molecules of the second plurality of molecules. A second region of a solid support surface containing a second plurality of molecules may comprise a first area and a second area, such that at least about 50%, 55%, 60%, 65%, 70%, 75%, 80%, 85%, 90%, 95%, 99%, 99.9%, 99.99%, 99.999%, or more than 99.999% of the second plurality of molecules is coupled to the first area on a mass or molar basis. Alternatively or additionally, a second region of a solid support surface containing a second plurality of molecules may comprise a first area and a second area, such that no more than about 99.999%, 99.99%, 99.9%, 99%, 95%, 90%, 85%, 80%, 75%, 70%, 65%, 60%, 55%, 50%, or less than 50% of the second plurality of molecules is coupled to the first area on a mass or molar basis. A second region of a solid support surface containing a second plurality of molecules, in which the second plurality of molecules contains a first species of molecules and a second species of molecules, may comprise a first area and a second area, such that at least about 50%, 55%, 60%, 65%, 70%, 75%, 80%, 85%, 90%, 95%, 99%, 99.9%, 99.99%, 99.999%, or more than 99.999% of the first species of molecules is coupled to the first area on a mass or molar basis. Alternatively or additionally, a second region of a solid support surface containing a second plurality of molecules, in which the second plurality of molecules contains a first species of molecules and a second species of molecules, may comprise a first area and a second area, such that no more than about 99.999%, 99.99%, 99.9%, 99%, 95%, 90%, 85%, 80%, 75%, 70%, 65%, 60%, 55%, 50%, or less than 50% of the first species of molecules is coupled to the first area on a mass or molar basis. In some configurations, a second region of a solid support surface may contain a first area or a second area that is adjacent to an edge of the second region of the surface. In other configurations, a second region of a solid support surface may contain a first area or a second area that surrounds a second area. In some configurations, a second plurality of molecules may comprise a spatially random distribution on a second region of a solid support surface. In particular configurations, a second plurality of molecules may comprise a first species of molecules and a second species of molecules, in which the first species of molecules and the second species of molecules may comprise a random spatial distribution in the second region of the surface as characterized by a difference in a surface density of the first species of molecules and/or a difference in a surface density of the second species of molecules measured at a first location and a second location of the second region of the surface.

A composition may comprise a first region and a second region with a particular arrangement on a surface of a solid support. In some configurations, a first region may surround a second region. In particular configurations, a first region may completely surround a second region. In other particular configurations, a first region may not completely surround a second region. In other configurations, a second region may surround a first region. In particular configurations, a second region may completely surround a first region. In other particular configurations, a second region may not completely surround a first region. In some configurations, a first region and/or a second region may be adjacent to an edge of a solid support or a surface thereof. In other configurations, a first region and/or a second region may not be adjacent to an edge of a solid support or a surface thereof.

A composition may comprise a first region containing a substantially uniform coating or layer, and a second region comprising a spatially and/or compositionally heterogeneous coating or layer. In some configurations, a composition may further comprise a third region comprising a third plurality of molecules that are coupled to the third region of the surface, wherein the third plurality of molecules form a spatially and/or compositionally heterogeneous layer on the third region of the surface. In some particular configurations, a composition may further comprise a plurality of additional regions, in which each region comprises a plurality of molecules, in which each plurality of molecules forms a spatially and/or compositionally heterogeneous layer on each additional region of the surface. In some particular configurations, a composition may further comprise a plurality of additional regions, in which each region comprises a unique characteristic chemical property, such as a unique average density, average surface density, surface composition, average wettability, average polarity, average electrical charge, average oxidation state, average chain length, average molecular weight, average hydrophobicity, average hydrophilicity, or a combination thereof. A composition may comprise an array, such as a random or patterned array, comprising a plurality of regions containing a spatially and/or compositionally heterogeneous layer. A composition may comprise a second region comprising a plurality of molecules and a third region comprising a third plurality of molecules, in which the spatial and/or compositional heterogeneity are indistinguishable as measured by any suitable characterization method, as set forth herein. A composition may comprise a second region comprising a plurality of molecules and a third region comprising a third plurality of molecules, in which the spatial and/or compositional heterogeneity differ as measured by any suitable characterization method, as set forth herein.

A composition may further comprise a plurality of modifying molecules that are configured to couple to a second region of the composition, in which the second region comprises a second plurality of molecules, in which the second plurality of molecules forms a spatially and/or compositionally heterogeneous layer. In some configurations, a modifying molecule of a plurality of modifying molecules may comprise a passivating moiety, as set forth herein. In some configurations, a modifying molecule of a plurality of modifying molecules may comprise a coupling moiety, as set forth herein. In some particular configurations, a coupling moiety of a modifying molecule may be configured to form a covalent interaction (e.g., a Click-type reaction). In other particular configurations, a coupling moiety may be configured to form a non-covalent interaction (e.g., an oligonucleotide, a member of a receptor-ligand pair, etc.).

In a configuration, a composition may comprise a solid support containing a surface, in which the surface comprises: a) a first region comprising a first plurality of molecules that are conjugated to the first region of the surface, in which the first plurality of molecules form a substantially homogeneous layer, and in which a molecule of the first plurality of molecules comprises: i) a first linking moiety that conjugates the molecule of the first plurality of molecules to the surface; and ii) a passivating moiety that is conjugated to the linking moiety; b) a second region comprising a second plurality of molecules that are conjugated to the second region of the surface, in which a molecule of the second plurality of molecules comprises: i) optionally, a derivative of the molecule of the first plurality of molecules that is conjugated to the surface; ii) a second linking moiety, in which the linking moiety is configured to conjugate the molecule of the second plurality of molecules to the surface or the derivative of the molecule of the first plurality of molecules; and iii) a coupling moiety that is configured to couple an analyte-displaying particle to the surface. In some particular configurations, a coupling moiety may comprise an oligonucleotide. In some particular configurations, a coupling moiety may comprise a Click-type reactive moiety. In some particular configurations, a composition may further comprise an analyte-displaying particle, in which the analyte-displaying particle is configured to couple a single analyte to a surface. In some particular configurations, an analyte-displaying particle may be coupled to a surface. In some particular configurations, an analyte-displaying particle may be coupled to a coupling moiety coupled to a second region of a composition. In some configurations, an analyte-displaying particle may comprise a structured nucleic acid particle. In some configurations, a structured nucleic acid particle may comprise a nucleic acid origami or a nucleic acid nanoball. In some configurations, a composition may further comprise a single analyte selected from the group consisting of a polypeptide, a nucleic acid, a polysaccharide, a metabolite, and a combination thereof. In some configurations, a composition may comprise a single analyte coupled to an analyte-displaying particle.

Analyte Assay Compositions and Methods

The present disclosure provides compositions, apparatus and methods that can be useful for characterizing sample components, such as proteins, nucleic acids, cells or other species, by obtaining multiple separate and non-identical measurements of the sample components. In particular configurations, the individual measurements may not, by themselves, be sufficiently accurate or specific to make the characterization, but an aggregation of the multiple non-identical measurements can allow that characterization to be made with a high degree of accuracy, specificity and confidence. For example, the multiple separate measurements can include subjecting the sample to reagents that are promiscuous with regard to recognizing multiple components of the sample. Accordingly, a first measurement carried out using a first promiscuous reagent may perceive a first subset of sample components without distinguishing one component from another. A second measurement carried out using a second promiscuous reagent may perceive a second subset of sample components, again, without distinguishing one component from another.

However, a comparison of the first and second measurements can distinguish: (i) a sample component that is uniquely present in the first subset but not the second; (ii) a sample component that is uniquely present in the second subset but not the first; (iii) a sample component that is uniquely present in both the first and second subsets; or (iv) a sample component that is uniquely absent in the first and second subsets. The number of promiscuous reagents used, the number of separate measurements acquired, and degree of reagent promiscuity (e.g. the diversity of components recognized by the reagent) can be adjusted to suit the component diversity expected for a particular sample.

For ease of explanation, the compositions, apparatus and methods of the present disclosure will be exemplified in the context of characterizing proteins using binding measurements. The examples set forth herein can be readily extended to characterizing other analytes (as an alternative or addition to proteins), or to the use of promiscuous reagents other than promiscuous binding agents. A composition, apparatus or method set forth herein can be used to characterize an analyte, or moiety thereof, with respect to any of a variety of characteristics or features including, for example, presence, absence, quantity (e.g. amount or concentration), chemical reactivity, molecular structure, structural integrity (e.g. full length or fragmented), maturation state (e.g. presence or absence of pre- or pro-sequence in a protein), location (e.g. in an analytical system, subcellular compartment, cell or natural environment), association with another analyte or moiety, binding affinity for another analyte or moiety, biological activity, chemical activity or the like. An analyte can be characterized with regard to a relatively generic characteristic such as the presence or absence of a common structural feature (e.g. amino acid sequence length, overall charge or overall pKa for a protein) or common moiety (e.g. a short primary sequence motif or post-translational modification for a protein). An analyte can be characterized with regard to a relatively specific characteristic such as a unique amino acid sequence (e.g. for the full length of the protein or a motif), an RNA or DNA sequence that encodes a protein (e.g. for the full length of the protein or a motif), or an enzymatic or other activity that identifies a protein. A characterization can be sufficiently specific to identify an analyte, for example, at a level that is considered adequate or unambiguous by those skilled in the art.

In particular configurations, a protein can be detected using one or more affinity agents having known or measurable binding affinity for the protein. For example, an affinity agent can bind a protein to form a complex and a signal produced by the complex can be detected. A protein that is detected by binding to a known affinity agent can be identified based on the known or predicted binding characteristics of the affinity agent. For example, an affinity agent that is known to selectively bind a candidate protein suspected of being in a sample, without substantially binding to other proteins in the sample, can be used to identify the candidate protein in the sample merely by observing the binding event. This one-to-one correlation of affinity agent to candidate protein can be used for identification of one or more proteins. However, as the protein complexity (i.e. the number and variety of different proteins) in a sample increases, or as the number of different candidate proteins to be identified increases, the time and resources to produce a commensurate variety of affinity agents having one-to-one specificity for the proteins approaches limits of practicality.

Methods set forth herein, can be advantageously employed to overcome these constraints. In particular configurations, the methods can be used to identify a number of different candidate proteins that exceeds the number of affinity agents used. For example, the number of candidate proteins identified can be at least 5×, 10×, 25×, 50×, 100× or more than the number of affinity agents used. This can be achieved, for example, by (1) using promiscuous affinity agents that bind to multiple different candidate proteins suspected of being present in a given sample, and (2) subjecting the protein sample to a set of promiscuous affinity agents that, taken as a whole, are expected to bind each protein in a different combination, such that each protein is expected to be encoded by a unique profile of binding and non-binding events. Promiscuity of an affinity agent is a characteristic that can be understood relative to a given population of proteins. Promiscuity can arise due to the affinity agent recognizing an epitope that is known to be present in a plurality of different candidate proteins, in which the candidate proteins are suspected of being present in the given population of proteins. For example, epitopes having relatively short amino acid lengths such as dimers, trimers, tetramers, pentamers or hexamers can be expected to occur in a substantial number of different proteins in the human proteome. Alternatively or additionally, a promiscuous affinity agent can recognize different epitopes (i.e. having a variety of different structures), the different epitopes being present in a plurality of different candidate proteins. For example, a promiscuous affinity agent that is designed or selected for its affinity toward a first trimer epitope may bind to a second epitope that has a different sequence of amino acids when compared to the first epitope.

Although performing a single binding reaction between a promiscuous affinity agent and a complex protein sample may yield ambiguous results regarding the identity of the different proteins to which it binds, the ambiguity can be resolved when the results are combined with other identifying information about those proteins. The identifying information can include characteristics of the protein such as length (i.e. number of amino acids), hydrophobicity, charge to mass ratio, isoelectric point, chromatographic fractionation behavior, enzymatic activity, presence or absence of post translational modifications or the like. The identifying information can include results of binding with other promiscuous affinity agents. For example, a plurality of different promiscuous affinity agents can be contacted with a complex population of proteins, in which the plurality is configured to produce a different binding profile for each candidate protein suspected of being present in the population. In this example, each of the affinity agents is distinguishable from the other affinity agents, for example, due to unique labeling (e.g. different affinity agents have different luminophore labels), unique spatial location (e.g. different affinity agents are located at different addresses in an array), and/or unique time of use (e.g. different affinity agents are delivered in series to a population of proteins). Accordingly, the plurality of promiscuous affinity agents produces a binding profile for each individual protein that can be decoded to identify a unique combination of epitopes present in the individual protein, and this can in turn be used to identify the individual protein as a particular candidate protein having the same or similar unique combination of epitopes. The binding profile can include observed binding events as well as observed non-binding events and this information can be compared to the presence and absence of epitopes, respectively, in a given candidate protein to make a positive identification.

In some configurations, distinct and reproducible binding profiles may be observed for some or even a substantial majority of proteins that are to be identified in a sample. However, in many cases one or more binding events produces inconclusive or even aberrant results and this, in turn, can yield ambiguous binding profiles. For example, observation of binding outcome for a single-molecule binding event can be particularly prone to ambiguities due to stochasticity in the behavior of single molecules when observed using certain detection hardware. The present disclosure provides methods that provide accurate protein identification despite ambiguities and imperfections that can arise in many contexts. In some configurations, methods for identifying, quantitating or otherwise characterizing one or more proteins in a sample utilize reference binding profiles for one or more candidate proteins that are suspected of being present in the sample. The reference binding profiles can include information regarding expected binding outcomes (e.g. binding or non-binding) for binding of one or more affinity agent with one or more candidate proteins. The information can include an a priori characteristic of a candidate protein, such as presence or absence of a particular epitope in the candidate protein or length of the candidate protein. Alternatively or additionally, the information can include empirically determined characteristics such as propensity or likelihood that the candidate protein will bind to a particular affinity agent despite lacking an a priori recognizable epitope for the affinity agent. Accordingly, a reference binding profile can include information regarding the propensity or likelihood of a given candidate protein generating a false positive or false negative binding result in the presence of a particular affinity agent, and such information can optionally be included for a plurality of affinity agents.

Methods set forth herein can be used to evaluate the degree of compatibility of one or more empirical binding profiles with one or more reference binding profiles to identify one or more candidate protein in a sample. For example, to identify a match, an empirical binding profile can be compared to reference binding profiles for many or all candidate proteins suspected of being in a given sample. In some configurations of the methods set forth herein, a match is determined based on the likelihood of the unknown protein being a particular candidate protein given the empirical binding pattern, or based on the probability of a particular candidate protein generating the empirical binding pattern. Optionally a score can be determined from the measurements that are acquired for the unknown protein with respect to many or all candidate proteins suspected of being in the sample. A digital or binary score that indicates one of two discrete states can be used. In particular configurations, the score can be non-digital or non-binary. For example, the score can be a value selected from a continuum of values such that an identity is made based on the score being above or below a threshold value. Moreover, a score can be a single value or a collection of values.

Methods, compositions and apparatus of the present disclosure can be advantageously deployed in a situation where proteins having identical primary structure generate different empirical binding profiles despite being subjected to the same set of affinity agents. For example, the methods, compositions and apparatus are well suited for single-molecule detection and other formats that are prone to stochastic variability. By evaluating the degree of compatibility of the empirical binding profiles with one or more reference binding profiles, proteins can be identified as being identical to the same candidate protein. Accordingly, the present disclosure provides compositions, apparatus and methods that overcome ambiguities and errors in observed binding outcomes to provide binding profiles that are useful for accurate identification of proteins. The methods can be advantageously deployed for complex samples including proteomes or subfractions thereof.

The present disclosure provides assays that are useful for detecting one or more analytes. Exemplary assays are set forth herein in the context of detecting proteins. Those skilled in the art will recognize that methods, compositions and apparatus set forth herein can be adapted for use with other analytes such as nucleic acids, polysaccharides, metabolites, vitamins, hormones, enzyme co-factors and others set forth herein or known in the art. Particular configurations of the methods, apparatus and compositions set forth herein can be made and used, for example, as set forth in U.S. Pat. No. 10,473,654 or US Pat. App. Pub. Nos. 2020/0318101 A1 or 2020/0286584 A1, each of which is incorporated herein by reference. Exemplary methods, systems and compositions are set forth in further detail below.

The present disclosure provides a method for identifying a candidate protein in a sample. The method can include steps of (a) contacting a plurality of different affinity agents with a plurality of proteins in a sample; (b) determining empirical binding profiles for individual proteins of the plurality of proteins, in which each of the empirical binding profiles comprise observed outcomes of binding or non-binding of the respective protein to the plurality of different affinity agents; (c) providing reference binding profiles for a plurality of candidate proteins; and (d) identifying a set of candidate proteins in the sample based on determining compatibility of the empirical binding profiles with the reference binding profiles. Optionally, a common candidate protein is identified from different empirical binding profiles for a plurality of candidate proteins in the set of candidate proteins.

In particular configurations, a method for identifying a candidate protein in a sample can include steps of (a) contacting a plurality of different affinity agents with a plurality of proteins in a sample, in which the plurality of proteins comprises a subset of proteins having identical primary structures; (b) determining empirical binding profiles for individual proteins of the plurality of proteins, in which each of the empirical binding profiles comprise observed outcomes of binding or non-binding of the respective protein to the plurality of different affinity agents, and in which different empirical binding profiles are generated for the proteins in the subset despite the proteins in the subset having identical primary structures; (c) providing reference binding profiles for a plurality of candidate proteins; and (d) identifying a set of candidate proteins in the sample based on determining compatibility of the empirical binding profiles with the reference binding profiles, in which the subset of proteins are identified to be the same candidate protein based on the degree of compatibility of a reference binding profile for the candidate protein with the different empirical binding profiles.

Optionally, a method for identifying a candidate protein in a sample can include steps of (a) contacting a plurality of different affinity agents with a plurality of proteins in a sample; (b) providing reference binding profiles for a set of candidate proteins, in which the reference binding profile for each said candidate protein comprises a plurality of the reference measurement outcomes for said candidate protein, in which each said reference measurement outcome comprises predicted outcome of binding or non-binding of said individual protein with the plurality of different affinity agents; (c) acquiring an empirical measurement outcome for an individual protein of the sample based on: (i) observation of binding or non-binding of the individual protein with an individual affinity agent of the plurality of different affinity agents, and (ii) determination of compatibility between the observed outcome and the reference measurement outcomes for the plurality of different affinity agents, whereby the empirical measurement outcome comprises an observed outcome that is compatible with a reference measurement outcome; (d) repeating step (c) for a plurality of the individual affinity agents, thereby generating an empirical binding profile for the individual protein, the empirical binding profile comprising a plurality of empirical measurement outcomes for the individual protein; and (e) identifying a candidate protein as being in the sample by determining an extent of compatibility between the plurality of empirical measurement outcomes for the individual protein and the reference binding profiles for the set of candidate proteins.

The present disclosure provides a method for locating proteins in an array of proteins. The method can include steps of (a) randomly attaching proteins to unique identifiers, thereby generating an array of different proteins, in which a unique identifier is attached to each said different protein; (b) contacting the array with a plurality of different affinity agents, whereby binding or non-binding of the affinity agents to the proteins produce signals associated with the unique identifiers; (c) determining empirical binding profiles from the signals associated with the unique identifiers, in which each of the empirical binding profiles comprises observed outcomes of binding or non-binding of the respective protein to the plurality of different affinity agents; (c) providing reference binding profiles for a plurality of candidate proteins; and (d) identifying a candidate protein attached to each of the unique identifiers based on determining compatibility of the empirical binding profiles with the reference binding profiles.

A composition, apparatus or method set forth herein can be used to identify proteins from a biological sample, such as a cell, organelle, tissue, or organism. As used herein, the terms "protein" or "polypeptide" refer to a molecule comprising two or more amino acids joined by a peptide bond. A protein may also be referred to as a polypeptide, oligopeptide or peptide. A protein can be a naturally-occurring molecule, or synthetic molecule. A protein may include one or more non-natural amino acids, modified amino acids, or non-amino acid linkers. A protein may contain D-amino acid enantiomers, L-amino acid enantiomers or both. Amino acids of a protein may be modified naturally or synthetically, such as by post-translational modifications.

A biological sample can be derived from a homogeneous culture or population of organisms or alternatively from a collection of several different organisms, for example, in a community or ecosystem. In particular configurations, the sample can be a proteome or subfraction of a proteome. A proteome or subfraction can have a complexity of at least 5, 10, 100, $1\times10^3$, $1\times10^4$, $2\times10^4$, $3\times10^4$ or more different native-length protein primary sequences. Alternatively or additionally, a proteome or subfraction can have a complexity that is at most $3\times10^4$, $2\times10^4$, $1\times10^4$, $1\times10^3$, 100, 10, 5 or less. A sample used herein need not be from a biological source and can instead be from synthetic source, such as a library from a combinatorial synthesis or a library from an in vitro synthesis that exploits biological components. A synthetic sample can have a complexity similar to those set forth above for proteomes. A method set forth herein can detect, identify or characterize some or all proteins in a proteome or other sample including, for example, at least about 1%, 5%, 10%, 25%, 50%, 75%, 90% or 99% of the proteins in the sample.

Some configurations of the compositions, apparatus or methods set forth herein, can distinguish different proteoforms, such as proteins having the same primary structure (i.e. the same sequence of amino acids) but differing with respect to the number, type, or location of post-translational modifications. Methods of the present disclosure can be configured to identify a number, type, or location for one or more post-translational modifications in one or more proteins of a sample. Exemplary post-translational modifications include, but are not limited to, a phosphoryl, glycosyl (e.g. N-acetylglucosamine or polysialic acid), ubiquitin, acyl (e.g. myristoyl or palmitoyl), isoprenyl, prenyl, farnesyl, geranylgeranyl, lipoyl, acetyl, alkyl (e.g. methyl or ethyl), flavin, heme, phosphopantetheinyl, C-terminal amidation, hydroxyl, nucleotidyl, adenylyl, uridylyl, proprionyl, S-glutathionyl, sulfate, succinyl, carbamyl, carbonyl, small ubiquitin-like modifier (e.g., SUMOyl), or nitrosyl moiety. A variety of post-translational modifications and methods for detection or characterization of proteoforms are set forth in U.S. Pat. App. Ser. Nos. 63/193,486 or 63/139,739, each of which is incorporated herein by reference.

Any of a variety of affinity agents can be used in a composition, apparatus or method set forth herein. As used herein, the term "affinity agent" refers to a molecule or other substance that is capable of specifically or reproducibly binding to an analyte (e.g. protein). An affinity agent can be larger than, smaller than or the same size as the analyte. An affinity agent may form a reversible or irreversible bond with an analyte. An affinity agent may bind with an analyte in a covalent or non-covalent manner. Affinity agents may include reactive affinity agents, catalytic affinity agents (e.g., kinases, proteases, etc.) or non-reactive affinity agents (e.g., antibodies or fragments thereof). An affinity agent can be non-reactive and non-catalytic, thereby not permanently altering the chemical structure of an analyte to which it binds. Affinity agents that can be particularly useful for binding to proteins include, but are not limited to, antibodies or functional fragments thereof (e.g., Fab' fragments, $F(ab')_2$ fragments, single-chain variable fragments (scFv), di-scFv, tri-scFv, or microantibodies), affibodies, affilins, affimers, affitins, alphabodies, anticalins, avimers, DARPins, monobodies, nanoCLAMPs, or lectins or functional fragments thereof.

An affinity agent can be characterized, for example, prior to use in a method set forth herein, with respect to its binding properties. Exemplary binding properties that can be characterized include, but are not limited to, specificity, strength of binding; equilibrium binding constant (e.g. $K_A$ or $K_D$); binding rate constant, such as association rate constant ($k_{on}$) or dissociation rate constant ($k_{off}$); binding probability; or the like. Binding properties can be determined with regard to an epitope, a set of epitopes (e.g. a set of proteins having structural similarities), a protein, a set of proteins (e.g. a set of proteins having structural similarities), or a proteome.

As used herein, the term "epitope" refers to an affinity target within a protein, polypeptide or other analyte. Epitopes may comprise amino acid sequences that are sequentially adjacent in the primary structure of a protein or amino acids that are structurally adjacent in the secondary, tertiary or quaternary structure of a protein. An epitope can optionally be recognized by or bound to an antibody. However, an epitope need not necessarily be recognized by any antibody, for example, instead being recognized by an aptamer, mini-protein or other affinity agent. An epitope can optionally bind an antibody to elicit an immune response. However, an epitope need not necessarily participate in, nor be capable of, eliciting an immune response.

An affinity agent can include a label. Exemplary labels include, without limitation, a fluorophore, luminophore, chromophore, nanoparticle (e.g., gold, silver, carbon nanotubes), heavy atom, radioactive isotope, mass label, charge label, spin label, receptor, ligand, nucleic acid barcode, polypeptide barcode, polysaccharide barcode, or the like. A label can produce any of a variety of detectable signals including, for example, an optical signal such as absorbance of radiation, luminescence (e.g. fluorescence or phosphorescence) emission, luminescence lifetime, luminescence polarization, or the like; Rayleigh and/or Mie scattering; magnetic properties; electrical properties; charge; mass; radioactivity or the like. A label component may produce a signal with a characteristic frequency, intensity, polarity, duration, wavelength, sequence, or fingerprint. A label need not directly produce a signal. For example, a label can bind to a receptor or ligand having a moiety that produces a characteristic signal. Such labels can include, for example, nucleic acids that are encoded with a particular nucleotide sequence, avidin, biotin, non-peptide ligands of known receptors, or the like. An affinity agent may include a label that has an inducible signal. For example, an affinity agent may comprise a fluorophore that is induced by an exciting photon, an enzymatic group (e.g., horseradish peroxidase) that produces a fluorescent reaction product in the presence of a substrate, or a component of a proximity-based pair that may produce a signal when in close proximity to a complementary label (e.g., a Forster resonant energy transfer (FRET) fluorophore pair).

A method set forth herein can be carried out in a fluid phase or on a solid phase. For fluid phase configurations, a fluid containing one or more proteins can be mixed with another fluid containing one or more affinity agents. For solid phase configurations one or more proteins or affinity agents can be attached to a solid support. One or more components that will participate in a binding event can be contained in a fluid and the fluid can be delivered to a solid support, the solid support being attached to one or more other component that will participate in the binding event. As used herein, the term "solid support" refers to a substrate that is insoluble in aqueous liquid. Optionally, the substrate can be rigid. The substrate can be non-porous or porous. The substrate can optionally be capable of taking up a liquid (e.g. due to porosity) but will typically, but not necessarily, be sufficiently rigid that the substrate does not swell substantially when taking up the liquid and does not contract substantially when the liquid is removed by drying. A nonporous solid support is generally impermeable to liquids or gases. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefins, polyimides etc.), nylon, ceramics, resins, Zeonor™, silica or silica-based materials including silicon and modified silicon, carbon, metals, inorganic glasses, optical fiber bundles, gels, and polymers. In particular configurations a flow cell contains the solid support such that fluids introduced to the flow cell can interact with a surface of the solid support to which one or more components of a binding event (or other reaction) is attached.

A method of the present disclosure can be carried out at single analyte resolution. As used herein, the term "single analyte" refers to an analyte (e.g. protein, nucleic acid, or affinity agent) that is individually manipulated or distinguished from other analytes. A single analyte can be a single molecule (e.g. single protein), a single complex of two or more molecules (e.g. a single protein attached to a structured nucleic acid particle or a single protein attached to an affinity agent), a single particle, or the like. A single analyte may be resolved from other analytes based on, for example, spatial or temporal separation from the other analytes. Accordingly, an analyte can be detected at "single-analyte resolution" which is the detection of, or ability to detect, the analyte on an individual basis, for example, as distinguished from its nearest neighbor in an array. Reference herein to a 'single analyte' in the context of a composition, apparatus or method does not necessarily exclude application of the composition, apparatus or method to multiple single analytes that are manipulated or distinguished individually, unless indicated contextually or explicitly to the contrary.

Alternatively to single-analyte resolution, a method can be carried out at ensemble-resolution or bulk-resolution. Bulk-resolution configurations acquire a composite signal from a plurality of different analytes or affinity agents in a vessel or on a surface. For example, a composite signal can be acquired from a population of different protein-affinity agent complexes in a well or cuvette, or on a solid support surface, such that individual complexes are not resolved from each other. Ensemble-resolution configurations acquire a composite signal from a first collection of proteins or affinity agents in a sample, such that the composite signal is distinguishable from signals generated by a second collection of proteins or affinity agents in the sample. For example, the ensembles can be located at different addresses in an array. Accordingly, the composite signal obtained from each address will be an average of signals from the ensemble, yet signals from different addresses can be distinguished from each other.

A composition, apparatus or method set forth herein can be configured to contact one or more proteins (e.g. an array of different proteins) with a plurality of different affinity agents. For example, a plurality of affinity agents (whether configured separately or as a pool) may comprise at least 2, 5, 10, 25, 50, 100, 250, 500 or more types of affinity agents, each type of affinity agent differing from the other types with respect to the epitope(s) recognized. Alternatively or additionally, a plurality of affinity agents may comprise at most 500, 250, 100, 50, 25, 10, 5, or 2 types of affinity agents, each type of affinity agent differing from the other types with respect to the epitope(s) recognized. Different types of affinity agents in a pool can be uniquely labeled such that the different types can be distinguished from each other. In some configurations, at least two, and up to all, of the different types of affinity agents in a pool may be indistinguishably labeled. Alternatively or additionally to the use of unique labels, different types of affinity agents can be delivered and detected serially when evaluating one or more proteins (e.g. in an array).

A method of the present disclosure can be performed in a multiplex format. In multiplexed configurations, different proteins can be attached to different unique identifiers (e.g. addresses in an array), and the proteins can be manipulated and detected in parallel. For example, a fluid containing one or more different affinity agents can be delivered to an array such that the proteins of the array are in simultaneous contact with the affinity agent(s). Moreover, a plurality of addresses can be observed in parallel allowing for rapid detection of binding events. A plurality of different proteins can have a complexity of at least 5, 10, 100, $1\times10^3$, $1\times10^4$, $2\times10^4$, $3\times10^4$ or more different native-length protein primary sequences. Alternatively or additionally, a proteome or proteome subfraction that is analyzed in a method set forth herein can have a complexity that is at most $3\times10^4$, $2\times10^4$, $1\times10^4$, $1\times10^3$, 100, 10, 5 or fewer different native-length protein primary sequences. The plurality of proteins can constitute a proteome or subfraction of a proteome. The total number of proteins of a sample that is detected, characterized or identified can differ from the number of different primary sequences in the sample, for example, due to the presence of multiple copies of at least some protein species. Moreover, the total number of proteins of a sample that is detected, characterized or identified can differ from the number of candidate proteins suspected of being in the sample, for example, due to the presence of multiple copies of at least some protein species, absence of some proteins in a source for the sample, or loss of some proteins prior to analysis.

A particularly useful multiplex format uses an array of proteins and/or affinity agents. As used herein, the term "array" refers to a population of analytes (e.g. proteins) that are attached to unique identifiers such that the analytes can be distinguished from each other. As used herein, the term "unique identifier" refers to a solid support (e.g. particle or bead), spatial address in an array, tag, label (e.g. luminophore), or barcode (e.g. nucleic acid barcode) that is attached to an analyte and that is distinct from other identifiers, throughout one or more steps of a process. The process can be an analytical process such as a method for detecting, identifying, characterizing or quantifying an analyte. Attachment to a unique identifier can be covalent or non-covalent (e.g. ionic bond, hydrogen bond, van der Waals forces etc.). A unique identifier can be exogenous to the analyte, for example, being synthetically attached to the analyte. Alternatively, a unique identifier can be endogenous to the analyte, for example, being attached or associated with the analyte in the native milieu of the analyte. An array can include different analytes that are each attached to different unique identifiers. An array can include different unique identifiers that are attached to the same or similar analytes. An array can include separate solid supports or separate addresses that each bear a different analyte, in which the different analytes can be identified according to the locations of the solid supports or addresses.

As used herein, the term "address," when used in reference to an array, means a location in an array where a particular analyte (e.g. protein) is present. An address can contain a single analyte, or it can contain a population of several analytes of the same species (i.e. an ensemble of the analytes). Alternatively, an address can include a population of different analytes. Addresses are typically discrete. The discrete addresses can be contiguous, or they can be separated by interstitial spaces. An array useful herein can have, for example, addresses that are separated by an average distance of less than 100 microns, 10 microns, 1 micron, 100 nm, 10 nm or less. Alternatively or additionally, an array can have addresses that are separated by an average distance of at least 10 nm, 100 nm, 1 micron, 10 microns, or 100 microns. The addresses can each have an area of less than 1 square millimeter, 500 square microns, 100 square microns, 10 square microns, 1 square micron, 100 square nm or less. An array can include at least about $1\times10^4$, $1\times10^5$, $1\times10^6$, $1\times10^7$, $1\times10^8$, $1\times10^9$, $1\times10^{10}$, $1\times10^{11}$, $1\times10^{12}$, or more addresses. Average spacing of addresses may be determined by any suitable method, such as optical microscopy, electron microscopy, atomic force microscopy, or surface profilometry.

A protein can be attached to a unique identifier using any of a variety of means. The attachment can be covalent or non-covalent. Exemplary covalent attachments include chemical linkers such as those achieved using click chemistry or other linkages known in the art or described in U.S. patent application Ser. No. 17/062,405, which is incorporated herein by reference. Non-covalent attachment can be mediated by receptor-ligand interactions (e.g. (strept) avidin-biotin, antibody-antigen, or complementary nucleic acid strands), for example, in which the receptor is attached to the unique identifier and the ligand is attached to the protein or vice versa. In particular configurations, a protein is attached to a solid support (e.g. an address in an array) via a structured nucleic acid particle (SNAP). A protein can be attached to a SNAP and the SNAP can interact with a solid support, for example, by non-covalent interactions of the DNA with the support and/or via covalent linkage of the SNAP to the support. Nucleic acid origami or nucleic acid nanoballs are particularly useful. The use of SNAPs and other moieties to attach proteins to unique identifiers such as tags or addresses in an array are set forth in U.S. patents application Ser. Nos. 17/062,405 and 63/159,500, each of which is incorporated herein by reference.

A method of the present disclosure can include a step of assaying binding between a protein and affinity agent to determine a measurement outcome. As used herein, the term "measurement outcome" refers to information resulting from observation or examination of a process. For example, the measurement outcome for contacting an affinity agent with an analyte can be referred to as a "binding outcome." A measurement outcome can be positive or negative. For example, observation of binding is a positive binding outcome and observation of non-binding is a negative binding outcome. A measurement outcome can be a null outcome in the event a positive or negative outcome does not result from a given measurement. An "empirical" measurement outcome includes information based on observation of a signal from an analytical technique. A "putative" measurement outcome includes information based on theoretical or a priori evaluation of an analytical technique or analytes.

Binding can be detected using any of a variety of techniques that are appropriate to the assay components used. For example, binding can be detected by acquiring a signal from a label attached to an affinity agent when bound to an observed protein, acquiring a signal from a label attached to protein when bound to an observed affinity agent, or signal (s) from labels attached to an affinity agent and protein. In some configurations a protein-affinity agent complex need not be directly detected, for example, in formats where a nucleic acid tag or other moiety is created or modified as a result of binding between the protein and affinity agent. Optical detection techniques such as luminescent intensity detection, luminescence lifetime detection, luminescence polarization detection, or surface plasmon resonance detection can be useful. Other detection techniques include, but are not limited to, electronic detection such as techniques that utilize a field-effect transistor (FET), ion-sensitive FET, or chemically-sensitive FET. Exemplary methods are set forth in U.S. Pat. No. 10,473,654 or U.S. Pat. App. Ser. Nos. 63/112,607 or 63/132,170, each of which is incorporated herein by reference.

A method of the present disclosure can include a step of determining an empirical binding profile for a protein. The empirical binding profile can include observed outcomes of binding or non-binding of the protein to a plurality of different affinity agents. In a multiplex format, an empirical binding profile can be determined for each of the proteins of a plurality of proteins, in which each of the empirical binding profiles comprise observed outcomes of binding or non-binding of the respective protein to a plurality of different affinity agents. As used herein, the term "binding profile" refers to a plurality of binding outcomes for a protein or other analyte. The binding outcomes can be obtained from independent binding observations, for example, independent binding outcomes can be acquired using different affinity agents, respectively. A binding profile can include empirical measurement outcomes, putative measurement outcomes or both. A binding profile can exclude empirical measurement outcomes or putative measurement outcomes.

A reference binding profile can include a plurality of putative binding outcomes for a candidate protein. Reference profiles can be provided for a plurality of different candidate proteins. The plurality of candidate proteins may comprise at least 10, 20, 30, 40, 50, 60, 70, 80, 90, 100, 200, 300, 400, 500, 600, 800, 1000, or more different candidate proteins. In some embodiments, one or more reference binding profiles can be stored in database. Particularly useful information that can be included in a database or in a reference binding profile includes, for example, binding characteristics for binding of one or more affinity agents to a protein. For example, the information can include a binding probability of each of a plurality of affinity agents to each of a plurality of candidate proteins. In some configurations, binding probabilities or other binding characteristics are derived empirically, for example, from binding experiments carried out between one or more known candidate proteins and known affinity agent(s). In some embodiments, binding probabilities or other binding characteristics are derived based on a priori information such as presence of a suspected epitope sequence in the structure (e.g. amino acid sequence) of a candidate protein. A reference binding profile for a candidate protein can include a probability or likelihood that an empirical measurement of the candidate protein would generate an observed measurement outcome. Additionally, or alternatively, a reference binding profile for a candidate protein can include a probability that an empirical measurement of the candidate protein would not generate an observed measurement outcome.

A reference binding profile can be used in a method or apparatus of the present disclosure. For example, one or more candidate protein can be identified in a sample by evaluating the degree of compatibility of an empirical binding profile for each candidate protein with one or more reference binding profiles. An empirical binding profile for an unknown protein can be compared to reference binding profiles for many or all candidate proteins suspected of being in a given sample, and the results of the comparison can be used to identify a candidate protein that is a match. In accordance with the present methods, the identity for a particular unknown protein can be determined based on the likelihood of every candidate protein being the unknown protein. The likelihood of a given candidate protein being the unknown protein can be determined based on the probability of each affinity agent binding to the given candidate protein.

In some configurations of the methods set forth herein, the empirical pattern for an unknown protein is assigned a score indicating the likelihood of the unknown protein being a particular candidate protein given the empirical binding pattern, and/or the score can indicate the probability of a particular candidate protein generating the empirical binding pattern. Optionally, a score can be determined for the unknown protein with respect to many or all candidate proteins suspected of being in the sample. The scores can be combined, the proportion of the total score contributed by the top matching score can be determined, and the proportion can be compared to a threshold value to determine whether an identification will be made.

A particularly useful score for evaluating degree of compatibility of a binding profile to a candidate protein is a proportion. For example, an observed binding profile can be compared to individual binding profiles expected for a set of candidate proteins, each comparison can be given a numerical score indicating goodness of fit, the scores can be summed, and the score for the best fit comparison can be divided by the sum to derive a proportion of the score contributed by the top match. A threshold can be applied to filter out incorrect identifications. By way of more specific example, each binding profile comparison can output a score between 0 and 1 (0 being lowest possible match and 1 being the highest possible match) indicating the likelihood of the detected protein being a particular candidate protein given the observed binding profile (or the score can indicate the probability of the particular candidate protein generating the observed binding profile), a score can be calculated from a comparison of the observed binding profile to each candidate protein suspected of being in an organism's proteome (e.g. a human proteome), and the threshold can be set at 0.9. As such, a given binding profile will only result in a candidate identification if exactly one protein matches well.

The scores that are used to identify a candidate protein can be determined using a machine learning algorithm such as deep learning, statistical learning, supervised learning, unsupervised learning, clustering, expectation maximization, maximum likelihood estimation, Bayesian inference, linear regression, logistic regression, binary classification, multinomial classification, support vector machines (SVMs), neural networks, convolutional neural networks (CNNs), deep neural networks, cascading neural networks, k-Nearest Neighbor (k-NN) classification, random forests (RFs), classification and regression trees (CARTs) or pattern recognition algorithms. For example, the software may perform the one or more algorithms to analyze inputs such as (i) a priori binding characteristic of one or more affinity agents, (ii) empirically observed binding behavior of one or more affinity agents, (iii) putative binding outcomes or putative binding profiles for one or more candidate proteins, (iv) presence or absence of particular epitopes in candidate proteins, (v) characteristics of binding outcomes used to generate one or more binding profiles, (vi) information identifying a unique identifier (e.g. array address) for an empirically observed protein, and/or (vii) empirical binding outcomes or empirical binding profiles for one or more unknown proteins. Thus, the input to an algorithm of the present disclosure may include a database of information for one or more candidate proteins and a set of empirical binding outcomes for one or more unknown proteins. The output of the algorithm may include (i) a probability that a binding outcome or binding profile is observed given a hypothesized candidate protein identity, (ii) the most probable identity, selected from the set of candidate proteins, for an unknown protein, (iii) the probability of a candidate identification being correct given an observed empirical binding outcome or empirical binding profile, and/or (iv) a group of high-probability candidate protein identities and an associated probability that an unknown protein is one of the proteins in the group. Exemplary algorithms, and methods for characterizing proteins, are set forth, for example in US Pat App. Pub. No 2020/0286584 A1, which is incorporated herein by reference.

Accordingly, a method set forth herein can include a step of identifying one or more candidate proteins in a sample based on determination of the compatibility of an empirical binding profiles with one or more reference binding profiles for one or more candidate proteins. The method can be further configured to provide a confidence level that each of one or more candidate proteins is present in the sample. Decoding protein identity may be applied independently to each unknown protein in a sample, to generate a collection of candidate proteins identified in the sample. For example, the decoding approach may be applied independently to individual addresses of an array.

A composition or method as set forth herein may comprise one or more analytes that are coupled to a solid support or a surface thereof. As used herein, the term "solid support" refers to a substrate that is insoluble in aqueous liquid. Optionally, the substrate can be rigid. The substrate can be non-porous or porous. The substrate can optionally be capable of taking up a liquid (e.g. due to porosity) but will typically, but not necessarily, be sufficiently rigid that the substrate does not swell substantially when taking up the liquid and does not contract substantially when the liquid is removed by drying. A nonporous solid support is generally impermeable to liquids or gases. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefins, polyimides etc.), nylon, ceramics, resins, Zeonor™, silica or silica-based materials including silicon and modified silicon, carbon, metals, inorganic glasses, optical fiber bundles, gels, and polymers. In some cases, a solid support may comprise silicon, fused silica, quartz, mica, or borosilicate glass.

A solid support or a surface thereof may be configured to display an analyte or a plurality of analytes. A solid support may contain one or more patterned, formed, or prepared surfaces that contain at least one address for displaying an analyte. In some cases, a solid support may contain one or more patterned, formed, or prepared surfaces that contain a plurality of addresses, with each address configured to display one or more analytes. Accordingly, an array as set forth herein may comprise a plurality of analytes coupled to a solid support or a surface thereof. In some configurations, a solid support or a surface thereof may be patterned or formed to produce an ordered or patterned array of addresses. The deposition of analytes on the ordered or patterned array of addresses may be controlled by interactions between the solid support and the analytes such as, for example, electrostatic interactions, magnetic interactions, hydrophobic interactions, hydrophilic interactions, covalent interactions, or non-covalent interactions. Accordingly, the coupling of an analyte at each address of the array of addresses may produce an ordered or patterned array of analytes whose average spacing between analytes is determined based upon the tolerance of the ordering or patterning of the solid support and the size of an analyte-binding region for each address. An ordered or patterned array of analytes may be characterized as having a regular geometry, such as a rectangular, triangular, polygonal, or annular grid. In other configurations, a solid support or a surface thereof may be unpatterned or unordered. The deposition of analytes on the unordered or unpatterned array of addresses may be controlled by interactions between the solid support and the analytes, or inter-analyte interactions such as, for example, steric repulsion, electrostatic repulsion, electrostatic attraction, magnetic repulsion, magnetic attraction, covalent interactions, or non-covalent interactions.

A solid support or a surface thereof may include a base substrate material and, optionally, one or more additional materials that are contacted or adhered with the substrate material. A solid support may comprise one or more additional materials that are deposited, coated, or inlayed onto the substrate material. Additional materials may be added to the substrate material to alter the properties of the substrate material. For example, materials may be added to alter the surface chemistry (e.g., hydrophobicity, hydrophilicity, non-specific binding, electrostatic properties), alter the optical properties (e.g., reflective properties, refractive properties), alter the electrical or magnetic properties (e.g., dielectric materials, conducting materials, electrically-insulating materials), or alter the heat transfer characteristics of the substrate material. Additional materials contacted or adhered with a substrate material may be ordered or patterned onto the substrate material to, for example, locate the additional material at addresses or locate the additional material at interstitial regions between addresses. Exemplary additional materials may include metals (e.g., gold, silver, copper, etc.), metal oxides (e.g., titanium oxide, silicon dioxide, alumina, iron oxides, etc.), metal nitrides (e.g., silicon nitride, aluminum nitride, boron nitride, gallium nitride, etc.), metal carbides (e.g., tungsten carbide, titanium carbide, iron carbide, etc.), metal sulfides (e.g., iron sulfide, silver sulfide, etc.), and organic moieties (e.g., polyethylene glycol (PEG), dextrans, chemically-reactive functional groups, etc.). An ordered or patterned array may be formed on a solid support by a suitable method, for example, photolithography, Dip-Pen nanolithography, nanoimprint lithography, nanosphere lithography, nanoball lithography, nanopillar arrays, nanowire lithography, scanning probe lithography, thermochemical lithography, thermal scanning probe lithography, local oxidation nanolithography, molecular self-assembly, stencil lithography, or electron-beam lithography.

A method of the present disclosure can include the step of coupling one or more analytes to a solid support or a surface thereof prior to the measurement of a binding profile. The coupling of one or more analytes to a solid support surface may include covalent or non-covalent coupling of the one or more analytes to the solid support. Covalent coupling of an analyte to a solid support can include direct covalent coupling of an analyte to a solid support (e.g., formation of coordination bonds) or indirect covalent coupling between a reactive functional group of the analyte and a reactive functional group that is coupled to the solid support (e.g., a CLICK-type reaction). Non-covalent coupling can include the formation of any non-covalent interaction between an analyte and a solid support, including electrostatic or magnetic interactions, or non-covalent bonding interactions (e.g., ionic bonds, van der Waals interactions, hydrogen bonding, etc.). The skilled person will readily recognize that the particular analyte and the choice of solid support can affect the selection of a coupling chemistry for the compositions and methods set forth herein.

Accordingly, a coupling chemistry may be selected based upon the criterium that it provides a sufficiently stable coupling of an analyte to a solid support for a time scale that meets or exceeds the time scale of a method as set forth herein. For example, a polypeptide identification method can require a coupling of the analyte to the solid support for a sufficient amount of time to permit a series of empirical measurements of the analyte to occur. An analyte may be continuously coupled to a solid support for an observable length of time such as, for example, at least about 1 minute, 1 hour (hr), 3 hrs, 6 hrs, 12 hrs, 1 day, 1.5 days, 2 days, 3 days, 1 week (wk), 2 wks, 3 wks, 1 month, or more. The coupling of an analyte to a solid support can occur with a solution-phase chemistry that promotes the deposition of the analyte on the solid support. Coupling of an analyte to a solid support may occur under solution conditions that are optimized for any conceivable solution property, including solution composition, species concentrations, pH, ionic strength, solution temperature, etc. Solution composition can be varied by chemical species, such as buffer type, salts, acids, bases, and surfactants. In some configurations, species such as salts and surfactants may be selected to facilitate the formation of interactions between an analyte and a solid support.

Covalent coupling methods for coupling an analyte to a solid support may include species such as catalyst, initiators, and promoters to facilitate particular reactive chemistries.

Coupling of an analyte to a solid support may be facilitated by a mediating group. A mediating group may modify the properties of the analyte to facilitate the coupling. Useful mediating groups have been set forth herein (e.g., SNAPs). In some configurations, a mediating group can be coupled to an analyte prior to coupling the analyte to a solid support. Accordingly, the mediating group may be chosen to increase the strength, control, or specificity of the coupling of the analyte to the solid support. In other configurations, a mediating group can be coupled to a solid support prior to coupling an analyte to the solid support. Accordingly, the mediating group may be chosen to provide a more favorable coupling chemistry than can be provided by the solid support alone.

The present disclosure provides compositions, apparatus and methods for detecting one or more proteins. A protein can be detected using one or more affinity agents having binding affinity for the protein. The affinity agent and the protein can bind each other to form a complex and, during or after formation, the complex can be detected. The complex can be detected directly, for example, due to a label that is present on the affinity agent or protein. In some configurations, the complex need not be directly detected, for example, in formats where the complex is formed and then the affinity agent, protein, or a label component that was present in the complex is detected.

Many protein detection methods, such as enzyme linked immunosorbent assay (ELISA), achieve high-confidence characterization of one or more protein in a sample by exploiting high specificity binding of antibodies, aptamers or other binding agents to the protein(s) and detecting the binding event while ignoring all other proteins in the sample. ELISA is generally carried out at low plex scale (e.g. from one to a hundred different proteins detected in parallel or in succession) but can be used at higher plexity. ELISA methods can be carried out by detecting immobilized binding agents and/or proteins in multiwell plates, on arrays, or on particles in microfluidic devices. Exemplary plate-based methods include, for example, the MULTI-ARRAY® technology commercialized by MesoScale Diagnostics® (Rockville, Maryland) or Simple Plex™ technology commercialized by Protein Simple™ (San Jose, CA). Exemplary, array-based methods include, but are not limited to those utilizing Simoa® Planar Array Technology or Simoa® Bead Technology, commercialized by Quanterix™ (Billerica, MA). Further exemplary array-based methods are set forth in U.S. Pat. Nos. 9,678,068; 9,395,359; 8,415,171; 8,236,574; or 8,222,047, each of which is incorporated herein by reference. Exemplary microfluidic detection methods include those commercialized by Luminex® (Austin, Texas) under the trade name xMAP® technology or used on platforms identified as MAGPIX®, LUMINEX® 100/200 or FEXMAP 3D®.

Other detection methods that can also be used, for example at low plex scale, include procedures that employ SOMAmer® reagents and SOMAscan® assays commercialized by Soma Logic® (Boulder, CO). In one configuration, a sample is contacted with aptamers that are capable of binding proteins with high specificity for the amino acid sequence of the proteins. The resulting aptamer-protein complexes can be separated from other sample components, for example, by attaching the complexes to beads (or other solid support) that are removed from other sample components. The aptamers can then be isolated and, because the aptamers are nucleic acids, the aptamers can be detected using any of a variety of methods known in the art for detecting nucleic acids, including for example, hybridization to nucleic acid arrays, PCR-based detection, or nucleic acid sequencing. Exemplary methods and compositions are set forth in U.S. Pat. Nos. 7,855,054; 7,964,356; 8,404,830; 8,945,830; 8,975,026; 8,975,388; 9,163,056; 9,938,314; 9,404,919; 9,926,566; 10,221,421; 10,239,908; 10,316,321 10,221,207 or 10,392,621, each of which is incorporated herein by reference.

In some detection assays, a protein can be cyclically modified and the modified products from individual cycles can be detected. In some configurations, a protein can be sequenced by a sequential process in which each cycle includes steps of labeling and removing the amino terminal amino acid of a protein and detecting the label. Accordingly, a method of detecting a protein can include steps of (i) exposing a terminal amino acid on the protein; (ii) detecting a change in signal from the protein; and (iii) identifying the type of amino acid that was removed based on the change detected in step (ii). The terminal amino acid can be exposed, for example, by removal of one or more amino acids from the amino terminus or carboxyl terminus of the protein. Steps (i) through (iii) can be repeated to produce a series of signal changes that is indicative of the sequence for the protein.

In a first configuration of the above method, one or more types of amino acids in the protein can be attached to a label that uniquely identifies the type of amino acid. In this configuration, the change in signal that identifies the amino acid can be loss of signal from the respective label. Exemplary compositions and techniques that can be used to remove amino acids from a protein and detect signal changes are those set forth in Swaminathan et al., Nature Biotech. 36:1076-1082 (2018); or U.S. Pat. No. 9,625,469 or 10,545,153, each of which is incorporated herein by reference. Methods and apparatus under development by Erisyon, Inc.™ (Austin, TX) may also be useful for detecting proteins.

In a second configuration of the above method, the terminal amino acid of the protein can be recognized by an affinity agent that is specific for the terminal amino acid or specific for a label moiety that is present on the terminal amino acid. The affinity agent can be detected on the array, for example, due to a label on the affinity agent. Optionally, the label is a nucleic acid barcode sequence that is added to a primer nucleic acid upon formation of a complex. The formation of the complex and identity of the terminal amino acid can be determined by decoding the barcode sequence. Exemplary affinity agents and detection methods are set forth in US Pat. App. Pub. No. 2019/0145982 A1; 2020/0348308 A1; or 2020/0348307 A1, each of which is incorporated herein by reference. Methods and apparatus under development by Encodia, Inc.® (San Diego, CA) may also be useful for detecting proteins.

Cyclical removal of terminal amino acids from a protein can be carried out using an Edman-type sequencing reaction in which a phenyl isothiocyanate reacts with a N-terminal amino group under mildly alkaline conditions (e.g. about pH 8) to form a cyclical phenylthiocarbamoyl Edman complex derivative. The phenyl isothiocyanate may be substituted or unsubstituted with one or more functional groups, linker groups, or linker groups containing functional groups. An Edman-type sequencing reaction can include variations to reagents and conditions that yield a detectable removal of amino acids from a protein terminus, thereby facilitating determination of the amino acid sequence for a protein or portion thereof. For example, the phenyl group can be replaced with at least one aromatic, heteroaromatic or aliphatic group which may participate in an Edman-type sequencing reaction, non-limiting examples including: pyridine, pyrimidine, pyrazine, pyridazoline, fused aromatic groups such as naphthalene and quinoline), methyl or other alkyl groups or alkyl group derivatives (e.g., alkenyl, alkynyl, cyclo-alkyl). Under certain conditions, for example, acidic conditions of about pH 2, derivatized terminal amino acids may be cleaved, for example, as a thiazolinone derivative. The thiazolinone amino acid derivative under acidic conditions may form a more stable phenylthiohydantoin (PTH) or similar amino acid derivative which can be detected. This procedure can be repeated iteratively for residual protein to identify the subsequent N-terminal amino acid. Many variations of Edman-type degradation have been described and may be used including, for example, a one-step removal of an N-terminal amino acid using alkaline conditions (Chang, J. Y., *FEBS LETTS.*, 1978, 91(1), 63-68). In some cases, Edman-type reactions may be thwarted by N-terminal modifications which may be selectively removed, for example, N-terminal acetylation or formylation (e.g., see Gheorghe M. T., Bergman T. (1995) in *Methods in Protein Structure Analysis*, Chapter 8: Deacetylation and internal cleavage of Proteins for N-terminal Sequence Analysis. Springer™, Boston, MA. doi: 10.1007/978-1-4899-1031-8_8).

Non-limiting examples of functional groups for substituted phenyl isothiocyanate may include ligands (e.g. biotin and biotin analogs) for known receptors, labels such as luminophores, or reactive groups such as click functionalities (e.g. compositions having an azide or acetylene moiety). The functional group may be a DNA, RNA, peptide or small molecule barcode or other tag which may be further processed and/or detected.

The removal of an amino terminal amino acid using Edman-type processes utilizes at least two main steps, the first step includes reacting an isothiocyanate or equivalent with protein N-terminal residues to form a relatively stable Edman complex, for example, a phenylthiocarbamoyl complex. The second step includes removing the derivatized N-terminal amino acid, for example, via heating. The protein, now having been shortened by one amino acid, may be detected, for example, by contacting the protein with a labeled affinity agent that is complementary to the amino terminus and examining the protein for binding to the agent, or by detecting loss of a label that was attached to the removed amino acid.

Edman-type processes can be carried out in a multiplex format to detect, characterize or identify a plurality of proteins. A method of detecting a protein can include steps of (i) exposing a terminal amino acid on a protein at an address of an array; (ii) binding an affinity agent to the terminal amino acid, where the affinity agent comprises a nucleic acid tag, and where a primer nucleic acid is present at the address; (iii) extending the primer nucleic acid, thereby producing an extended primer having a copy of the tag; and (iv) detecting the tag of the extended primer. The terminal amino acid can be exposed, for example, by removal of one or more amino acids from the amino terminus or carboxyl terminus of the protein. Steps (i) through (iv) can be repeated to produce a series of tags that is indicative of the sequence for the protein. The method can be applied to a plurality of proteins on the array and in parallel. Whatever the plexity, the extending of the primer can be carried out, for example, by polymerase-based extension of the primer, using the nucleic acid tag as a template. Alternatively, the extending of the primer can be carried out, for example, by ligase- or chemical-based ligation of the primer to a nucleic acid that is hybridized to the nucleic acid tag. The nucleic acid tag can be detected via hybridization to nucleic acid probes (e.g. in an array), amplification-based detections (e.g. PCR-based detection, or rolling circle amplification-based detection) or nuclei acid sequencing (e.g. cyclical reversible terminator methods, nanopore methods, or single molecule, real time detection methods). Exemplary methods that can be used for detecting proteins using nucleic acid tags are set forth in US Pat. App. Pub. No. 2019/0145982 A1; 2020/0348308 A1; or 2020/0348307 A1, each of which is incorporated herein by reference.

A protein can optionally be detected based on its enzymatic or biological activity. For example, a protein can be contacted with a reactant that is converted to a detectable product by an enzymatic activity of the protein. In other assay formats, a first protein having a known enzymatic function can be contacted with a second protein to determine if the second protein changes the enzymatic function of the first protein. As such, the first protein serves as a reporter system for detection of the second protein. Exemplary changes that can be observed include, but are not limited to, activation of the enzymatic function, inhibition of the enzymatic function, attenuation of the enzymatic function, degradation of the first protein or competition for a reactant or cofactor used by the first protein. Proteins can also be detected based on their binding interactions with other molecules such as proteins, nucleic acids, nucleotides, metabolites, hormones, vitamins, small molecules that participate in biological signal transduction pathways, biological receptors or the like. For example, a protein that participates in a signal transduction pathway can be identified as a particular candidate protein by detecting binding to a second protein that is known to be a binding partner for the candidate protein in the pathway.

The presence or absence of post-translational modifications (PTM) can be detected using a composition, apparatus or method set forth herein. A PTM can be detected using an affinity agent that recognizes the PTM or based on a chemical property of the PTM. Exemplary PTMs that can be detected, identified or characterized include, but are not limited to, myristoylation, palmitoylation, isoprenylation, prenylation, farnesylation, geranylgeranylation, lipoylation, flavin moiety attachment, Heme C attachment, phosphopantetheinylation, retinylidene Schiff base formation, dipthamide formation, ethanolamine phosphoglycerol attachment, hypusine, beta-Lysine addition, acylation, acetylation, deacetylation, formylation, alkylation, methylation, C-terminal amidation, arginylation, polyglutamylation, polyglyclyation, butyrylation, gamma-carboxylation, glycosylation, glycation, polysialylation, malonylation, hydroxylation, iodination, nucleotide addition, phosphoate ester formation, phosphoramidate formation, phosphorylation, adenylylation, uridylylation, propionylation, pyrolglutamate formation, S-glutathionylation, S-nitrosylation, S-sulfenylation, S-sulfinylation, S-sulfonylation, succinylation, sulfation, glycation, carbamylation, carbonylation, isopeptide bond formation, biotinylation, carbamylation, oxidation, reduction, pegylation, ISGylation, modification with small ubiquitin-like modifier (e.g., SUMOylation), ubiquitination, neddylation, pupylation, citrullination, deamidation, elminylation, disulfide bridge formation, proteolytic cleavage, isoaspartate formation, racemization, and protein splicing.

PTMs may occur at particular amino acid residues of a protein. For example, the phosphate moiety of a particular proteoform can be present on a serine, threonine, tyrosine, histidine, cysteine, lysine, aspartate or glutamate residue of the protein. In other examples, an acetyl moiety can be present on the N-terminus or on a lysine; a serine or threonine residue can have an O-linked glycosyl moiety; an asparagine residue can have an N-linked glycosyl moiety; a proline, lysine, asparagine, aspartate or histidine amino acid can be hydroxylated; an arginine or lysine residue can be methylated; or the N-terminal methionine or at a lysine amino acid can be ubiquitinated.

In some configurations of the apparatus and methods set forth herein, one or more proteins can be detected on a solid support. For example, protein(s) can be attached to a support, the support can be contacted with detection agents (e.g. affinity agents) in solution, the agents can interact with the protein(s), thereby producing a detectable signal, and then the signal can be detected to determine the presence of the protein(s). In multiplexed versions of this approach, different proteins can be attached to different addresses in an array, and the probing and detection steps can occur in parallel. In another example, affinity agents can be attached to a solid support, the support can be contacted with proteins in solution, the proteins can interact with the affinity agents, thereby producing a detectable signal, and then the signal can be detected to determine presence, quantity or characteristics of the proteins. This approach can also be multiplexed by attaching different affinity agents to different addresses of an array.

Proteins, affinity agents or other objects of interest can be attached to a solid support via covalent or non-covalent bonds. For example, a linker can be used to covalently attach a protein or other object of interest to an array. A particularly useful linker is a structured nucleic acid particle such as a nucleic acid nanoball (e.g. a concatemeric amplicon produced by rolling circle replication of a circular nucleic acid template) or a nucleic acid origami. For example, a plurality of proteins can be conjugated to a plurality of structured nucleic acid particles, such that each protein-conjugated particle forms an address in the array. Exemplary linkers for attaching proteins, or other objects of interest, to an array or other solid support are set forth in WO 2019/195633 A1 or U.S. Pat. App. Ser. No. 63/159,500, each of which is incorporated herein by reference.

A protein can be detected based on proximity of two or more affinity agents. For example, the two affinity agents can include two components each: a receptor component and a nucleic acid component. When the affinity agents bind in proximity to each other, for example, due to ligands for the respective receptors being on a single protein, or due to the ligands being present on two proteins that associate with each other, the nucleic acids can interact to cause a modification that is indicative of the two ligands being in proximity. Optionally, the modification can be extension of one of the nucleic acids using the other nucleic acid as a template. As another option, one of the nucleic acids can form a template that acts as splint to position other nucleic acids for ligation to an oligonucleotide. Exemplary methods are commercialized by Olink Proteomics AB® (Uppsala Sweden) or set forth in U.S. Pat. Nos. 7,306,904; 7,351,528; 8,013,134; 8,268,554 or 9,777,315, each of which is incorporated herein by reference.

A method or apparatus of the present disclosure can optionally be configured for optical detection (e.g. luminescence detection). Analytes or other entities can be detected, and optionally distinguished from each other, based on measurable characteristics such as the wavelength of radiation that excites a luminophore, the wavelength of radiation emitted by a luminophore, the intensity of radiation emitted by a luminophore (e.g. at particular detection wavelength(s)), luminescence lifetime (e.g. the time that a luminophore remains in an excited state) or luminescence polarity. Other optical characteristics that can be detected, and optionally used to distinguish analytes, include, for example, absorbance of radiation, resonance Raman, radiation scattering, or the like. A luminophore can be an intrinsic moiety of a protein or other analyte to be detected, or the luminophore can be an exogenous moiety that has been synthetically added to a protein or other analyte.

A method or apparatus of the present disclosure can use a light sensing device that is appropriate for detecting a characteristic set forth herein or known in the art. Particularly useful components of a light sensing device can include, but are not limited to, optical sub-systems or components used in nucleic acid sequencing systems. Examples of useful sub systems and components thereof are set forth in US Pat. App. Pub. No. 2010/0111768 A1 or U.S. Pat. Nos. 7,329,860; 8,951,781 or 9,193,996, each of which is incorporated herein by reference. Other useful light sensing devices and components thereof are described in U.S. Pat. Nos. 5,888,737; 6,175,002; 5,695,934; 6,140,489; or 5,863,722; or US Pat. Pub. Nos. 2007/007991 A1, 2009/

0247414 A1, or 2010/0111768; or WO2007/123744, each of which is incorporated herein by reference. Light sensing devices and components that can be used to detect luminophores based on luminescence lifetime are described, for example, in U.S. Pat. Nos. 9,678,012; 9,921,157; 10,605,730; 10,712,274; 10,775,305; or 10,895,534 each of which is incorporated herein by reference.

Luminescence lifetime can be detected using an integrated circuit having a photodetection region configured to receive incident photons and produce a plurality of charge carriers in response to the incident photons. The integrated circuit can include at least one charge carrier storage region and a charge carrier segregation structure configured to selectively direct charge carriers of the plurality of charge carriers directly into the charge carrier storage region based upon times at which the charge carriers are produced. See, for example, U.S. Pat. Nos. 9,606,058, 10,775,305, and 10,845,308, each of which is incorporated herein by reference. Optical sources that produce short optical pulses can be used for luminescence lifetime measurements. For example, a light source, such as a semiconductor laser or LED, can be driven with a bipolar waveform to generate optical pulses with FWHM durations as short as approximately 85 ps having suppressed tail emission. See, for example, in U.S. Pat. No. 10,605,730, which is incorporated herein by reference.

For configurations that use optical detection (e.g. luminescent detection), one or more analytes (e.g. proteins) may be immobilized on a surface, and this surface may be scanned with a microscope to detect any signal from the immobilized analytes. The microscope itself may comprise a digital camera or other luminescence detector configured to record, store, and analyze the data collected during the scan. A luminescence detector of the present disclosure can be configured for epiluminescent detection, total internal reflection (TIR) detection, waveguide assisted excitation, or the like.

A light sensing device may be based upon any suitable technology, and may be, for example, a charged coupled device (CCD) sensor that generates pixilated image data based upon photons impacting locations in the device. It will be understood that any of a variety of other light sensing devices may also be used including, but not limited to, a detector array configured for time delay integration (TDI) operation, a complementary metal oxide semiconductor (CMOS) detector, an avalanche photodiode (APD) detector, a Geiger-mode photon counter, a photomultiplier tube (PMT), charge injection device (CID) sensors, JOT image sensor, or any other suitable detector. Light sensing devices can optionally be coupled with one or more excitation sources, for example, lasers, light emitting diodes (LEDs), arc lamps or other energy sources known in the art.

An optical detection system can be configured for single molecule detection. For example, waveguides or optical confinements can be used to deliver excitation radiation to locations of a solid support where analytes are located. Zero-mode waveguides can be particularly useful, examples of which are set forth in U.S. Pat. Nos. 7,181,122, 7,302,146, or 7,313,308, each of which is incorporated herein by reference. Analytes can be confined to surface features, for example, to facilitate single molecule resolution. For example, analytes can be distributed into wells having nanometer dimensions such as those set forth in U.S. Pat. Nos. 7,122,482 or 8,765,359, or US Pat. App. Pub. No 2013/0116153 A1, each of which is incorporated herein by reference. The wells can be configured for selective excitation, for example, as set forth in U.S. Pat. No. 8,798,414 or 9,347,829, each of which is incorporated herein by reference. Analytes can be distributed to nanometer-scale posts, such as high aspect ratio posts which can optionally be dielectric pillars that extend through a metallic layer to improve detection of an analyte attached to the pillar. See, for example, U.S. Pat. Nos. 8,148,264, 9,410,887 or 9,987,609, each of which is incorporated herein by reference. Further examples of nanostructures that can be used to detect analytes are those that change state in response to the concentration of analytes such that the analytes can be quantitated as set forth in WO 2020/176793 A1, which is incorporated herein by reference.

An apparatus or method set forth herein need not be configured for optical detection. For example, an electronic detector can be used for detection of protons or charged labels (see, for example, US Pat. App. Pub. Nos. 2009/0026082 A1; 2009/0127589 A1; 2010/0137143 A1; or 2010/0282617 A1, each of which is incorporated herein by reference in its entirety). A field effect transistor (FET) can be used to detect analytes or other entities, for example, based on proximity of a field disrupting moiety to the FET. The field disrupting moiety can be due to an extrinsic label attached to an analyte or affinity agent, or the moiety can be intrinsic to the analyte or affinity agent being used. Surface plasmon resonance can be used to detect binding of analytes or affinity agents at or near a surface. Exemplary sensors and methods for attaching molecules to sensors are set forth in US Pat. App. Pub. Nos. 2017/0240962 A1; 2018/0051316 A1; 2018/0112265 A1; 2018/0155773 A1 or 2018/0305727 A1; or U.S. Pat. Nos. 9,164,053; 9,829,456; 10,036,064, each of which is incorporated herein by reference.

A composition, apparatus or method of the present disclosure can be used to characterize or identify at least about 0.0000001%, 0.000001%, 0.00001%, 0.0001%, 0.001%, 0.01%, 0.1%, 1%, 10%, 25%, 50%, 90%, 99%, 99.9%, 99.99%, 99.999%, 99.9999%, 99.99999%, 99.999999%, or more of all protein species in a proteome.

Alternatively or additionally, a proteomic characterization method may characterize or no more than about 99.999999%, 99.99999%, 99.9999%, 99.999%, 99.99%, 99.9%, 99%, 90%, 50%, 25%, 10%, 1%, 0.1%, 0.01%, 0.001%, 0.0001%, 0.00001%, 0.000001%, 0.0000001%, or less of all protein species in a proteome.

In some configurations of the compositions, apparatus and methods set forth herein, one or more proteins can be present on a solid support, where the proteins can optionally be detected. For example, a protein can be attached to a solid support, the solid support can be contacted with a detection agent (e.g. affinity agent) in solution, the affinity agent can interact with the protein, thereby producing a detectable signal, and then the signal can be detected to determine the presence, absence, quantity, a characteristic or identity of the protein. In multiplexed versions of this approach, different proteins can be attached to different addresses in an array, and the detection steps can occur in parallel, such that proteins at each address are detected, quantified, characterized or identified. In another example, detection agents can be attached to a solid support, the support can be contacted with proteins in solution, the proteins can interact with the detection agents, thereby producing a detectable signal, and then the signal can be detected to determine the presence of the proteins. This approach can also be multiplexed by attaching different probes to different addresses of an array.

In multiplexed configurations, different proteins can be attached to different unique identifiers (e.g. addresses in an array), and the proteins can be manipulated and detected in parallel. For example, a fluid containing one or more different affinity agents can be delivered to an array such that the proteins of the array are in simultaneous contact with the affinity agent(s). Moreover, a plurality of addresses can be observed in parallel allowing for rapid detection of binding events. A plurality of different proteins can have a complexity of at least 5, 10, 100, $1\times10^3$, $1\times10^4$, $1\times10^5$ or more different native-length protein primary sequences. Alternatively or additionally, a proteome, proteome subfraction or other protein sample that is analyzed in a method set forth herein can have a complexity that is at most $1\times10^5$, $1\times10^4$, $1\times10^3$, 100, 10, 5 or fewer different native-length protein primary sequences. The total number of proteins of a sample that is detected, characterized or identified can differ from the number of different primary sequences in the sample, for example, due to the presence of multiple copies of at least some protein species. Moreover, the total number of proteins of a sample that is detected, characterized or identified can differ from the number of candidate proteins suspected of being in the sample, for example, due to the presence of multiple copies of at least some protein species, absence of some proteins in a source for the sample, or loss of some proteins prior to analysis.

A particularly useful multiplex format uses an array of proteins and/or affinity agents. As used herein, the term "array" refers to a population of analytes (e.g. proteins) that are attached to unique identifiers such that the analytes can be distinguished from each other. As used herein, the term "unique identifier" refers to a solid support (e.g. particle or bead), spatial address in an array, tag, label (e.g. luminophore), or barcode (e.g. nucleic acid barcode) that is attached to an analyte and that is distinct from other identifiers, throughout one or more steps of a process. The process can be an analytical process such as a method for detecting, identifying, characterizing or quantifying an analyte. Attachment to a unique identifier can be covalent or non-covalent (e.g. ionic bond, hydrogen bond, van der Waals forces etc.). A unique identifier can be exogenous to the analyte, for example, being synthetically attached to the analyte. Alternatively, a unique identifier can be endogenous to the analyte, for example, being attached or associated with the analyte in the native milieu of the analyte. An array can include different analytes that are each attached to different unique identifiers. An array can include different unique identifiers that are attached to the same or similar analytes. An array can include separate solid supports or separate addresses that each bear a different analyte, wherein the different analytes can be identified according to the locations of the solid supports or addresses.

As used herein, the term "address," when used in reference to an array, means a location in an array where a particular analyte (e.g. protein) is present. An address can contain a single analyte, or it can contain a population of several analytes of the same species (i.e. an ensemble of the analytes). Alternatively, an address can include a population of different analytes. Addresses are typically discrete. The discrete addresses can be contiguous, or they can be separated by interstitial spaces. An array useful herein can have, for example, addresses that are separated by less than 100 microns, 10 microns, 1 micron, 100 nm, 10 nm or less. Alternatively or additionally, an array can have addresses that are separated by at least 10 nm, 100 nm, 1 micron, 10 microns, or 100 microns. The addresses can each have an area of less than 1 square millimeter, 500 square microns, 100 square microns, 10 square microns, 1 square micron, 100 square nm or less. An array can include at least about $1\times10^4$, $1\times10^5$, $1\times10^6$, $1\times10^8$, $1\times10^{10}$, $1\times10^{12}$, or more addresses.

A protein can be attached to a unique identifier using any of a variety of means. The attachment can be covalent or non-covalent. Exemplary covalent attachments include chemical linkers such as those achieved using click chemistry or other linkages known in the art or described in U.S. patent application Ser. No. 17/062,405, which is incorporated herein by reference. Non-covalent attachment can be mediated by receptor-ligand interactions (e.g. (strept) avidin-biotin, antibody-antigen, or complementary nucleic acid strands), for example, wherein the receptor is attached to the unique identifier and the ligand is attached to the protein or vice versa. In particular configurations, a protein is attached to a solid support (e.g. an address in an array) via a structured nucleic acid particle (SNAP). A protein can be attached to a SNAP and the SNAP can interact with a solid support, for example, by non-covalent interactions of the DNA with the support and/or via covalent linkage of the SNAP to the support. Nucleic acid origami or nucleic acid nanoballs are particularly useful. The use of SNAPs and other moieties to attach proteins to unique identifiers such as tags or addresses in an array are set forth in U.S. patents application Ser. Nos. 17/062,405 and 63/159,500, each of which is incorporated herein by reference.

EXAMPLES

Example 1: Passivated Solid Support Formation

A 700 μm-thick glass solid support is provided. The solid support contains two substantially planar surfaces and four thin edges. Before deposition of a substantially uniform layer on the surface, the glass solid support is cleaned via immersion in a 1% potassium hydroxide solution followed by a rinse in deionized water. After cleaning, the glass solid support is placed in a vacuum oven such that one of the planar surfaces is exposed to the atmosphere of the oven, and air is then removed from the oven. (3-aminopropyl) trimethoxysilane (APTMS) is introduced into the atmosphere of the oven and is allowed to react with the exposed planar surface for 120 minutes, forming a layer of conjugated APTMS on the planar surface.

After APTMS deposition on the surface, the glass solid support is removed from the vacuum oven. The glass solid support is contacted with a solution containing PEG-NHS ester. The PEG moieties of the PEG-NHS ester molecules are substantially monodisperse with a molecular weight range between 3000 Daltons and 7000 Daltons, with an average molecular weight of about 5000 Daltons. The activated ester moieties of the PEG-NHS ester molecules are allowed to react with the amine groups of the surface-conjugated APTMS for 120 minutes, thereby forming a substantially uniform passivating layer on the surface of the glass support. The bulk surface characteristic of the substantially uniform layer is determined by a water contact angle measurement.

Example 2. Coupling Solid Support Formation

A solid support is prepared by the method of Example 1. In place of PEG-NHS ester molecules, the solid support is contacted with a solution containing azide-PEG-NHS ester with a similar PEG monodispersity. A passivating layer containing terminal azide moieties is formed on the planar surface of the glass support.

A solution containing oligonucleotides that contain a 3'-terminal dibenzocyclooctylene (DBCO) reactive moiety is contacted with the passivated solid support. The DBCO-terminated oligonucleotides are allowed to react with azide moieties for 12 hours. A solid support is formed comprising a planar surface containing a substantially uniform bilayer over the planar surface, in which the bilayer contains a passivating layer adjacent to the planar surface, and an oligonucleotide coupling layer at the outer surface of the substantially uniform bilayer. The bulk surface characteristic of the substantially uniform bilayer is determined by a measuring fluorescence intensity by fluorescence microscopy from the surface after contacting the surface-linked oligonucleotides with a fluorescently-labeled complementary oligonucleotide.

Example 3. Electromagnetic Treatment of a Solid Support Composition

A composition, as described in Example 1, is introduced into an electromagnetic reaction apparatus. The apparatus maintains a reduced air pressure with an air sweep gas that contacts the surface of the glass solid support. A mask component is positioned 1 millimeter above the planar surface of the glass solid support that contains the deposited substantially uniform passivating layer. The mask component contains a high optical-transmission quartz solid support with a chrome mask layer deposited on a planar surface of the quartz. The chrome layer comprises a patterned array of openings that do not contain the chrome layer, permitting passage of electromagnetic radiation through the mask component at each opening. The patterned array of openings is arranged in a rectangular grid and each opening is separated by 500 nanometers (nm) from neighboring openings, center to center. Each opening has an average opening diameter of 200 nm. The mask component is smaller than the glass solid support, therefore necessitating repositioning of the glass solid support if an array of surface sites is to be produced over an entire surface of the solid support.

Electromagnetic radiation is provided to the planar surface of the solid support. The electromagnetic radiation is provided by an argon fluoride (ArF) laser and has a wavelength of 193 nm. The electromagnetic radiation is passed through a beam-homogenizing device, then is directed through a mirror to the chrome-coated surface of the mask component. Light is simultaneously passed through each opening of the mask component to the passivated surface of the solid support, with an average light power density of 50 milliWatts per square centimeter. The electromagnetic radiation is applied to the surface in 6 pulses of 10 seconds duration, with each pulse separated by a 30 second pause in irradiation. After 60 seconds of total irradiation, the solid support is repositioned under the mask component, and electromagnetic radiation is again applied to the new area of the surface. The process is repeated until the entire surface solid support has been irradiated.

After irradiation of the passivated surface layer, the glass solid support is characterized by a contact angle hysteresis measurement as a point of comparison to the contact angle hysteresis measurement of the non-irradiated passivating layer. The planar surface of the glass solid support is further characterized by atomic force microscopy to identify the size and spatial morphology of a subset of formed irradiated sites on the surface of the solid support. The planar surface of the glass solid support is further characterized by infrared spectroscopy to quantify a bulk surface distribution of carboxylic acids on the surface that are formed by oxidation of PEG derivative molecules.

Example 4. Surface Modification of Irradiated Sites

A composition of Example 3 is modified by a reactive scheme as shown in FIG. 6. The surface is successively contacted with $SOCl_2$ to convert carboxylic acid moieties of oxidized PEG molecules to acyl chlorides. Next, the acyl chloride groups are converted to amines by treatment with ammonia. After the planar surface has been reacted to convert the carboxylic acids to ammonia groups, the planar surface is contacted with a plurality of azide-PEG-NHS ester molecules, forming a layer of passivated molecules with terminal azide moieties. The planar glass surface is contacted with DBCO-terminated oligonucleotides, thereby coupling an oligonucleotide to each PEG derivative molecule that contained a carboxylic acid.

Example 5. Deposition of Analytes on an Array

An array composition of Example 4 is provided. Each array site comprises one or more conjugated oligonucleotides. The array is contacted with a buffered aqueous medium containing a plurality of analyte-displaying particles. Each analyte-displaying particle comprises a tile-shaped DNA origami particle containing a pendant, single-stranded oligonucleotide on a surface of the DNA origami. The single-stranded oligonucleotide is complementary to the oligonucleotides bound to the surface of the glass solid support. The analyte-displaying particle further comprises a single polypeptide that is conjugated to a surface of the DNA origami that is substantially opposite to the surface containing the pendant, single-stranded oligonucleotide. A single analyte-displaying particle is coupled to each array site by complementary base-pair binding between a surface-linked oligonucleotide and a pendant, single-stranded nucleotide. The orientation of the polypeptide being substantially opposite to that of the surface-coupled surface of the DNA origami facilitate the outward orientation of the polypeptide, thereby ensuring the display of each polypeptide at the outer surface of the modified planar surface.

Notwithstanding the appended claims, the disclosure set forth herein is also defined by the following clauses:

1. A method, comprising:
   a. providing a solid support comprising a surface and a substantially uniform layer on the surface, wherein the substantially uniform layer comprises a plurality of molecules that are coupled to the surface; and
   b. applying electromagnetic radiation to an area of the surface to disrupt a first subset of the plurality of molecules within a region of the surface, wherein the region of the surface retains a second subset of the plurality of molecules or a derivative thereof after applying the electromagnetic radiation to the area of the surface.

2. The method of clause 1, wherein the region comprises a non-uniform distribution of the first subset and the second subset.

3. The method of clause 1 or 2, wherein the first subset comprises a molar excess compared to the second subset.

4. The method of any one of clauses 1-3, wherein the substantially uniform layer comprises a passivating layer, wherein the passivating layer is configured to inhibit the binding of an uncoupled molecule adjacent to the surface.

5. The method of clause 4, wherein the passivating layer comprises a hydrophilic moiety.

6. The method of clause 4, wherein the passivating layer comprises a hydrophobic moiety.

7. The method of any one of clauses 4-6, wherein the passivating layer comprises a plurality of moieties that sterically hinder or electrostatically hinder the binding of the uncoupled molecule.

8. The method of clause 7, wherein the plurality of moieties comprises a polyethylene glycol (PEG), polyethylene oxide (PEO), a linear alkyl moiety, a branched alkyl moiety, a fluorinated hydrocarbon, a linear polysaccharide, a branched polysaccharide, a dendrimer, or a combination thereof.

9. The method of any one of the preceding clauses, wherein the substantially uniform layer comprises a coupling layer, wherein the coupling layer is configured to couple a plurality of moieties to the substantially uniform layer.

10. The method of clause 9, wherein the coupling layer comprises a plurality of covalent coupling moieties.

11. The method of clause 10, wherein the plurality of covalent coupling moieties comprises Click-type reactive moieties.

12. The method of clause 10, wherein the coupling layer comprises a plurality of non-covalent coupling moieties.

13. The method of clause 12, wherein the plurality of non-covalent coupling moieties comprises a plurality of oligonucleotides.

14. The method of clause 12, wherein the plurality of non-covalent coupling moieties comprises a plurality of electrically-charged moieties or a plurality of magnetic moieties.

15. The method of clause 12, wherein the plurality of non-covalent coupling moieties comprises a member of a receptor-ligand pair.

16. The method of clause 15, wherein the receptor-ligand pair is selected from the group consisting of streptavidin-biotin, SpyCatcher-SpyTag, SnoopCatcher-SnoopTag, and SdyCatcher-Sdy Tag.

17. The method of any one of the preceding clauses, wherein the plurality of molecules is substantially homogeneous prior to step (b).

18. The method of clause 17, wherein the plurality of molecules comprises an impurity fraction of less than 0.1 on a molar basis prior to step (b).

19. The method of clause 18, wherein the impurity fraction is less than 0.01 on a molar basis.

20. The method of clause 19, wherein the impurity fraction is less than 0.001 on a molar basis.

21. The method of any one of clauses 1-16, wherein the plurality of molecules is compositionally heterogeneous.

22. The method of clause 21, wherein the heterogeneous plurality of molecules comprises a first plurality of molecules comprising a passivating moiety and a second plurality of molecules that do not contain a passivating moiety.

23. The method of clause 21 or 22, wherein the heterogeneous plurality of molecules comprises a first plurality of molecules comprising a coupling moiety and a second plurality of molecules that do not contain the coupling moiety.

24. The method of clause 23, wherein the second plurality of molecules lack reactive coupling moieties.

25. The method of any one of the preceding clauses, wherein applying electromagnetic radiation comprises applying electromagnetic radiation in a wavelength range between 1 nanometer (nm) and 20 microns (μm).

26. The method of clause 25, wherein the electromagnetic radiation is in a wavelength range between 100 nm and 400 nm.

27. The method of clause 25, wherein the electromagnetic radiation is in a wavelength range between 400 nm and 1 μm.

28. The method of clause 25, wherein the electromagnetic radiation is in a wavelength range between 1 μm and 20 μm.

29. The method of any one of the preceding clauses, wherein the region of the surface is resolvable at single-analyte resolution.

30. The method of clause 29, wherein the region has an effective surface area of 1 square micron ($\mu m^2$) or less.

31. The method of clause 30, wherein the region has an effective surface area of 0.25 $\mu m^2$ or less.

32. The method of clause 31, wherein the region has an effective surface area of 0.1 $\mu m^2$ or less.

33. The method of any one of clause 29-32, wherein the region of the surface has a maximum characteristic length of less than 1 μm.

34. The method of clause 33, wherein the region of the surface has a maximum characteristic length of less than 500 μm.

35. The method of clause 34, wherein the region of the surface has a maximum characteristic length of less than 250 μm.

36. The method of any one of the preceding clauses, wherein the first subset of the plurality of molecules from within the region of the surface comprises at least about 10% of the plurality of molecules from within the region of the surface on a molar basis.

37. The method of clause 36, wherein the first subset of the plurality of molecules from within the region of the surface comprises at least about 50% of the plurality of molecules from within the region of the surface on a molar basis.

38. The method of clause 37, wherein the first subset of the plurality of molecules from within the region of the surface comprises at least about 90% of the plurality of molecules from within the region of the surface on a molar basis.

39. The method of any one of clauses 36-38, wherein the applying electromagnetic radiation to the area of the surface to selectively disrupt the first subset of the plurality of molecules comprises selectively removing a first fraction of the first subset of the plurality of molecules and selectively reacting a second fraction of the first subset of the plurality of molecules.

40. The method of clause 39, wherein the selectively removing a first fraction of the first subset of the plurality of molecules comprises removing a first molecule excluding a linking moiety that couples the molecule to the surface.

41. The method of clause 39 or 40, wherein the selectively reacting a second fraction of the first subset of the plurality of molecules comprises performing on a second molecule a chemical reaction selected from the group consisting of: a molecular addition, molecular cleavage, molecular rearrangement, molecular condensation, oxidation reaction, reduction reaction, and combination thereof.

42. The method of clause 41, wherein the molecular addition reaction comprises conjugating the second molecule to the first molecule or a molecular fragment thereof.

43. The method of any one of the preceding clauses, wherein, after applying electromagnetic radiation, the region of the surface comprises a derivative of a molecule of the plurality of molecules, wherein the derivative comprises a coupling moiety.

44. The method of clause 43, wherein the coupling moiety comprises a reactive functional group.

45. The method of clause 44, wherein the reactive functional group comprises a functional group selected from the group consisting of: a hydroxyl, a carboxylic acid, an ester, an ether, an aldehyde, a ketone, a carbonate, a peroxide, an acetal, an anhydride, an amide, an imide, a primary amine, a secondary amine, an azide, an alkene, an alkyne, and a combination thereof.

46. The method of any one of clauses 43-45, wherein the method further comprises, after applying the electromagnetic radiation, coupling a linking moiety to the derivative of the molecule of the plurality of molecules, wherein the linking moiety comprises the coupling moiety.

47. The method of any one of the preceding clauses, wherein the region of the surface is larger than the area of the surface.

48. The method of clause 47, wherein the region of the surface has an effective surface area that is at least 10% larger than the area of the surface.

49. The method of clause 48, wherein the region of the surface has an effective surface area that is at least 50% larger than the area of the surface.

50. The method of clause 49, wherein the region of the surface has an effective surface area that is at least 100% larger than area of the surface.

51. The method of any one of clauses 47-50, wherein the region of the surface has an effective surface area that is no more than 500% larger than area of the surface.

52. The method of any one of the preceding clauses, wherein applying electromagnetic radiation to the area of the surface comprises applying electromagnetic radiation with a substantially uniform power density throughout the area of the surface.

53. The method of clause 52, wherein applying electromagnetic radiation to the area of the surface comprises directing electromagnetic radiation through a beam homogenizing device.

54. The method of clause 52 or 53, wherein the substantially uniform power density has an average magnitude of at least 1 milliWatt per square centimeter ($mW/cm^2$).

55. The method of clause 54, wherein the substantially uniform power density has an average magnitude of at least 10 $mW/cm^2$.

56. The method of any one of the preceding clauses, wherein applying electromagnetic radiation to the area of the surface comprises applying electromagnetic radiation with a non-uniform power density to the area of the surface.

57. The method of clause 56, wherein the variable power density has a peak magnitude of at least 10 milliWatt per square centimeter ($mW/cm^2$).

58. The method of clause 57, wherein the variable power density has a peak magnitude of at least 100 $mW/cm^2$.

59. The method of any one of the preceding clauses, wherein the applying electromagnetic radiation to the area of the surface comprises the steps of:

a. providing a mask component adjacent to the substantially uniform layer, wherein the mask component is optically non-transmitting at the wavelength of the electromagnetic radiation, and wherein the mask component comprises an opening that is configured to transmit electromagnetic radiation to the area of the surface; and
b. directing electromagnetic radiation through the opening, thereby applying electromagnetic radiation to the area of the surface.

60. The method of clause 59, wherein the mask component comprises a layer of chrome, a layer of a dielectric material, or a combination thereof.

61. The method of clause 60, wherein the layer of chrome or dielectric material is applied to a second solid support, wherein the solid support is selected from the group consisting of fused silica, quartz, high optical-transmission quartz, high-purity quartz, synthetic quartz, and borosilicate glass.

62. The method of any one of clauses 59-61, wherein the mask component is separated from the substantially uniform layer by at least about 1 millimeter (mm).

63. The method of any one of the preceding clauses, wherein applying electromagnetic radiation to the area of the surface occurs in an oxidizing atmosphere.

64. The method of clause 63, wherein the oxidizing atmosphere comprises a gas selected from the group consisting of air, oxygen, ozone, water, carbon dioxide, carbon monoxide, hydrogen peroxide, chlorine, fluorine, nitrogen oxide (NOx), sulfur dioxide (SOx), and a combination thereof.

65. The method of clause 63 or 64, wherein applying electromagnetic radiation to the region of the surface occurs under reduced pressure relative to atmospheric pressure.

66. The method of clause 63 or 64, wherein applying electromagnetic radiation to the region of the surface occurs under increased pressure relative to atmospheric pressure.

67. The method of any one of clauses 63-66, wherein applying electromagnetic radiation to the region of the surface occurs with a flowing gas comprising the oxidizing atmosphere.

68. The method of any one of the preceding clauses, wherein providing the solid support comprising a surface and a substantially uniform layer on the surface comprises the steps of:

a. contacting the surface of the solid support with the plurality of molecules; and
b. depositing the plurality of molecules on the surface of the solid support, thereby forming the substantially uniform layer.

69. The method of clause 68, wherein depositing the plurality of molecules on the surface comprises a liquid-phase deposition process.

70. The method of clause 68, wherein depositing the plurality of molecules on the surface comprises a gas-phase deposition process.

71. The method of clause 68, wherein depositing the plurality of molecules on the surface comprises a gas-phase deposition process and a liquid-phase deposition process.

72. The method of any one of clauses 68-71, wherein the substantially uniform layer comprises a self-assembled monolayer.

73. The method of any one of clauses 68-72, wherein, before contacting the surface of the solid support with the plurality of molecules, the surface comprises a plurality of functional groups that are configured to couple the plurality of molecules.

74. The method of clause 73, wherein depositing a molecule of the plurality of molecules on the surface of the solid support comprises conjugating a complementary functional group to a functional group of the plurality of functional groups.

75. The method of clause 74, wherein the functional group and the complementary functional group comprise a Click-type reaction pair, an amine and an activated ester, or an epoxide and an amine.

76. The method of clause 75, wherein the functional group comprises a hydroxyl group and the complementary group comprises a silane.

77. The method of any one of the preceding clauses, wherein the area of the surface of the solid support is substantially planar.

78. The method of any one of clauses 1-76, wherein the area of the surface is non-planar.

79. The method of clause 78, wherein the area of the surface comprises a well.

80. The method of clause 79 wherein the well comprises a picowell, nanowell or a microwell.

81. The method of clause 78, wherein the area of the surface comprises a raised feature.

82. The method of any one of the preceding clauses, wherein, after applying electromagnetic radiation to the area of the surface, the surface comprises a first subregion that is substantially devoid of any molecules of the plurality of molecules, and a second subregion that comprises a derivative of a molecule of the plurality of molecules.

83. The method of clause 82, wherein the second subregion is non-continuous.

84. The method of clause 82, wherein the second subregion is adjacent to an edge of the region of the surface.

85. The method of any one of clauses 82-84, wherein the first subregion comprises at least 10% of the effective surface area of the region of the surface.

86. The method of clause 85, wherein the first subregion comprises at least 50% of the effective surface area of the region of the surface.

87. The method of clause 86, wherein the first subregion comprises at least 90% of the effective surface area of the region of the surface.

88. The method of clause 87, wherein the first subregion comprises no more than 99% of the effective surface area of the region of the surface.

89. The method of any one of the preceding clauses, wherein applying electromagnetic radiation occurs for no more than 100 seconds(s).

90. The method of clause 89, wherein applying electromagnetic radiation occurs for no more than 60 s.

91. The method of clause 90, wherein applying electromagnetic radiation occurs for no more than 20 s.

92. A solid support comprising a surface, wherein the surface comprises:

a. a first region comprising a first plurality of molecules that are coupled to the first region of the surface, wherein the first plurality of molecules form a substantially homogeneous layer on the first region of the surface; and b. a second region comprising a second plurality of molecules that are coupled to the second region of the surface, wherein the second plurality of molecules form a spatially and compositionally heterogeneous layer on the first region of the surface.

93. The solid support of clause 92, wherein the first plurality of molecules comprises a single species of molecules.

94. The composition of clause 93, wherein the single species of molecule comprises a passivating moiety.

95. The composition of clause 94, wherein the passivating moiety comprises a polyethylene glycol (PEG), polyethylene oxide (PEO), a linear alkyl moiety, a branched alkyl moiety, a fluorinated hydrocarbon, a linear polysaccharide, a branched polysaccharide, a dendrimer, or a combination thereof.

96. The composition of any one of clauses 93-95, wherein the single species of molecule comprises a coupling moiety.

97. The composition of clause 96, wherein the coupling moiety comprises a reactive functional group.

98. The composition of clause 97, wherein the reactive functional group comprises a Click-type reactive moiety.

99. The composition of clause 96, wherein the coupling moiety comprises a group configured to form a non-covalent interaction.

100. The composition of clause 99, wherein the coupling moiety comprises an oligonucleotide, electrically-charged group, magnetically-charged group, or component of a receptor-ligand pair.

101. The composition of clause 100, wherein the receptor-ligand pair is selected from the group consisting of streptavidin-biotin, SpyCatcher-SpyTag, SnoopCatcher-SnoopTag, and SdyCatcher-SdyTag.

102. The composition of any one of clauses 93-101, wherein a surface density of the single species of molecules varies by no more than 1%.

103. The composition of clause 92, wherein the first plurality of molecules comprises a first species of molecules and a second species of molecules.

104. The composition of clause 103, wherein the first species of molecules comprises a first passivating moiety and the second species of molecules comprises a second passivating moiety.

105. The composition of clause 103, wherein the first species of molecules comprises a passivating moiety and the second species of molecules comprises a coupling moiety.

106. The composition of any one of clauses 103-105, wherein a surface density of the first species of molecules and a surface density of the second species of molecules varies by no more than 1%.

107. The composition of any one of clauses 92-106, wherein the first plurality of molecules comprises an impurity.

108. The composition of clause 107, wherein the first plurality of molecules comprises no more than 1% of the impurity on a molar basis.

109. The composition of clause 107 or 108, wherein the impurity comprises a derivative of a molecule of the first plurality of molecules.

110. The composition of clause 107 or 108, wherein the impurity comprises a molecule of the second plurality of molecules, or a derivative thereof.

111. The composition of any one of clauses 107-110, wherein a surface density of the impurity varies by no more than 1%.

112. The composition of any one of clauses 92-111, wherein the second plurality of molecules comprises a first species of molecules and a second species of molecules.

113. The composition of clause 112, wherein the first species of molecules comprises a first derivative of a molecule of the first plurality of molecules, and the second species of molecules comprises a second derivative of the molecule of the first plurality of molecules.

114. The composition of clause 113, wherein the first derivative or the second derivative comprises an oxidized moiety selected from the group consisting of a hydroxyl, a carboxylic acid, an ester, an ether, an aldehyde, a ketone, a carbonate, a peroxide, an acetal, an anhydride, an amide, an imide, a primary amine, a secondary amine, an azide, an alkene, an alkyne, and a combination thereof.

115. The composition of clause 114, wherein the first derivative or the second derivative comprises a condensed aromatic moiety.

116. The composition of clause 112, wherein the first species of molecules comprises a first derivative of a molecule of the first plurality of molecules, and the second species comprises a surface-linked functional group.

117. The composition of clause 116, wherein the surface-linked functional group comprises a hydroxyl or a carboxylate.

118. The composition of any one of clauses 112-117, wherein at least 75% of the first species of molecules is located in a first area of the second region of the surface, and at least 75% of the second species of molecules is located in a second area of the second region of the surface.

119. The composition of clause 118, wherein the first area is adjacent to an edge of the second region of the surface.

120. The composition of clause 118, wherein the first area surrounds the second area.

121. The composition of any one of clauses 112-117, wherein the first species of molecules and the second species of molecules are randomly distributed in the second region of the surface as characterized by a difference in a surface density of the first species of molecules and a difference in a surface density of the second species of molecules measured at a first location and a second location of the second region of the surface.

122. The composition of any one of clauses 92-121, wherein the first region of the surface surrounds the second region of the surface.

123. The composition of any one of clauses 92-122, further comprising a third region comprising a third plurality of molecules that are coupled to the third region of the surface, wherein the third plurality of molecules form a spatially and compositionally heterogeneous layer adjacent to the third region of the surface.

124. The composition of clause 123, wherein the spatial heterogeneity of the second plurality of molecules and the spatial heterogeneity of the third plurality of molecules are indistinguishable.

125. The composition of clause 123, wherein the spatial heterogeneity of the second plurality of molecules and the spatial heterogeneity of the third plurality of molecules differ.

126. The composition of clause 123, wherein the compositional heterogeneity of the second plurality of molecules and the compositional heterogeneity of the third plurality of molecules are indistinguishable.

127. The composition of clause 123, wherein the compositional heterogeneity of the second plurality of molecules and the compositional heterogeneity of the third plurality of molecules differ.

128. The composition of any one of clauses 92-127, further comprising a plurality of molecules that are configured to couple to the second region.

129. The composition of clause 128, wherein a molecule of the plurality of molecules comprises a passivating moiety.

130. The composition of clause 128 or 129, wherein a molecule of the plurality of molecules comprises a coupling moiety.

131. The composition of clause 130, wherein the coupling moiety is configured to form a covalent interaction.

132. The composition of clause 131, wherein the covalent interaction comprises a Click-type reaction.

133. The composition of clause 130, wherein the coupling moiety is configured to form a non-covalent interaction.

134. The composition of clause 133, wherein the coupling moiety comprises an oligonucleotide.

135. A solid support comprising a surface, wherein the surface comprises:

a. a first region comprising a first plurality of molecules that are conjugated to the first region of the surface, wherein the first plurality of molecules form a substantially homogeneous layer, and wherein a molecule of the first plurality of molecules comprises:
   i. a first linking moiety that conjugates the molecule of the first plurality of molecules to the surface; and
   ii. a passivating moiety that is conjugated to the linking moiety; and
b. a second region comprising a second plurality of molecules that are conjugated to the second region of the surface, wherein a molecule of the second plurality of molecules comprises:
   i. optionally, a derivative of the molecule of the first plurality of molecules that is conjugated to the surface;
   ii. a second linking moiety, wherein the linking moiety is configured to conjugate the molecule of the second plurality of molecules to the surface or the derivative of the molecule of the first plurality of molecules; and
   iii. a coupling moiety that is configured to couple an analyte-displaying particle to the surface.

136. The composition of clause 135, wherein the coupling moiety comprises an oligonucleotide.

137. The composition of clause 135, wherein the coupling moiety comprises a Click-type reactive moiety.

138. The composition of any one of clauses 135-137, further comprising the analyte-displaying particle, wherein the analyte-displaying particle is coupled to an analyte.

139. The composition of clause 138, wherein the analyte-displaying particle comprises a structured nucleic acid particle.

140. The composition of clause 139, wherein the structured nucleic acid particle comprises a nucleic acid origami or a nucleic acid nanoball.

141. The composition of any one of clauses 138-140, wherein the single analyte is selected from the group consisting of a polypeptide, a nucleic acid, a polysaccharide, a metabolite, and a combination thereof.

142. A method of preparing a solid support, the method comprising:

a. providing a solid support comprising a surface, wherein the surface comprises:
   i. a first region comprising a first plurality of molecules that are coupled to the first region of the surface, wherein the first plurality of molecules form a substantially homogeneous layer on the first region of the surface; and
   ii. a second region comprising a second plurality of molecules that are coupled to the second region of the surface, wherein the second plurality of molecules form a spatially and compositionally heterogeneous layer on the second region of the surface; and
b. two or more of the steps of
   (i) identifying a first physical property of the first region of the surface;
   (ii). identifying a second physical property of the second region of the surface; and
   (iii). based upon the first physical property or the second physical property, determining a subsequent processing step.

143. The method of clause 142, wherein the subsequent processing step is selected from group consisting of: i) discarding the solid support; ii) applying electromagnetic radiation to the second region of the surface; and iii) coupling a third plurality of molecules to the second region of the surface.

144. The method of clause 143, wherein the third plurality of molecules is configured to couple an analyte-displaying particle to the surface.

145. The method of any one of clauses 142-144, wherein the first property or the second property is selected from the group consisting of an absorbance frequency, a transmission frequency, an absorbance linewidth, a transmission linewidth, a surface roughness, an optical path length, an emission energy, an emission frequency, a feature size, a contact angle, a surface energy, and a combination thereof.

146. The method of clause 145, wherein the first property or the second property is determined by a method selected from the group consisting of surface profilometry, atomic force microscopy, surface plasmon resonance, scanning electron microscopy, transmission electron microscopy, x-ray photoelectron spectroscopy, energy-dispersive x-ray spectroscopy, infrared spectroscopy, ultraviolet spectroscopy, Raman spectroscopy, surface interferometry, contact angle measurement, and a combination thereof.

147. The method of any one of clauses 142-146, wherein the surface comprises a plurality of second regions.

148. The method of clause 147, wherein a second region of the plurality of second regions is non-contiguous to each other second region of the plurality of second regions.

149. The method of clause 147 or 148, wherein the plurality of second regions form a patterned array.

150. The method of clause 149, wherein each second region of the plurality of second regions is separated from each adjacent second region of the plurality of second regions by an average spacing of at least 100 nm.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method, comprising:

a) providing a solid support comprising a surface, wherein the surface comprises a plurality of surface sites, wherein a substantially uniform layer is coupled to the surface, wherein the substantially uniform layer comprises a plurality of first molecules, wherein each surface site of the plurality of surface sites is attached to a first molecule of the plurality of first molecules;

b) applying electromagnetic radiation to an area of the surface, thereby disrupting first molecules of the plurality of first molecules from a region of the surface, the disrupting comprising selectively removing a first fraction of the plurality of first molecules and selectively reacting a second fraction of the plurality of first molecules, wherein, after applying the electromagnetic radiation to the region of the surface, the region of the surface comprises a first subset of surface sites of the plurality of surface sites that are free of any portion of the first molecules or derivatives thereof, and wherein the region of the surface further comprises a second subset of surface sites of the plurality of surface sites that are attached to first molecules of the plurality of first molecules or derivatives thereof; and c) coupling a plurality of second molecules to the first molecules of the plurality of first molecules or derivatives thereof attached to the second subset of surface sites, and coupling a plurality of third molecules to the first subset of surface sites of the plurality of surface sites.

2. The method of claim 1, wherein the substantially uniform layer comprises a passivating layer, wherein the passivating layer comprises a plurality of molecular chains, wherein the plurality of molecular chains comprise linear molecular chains, branched molecular chains, or a combination thereof.

3. The method of claim 2, wherein the plurality of molecular chains comprises a polyethylene glycol (PEG), polyethylene oxide (PEO), a linear alkyl moiety, a branched alkyl moiety, a fluorinated hydrocarbon, a linear polysaccharide, a branched polysaccharide, a dendrimer, or a combination thereof.

4. The method of claim 1, wherein applying electromagnetic radiation to the area of the surface comprises the steps of:

a. providing a mask component adjacent to the substantially uniform layer, wherein the mask component comprises a metal or dielectric material, and wherein the mask component comprises an opening that is configured to transmit electromagnetic radiation to the area of the surface; and b. directing electromagnetic radiation through the opening, thereby applying electromagnetic radiation to the area of the surface.

5. The method of claim 1, wherein applying electromagnetic radiation comprises applying electromagnetic radiation in a wavelength range between 1 nanometer (nm) and 20 microns (μm).

6. The method of claim 1, wherein the solid support comprises a silicon-containing substrate.

7. The method of claim 6, wherein the plurality of third molecules comprises an organosilane molecule.

8. The method of claim 1, wherein the solid support comprises a metal oxide substrate.

9. The method of claim 8, wherein the plurality of third molecules comprises an organophosphonate or organophosphate molecule.

10. The method of claim 1, wherein the derivative of a first molecule of the plurality of first molecules comprises a reactive functional group.

11. The method of claim 10, wherein coupling the plurality of second molecules to the derivative of the first molecule of the first molecules of the plurality of first molecules comprises coupling the reactive functional group of the derivative to a reactive functional group of a second molecule of the plurality of second molecules.

12. The method of claim 11, wherein the reactive functional group of the derivative comprises an oxidized reactive functional group.

13. The method of claim 10, wherein coupling the plurality of second molecules to the first molecules of the plurality of first molecules or derivatives thereof further comprises modifying a derivative of a first molecule of the plurality of first molecules to form a reactive functional group.

14. The method of claim 1, wherein the plurality of second molecules comprises a first plurality of coupling moieties, and wherein the plurality of third molecules comprises a second plurality of coupling moieties.

15. The method of claim 1, wherein the plurality of second molecules comprises a plurality of coupling moieties, and wherein the plurality of third molecules comprises a plurality of passivating moieties.

16. The method of claim 1, wherein the plurality of third molecules comprises a plurality of coupling moieties, and wherein the plurality of second molecules comprises a plurality of passivating moieties.

17. The method of claim 1, wherein the region of the surface comprises a first subregion and a second subregion, wherein the first subregion comprises no molecules of the first molecules of the plurality of first molecules, and wherein the second subregion comprises the first molecules of the plurality of first molecules.

18. The method of claim 16, wherein the second subregion is a continuous subregion.

19. The method of claim 17, wherein the second subregion forms an annular region that surrounds the first subregion.

20. The method of claim 16, wherein the second subregion is a non-continuous subregion.

* * * * *